DAVID W. MASTERS
INVENTORS
BY Isidore Match
ATTORNEY

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 0 | 0 | 0 | 1 | 0 | 0 | 1 | 0 | 0 | 0 | 0 | 1 | 1 | 0 | 0 | 0 | 0 | 0 | 1 | 0 |
| | | B | | | | | | 6 | | | | | | 2 | | | | | |

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 1 | 1 | 0 | 0 | 0 | 1 |

| 0 – 4 | 5 | 6 | 7 – 19 |
|---|---|---|---|
| OPERATION CODE | X | X | OPERAND ADDRESS |
| | ADDRESS MODIFICATION BITS | | |

| 0 | 1 | 2 | 3 | 4 | 5 | 6 | 7 | 8 | 9 | 10–13 | 14 | 15 | 16 | 17 | 18 | 19 |
|---|---|---|---|---|---|---|---|---|---|---|---|---|---|---|---|---|
| 1 | 0 | 1 | 0 | 1 | X | X | 0 | 0 | | CONTROLLER ADDRESS | | 1 | | | | |

March 8, 1966 D. W. MASTERS 3,239,819

DATA PROCESSING SYSTEM INCLUDING PRIORITY FEATURE FOR PLURAL PERIPHERAL DEVICES

Filed May 1, 1962 36 Sheets-Sheet 5

March 8, 1966 D. W. MASTERS 3,239,819

DATA PROCESSING SYSTEM INCLUDING PRIORITY FEATURE FOR PLURAL PERIPHERAL DEVICES

Filed May 1, 1962 36 Sheets-Sheet 16

March 8, 1966 D. W. MASTERS 3,239,819

DATA PROCESSING SYSTEM INCLUDING PRIORITY FEATURE FOR PLURAL PERIPHERAL DEVICES

Filed May 1, 1962 36 Sheets-Sheet 23

| S-4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|
| 25 | X | | 0 | 0 | | | CTLR ADDR | | | | 1 | | | | | P |

United States Patent Office 3,239,819
Patented Mar. 8, 1966

3,239,819

DATA PROCESSING SYSTEM INCLUDING PRIORITY FEATURE FOR PLURAL PERIPHERAL DEVICES

David W. Masters, Palo Alto, Calif., assignor to General Electric Company, a corporation of New York Filed May 1, 1962, Ser. No. 191,573
9 Claims. (Cl. 340—172.5)

This invention relates to data processing systems. More particularly, it relates to means included in a data processing system comprising a central processor having data storage means and a plurality of peripheral devices for effecting a chosen priority of data storage means access between the central processor and the peripheral devices.

This application is a continuation-in-part application of the application of David W. Masters for Data Processing System, Serial No. 67,777, filed November 7, 1960, and now abandoned.

With the increasing complexity of applications of data processing systems, it is necessary to provide systems of improved flexibility in the addition thereto of peripheral devices. There has to be enabled the ready addition of such peripheral devices to expeditiously expand a data processing system with a minimum of redesigning and a minimum of programming.

Peripheral devices are most efficiently utilized by permitting access therefor to the central processor's data storage means, i.e., the memory. Since only one of these devices can have access to the memory at one time, such access is advantageously provided in accordance with a predetermined priority.

Accordingly, it is an important object of this invention to provide in a data processing system comprising a central processor having a memory, a plurality of peripheral devices, and an arrangement for enabling access of the peripheral devices to the memory in accordance with a predetermined priority.

It is a further object of the invention to provide apparatus in accordance with the preceding object wherein a peripheral device of one priority will be given access to the memory in preference to a peripheral device having a lower priority.

Generally speaking and in accordance with the invention, there is provided in an electronic data processing system comprising a central processor including a data storage means or memory, a plurality of peripheral devices, a selecting means in circuit with the central processor and the peripheral devices for enabling access to the memory of one of the peripheral devices in accordance with a predetermined priority, and means included in the central processor for enabling access to the memory of the selecting means and the central processor in accordance with a predetermined priority.

The features of this invention which are believed to be new are set forth with particularity in the appended claims. The invention itself, however, may best be understood by reference to the following description when taken in conjunction with the accompanying drawings which show an embodiment of a system according to the invention.

Figure 11:
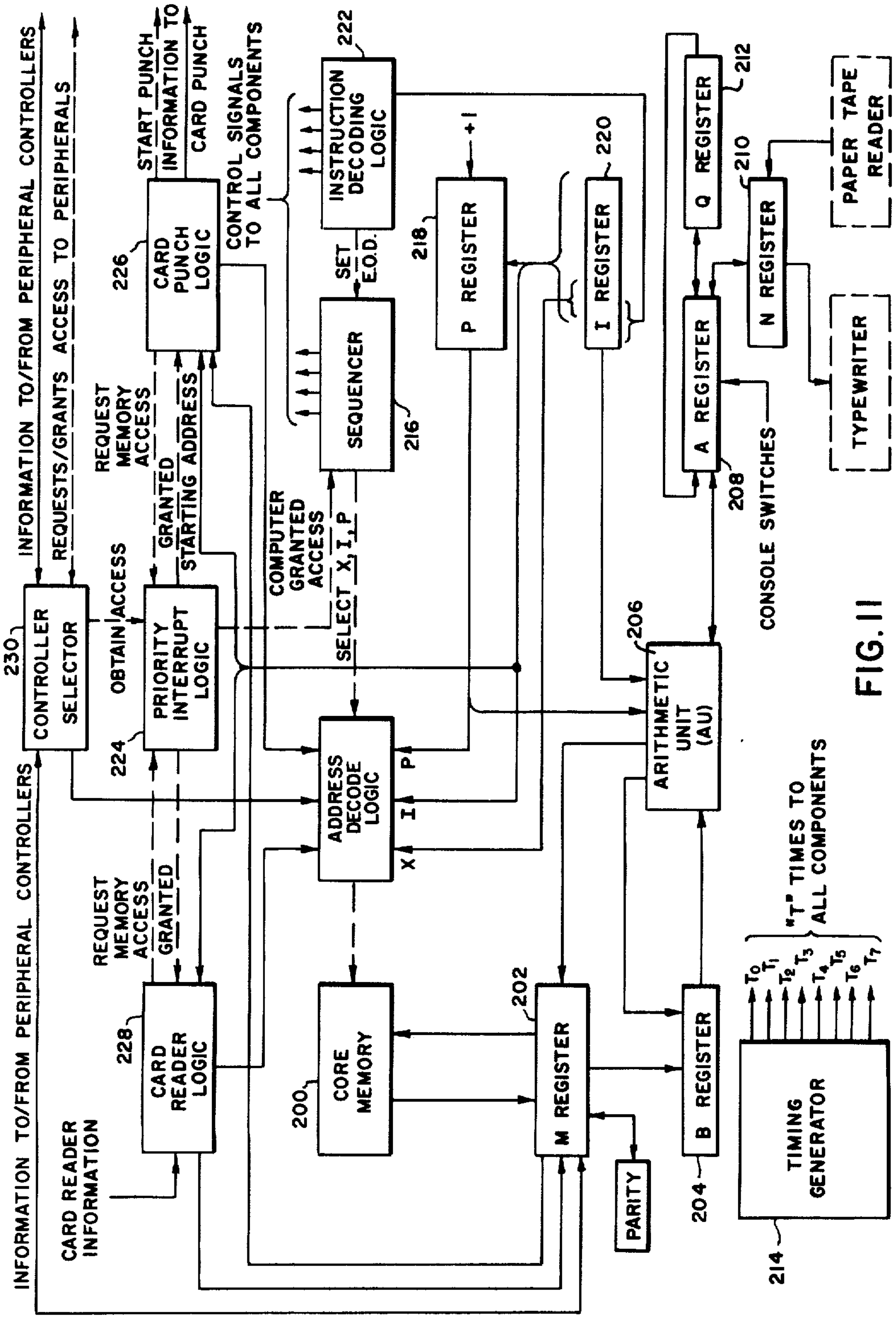
Figure 12:
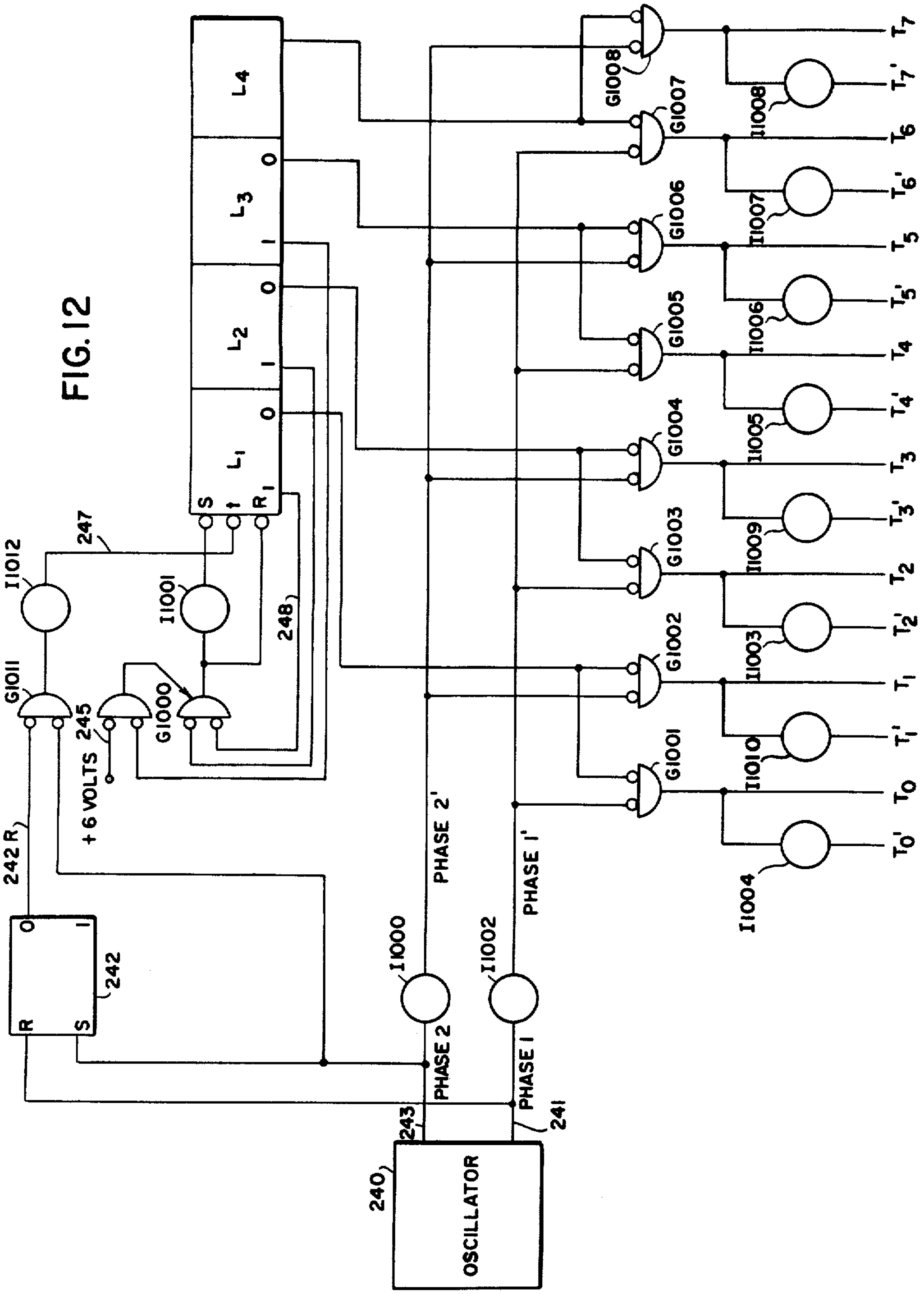
Figure 13:
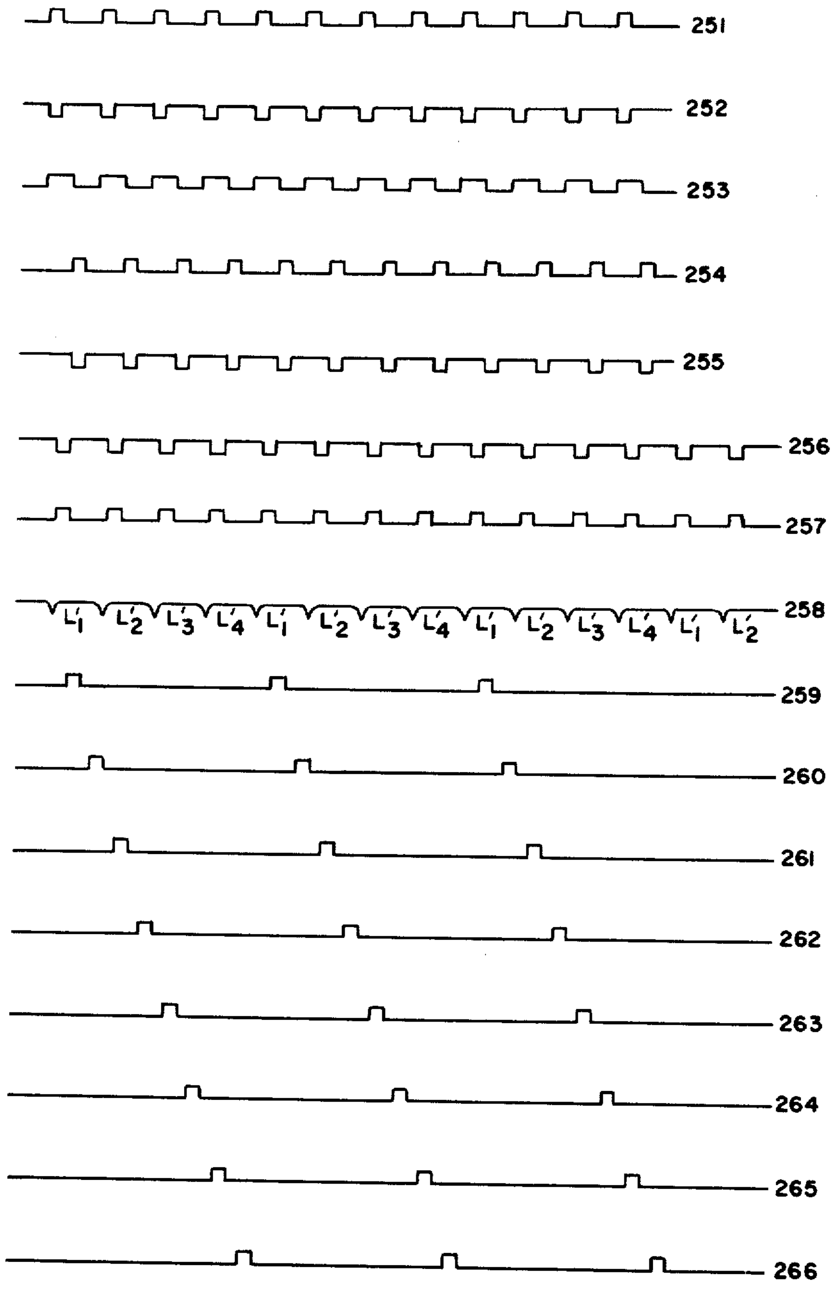
Figure 14:
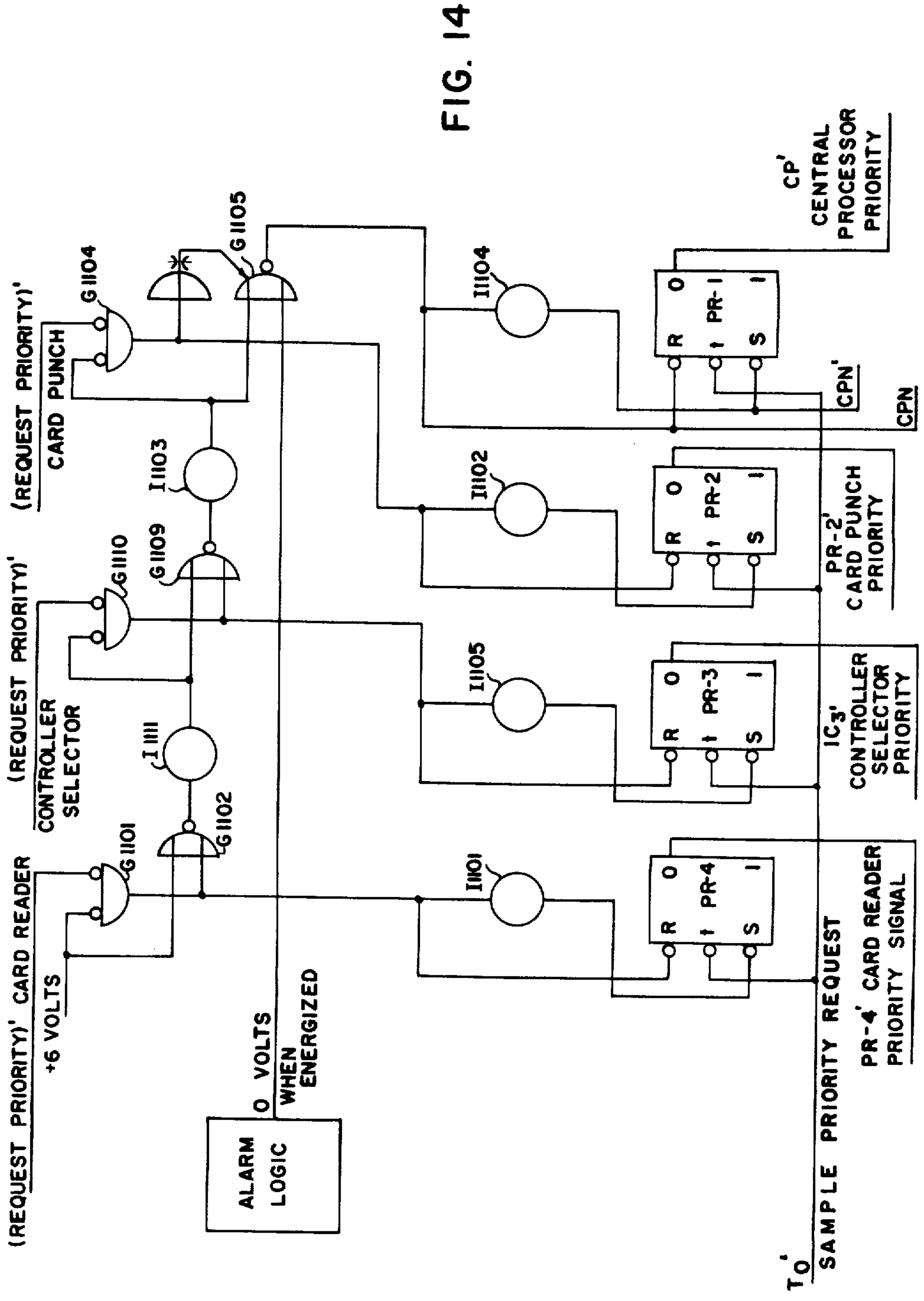
Figure 15:
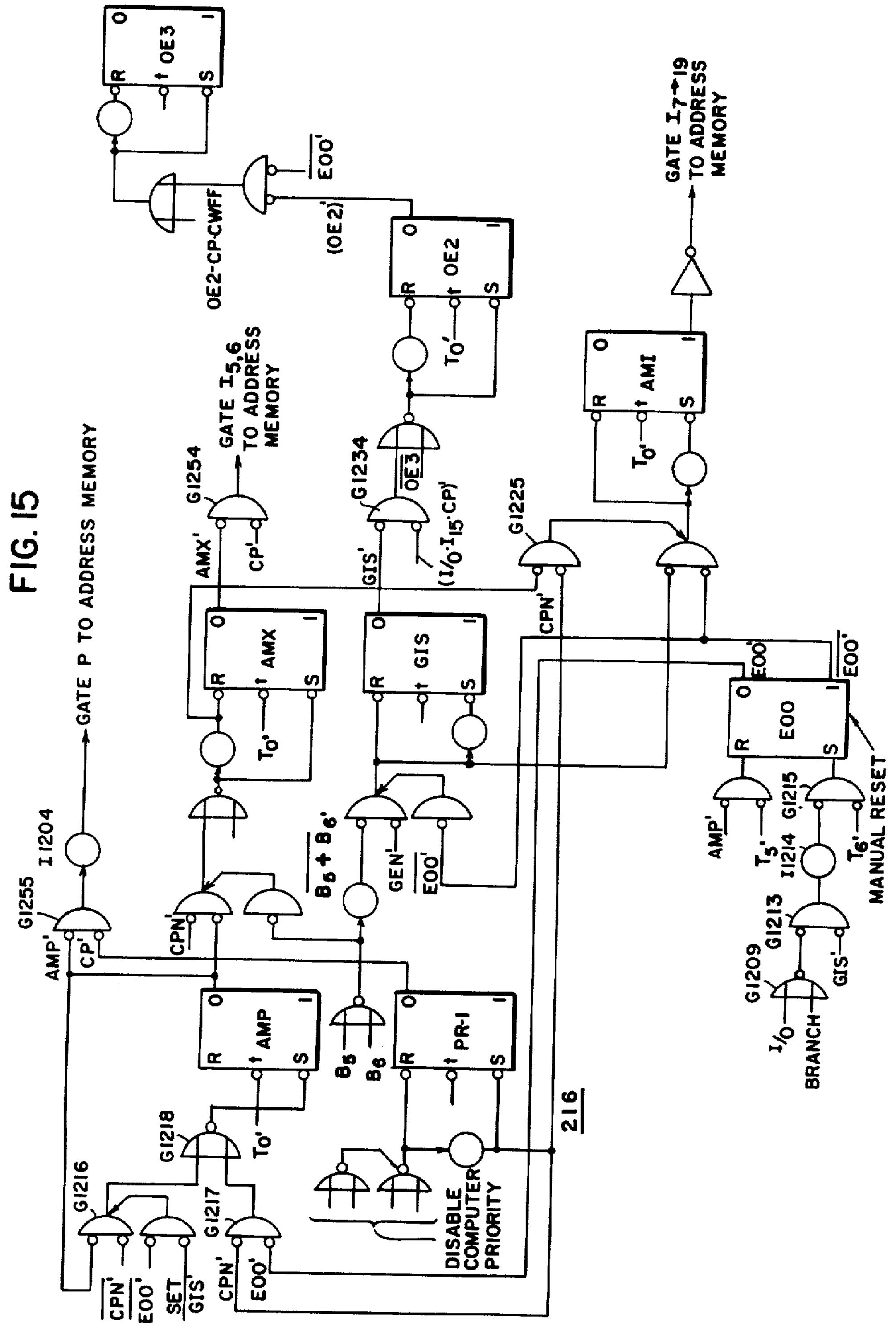
Figures 16, 17, 18, 19, 20, 22, 23, 24, 31:
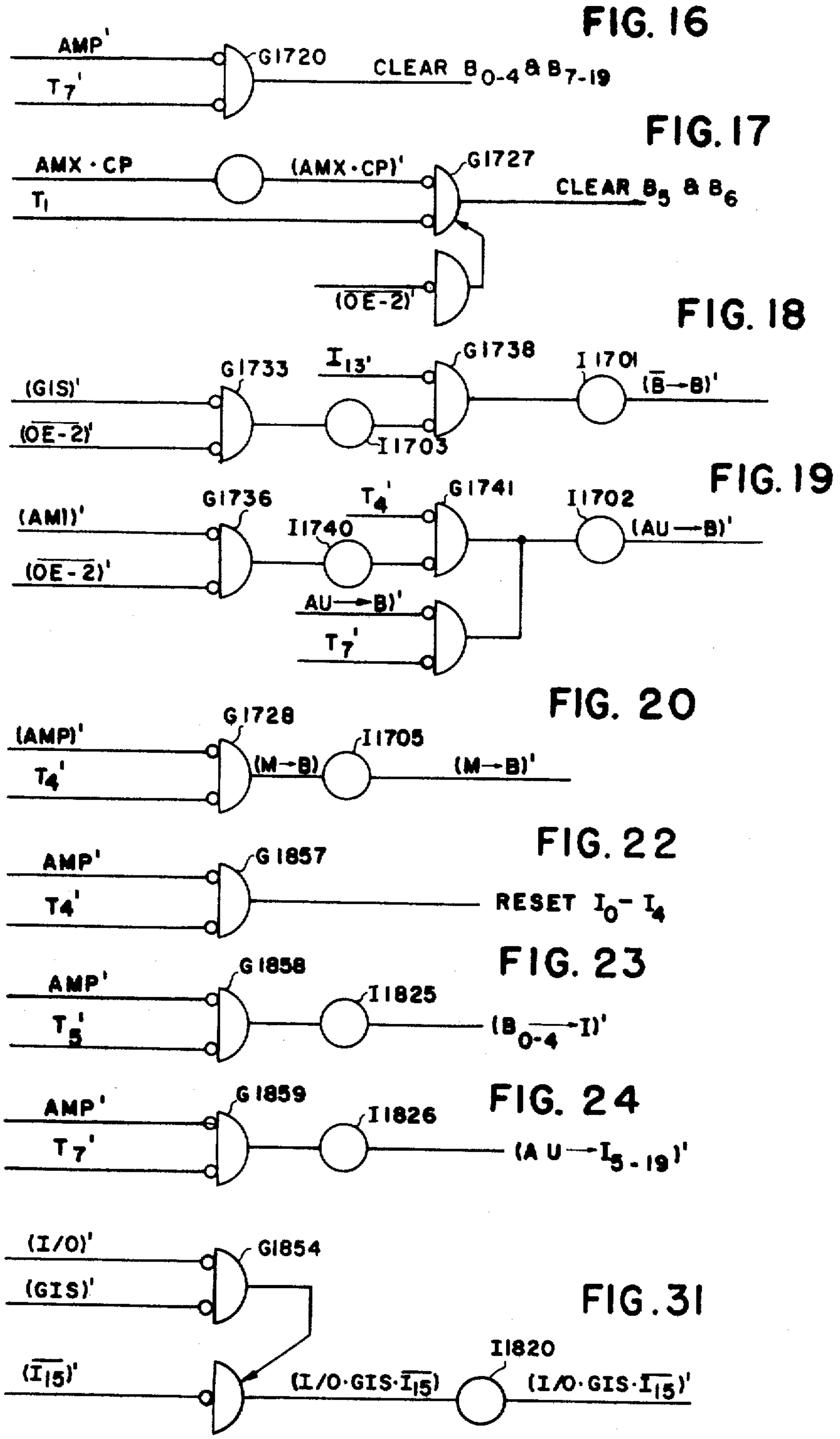
Figure 21:
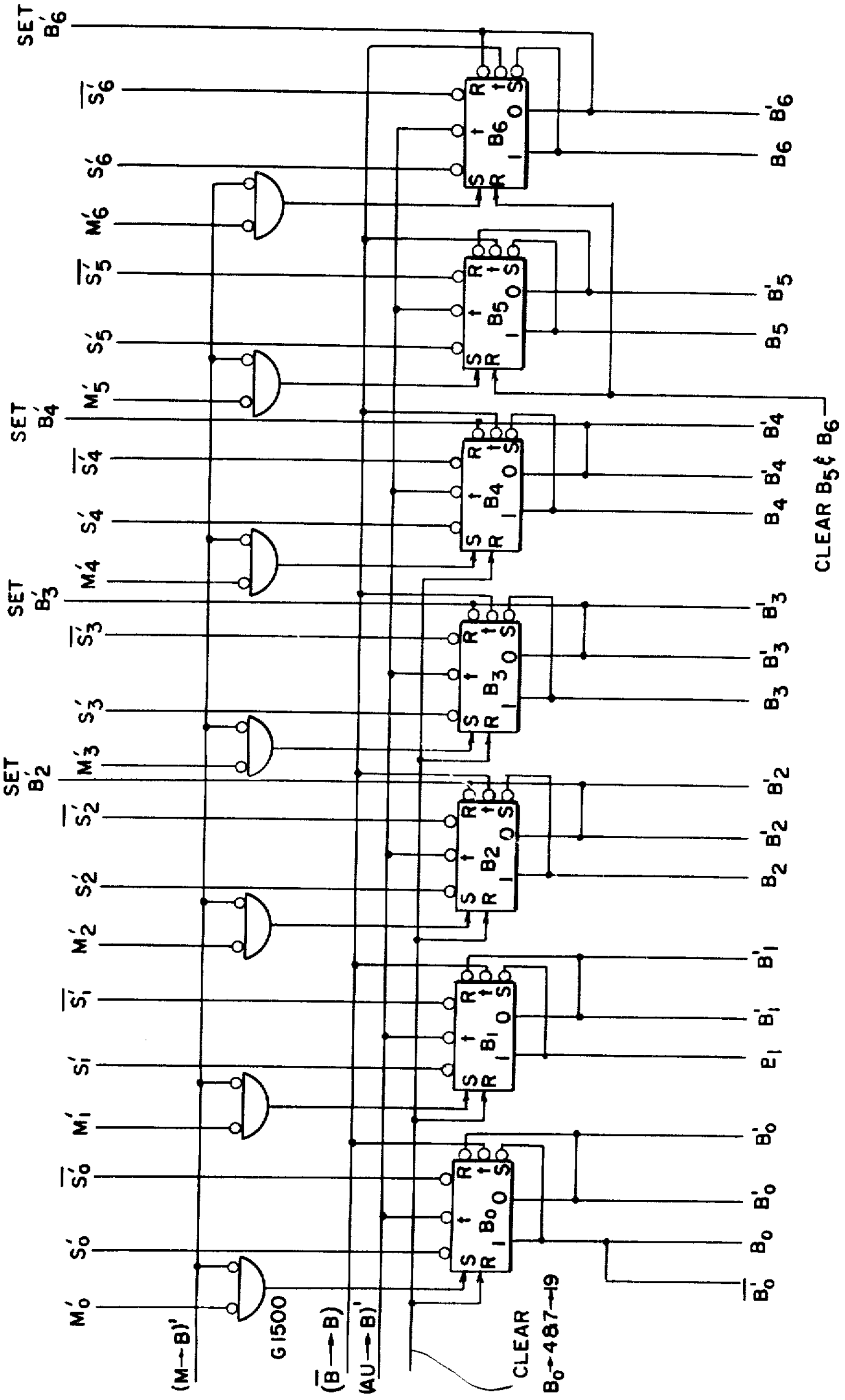
Figure 25:
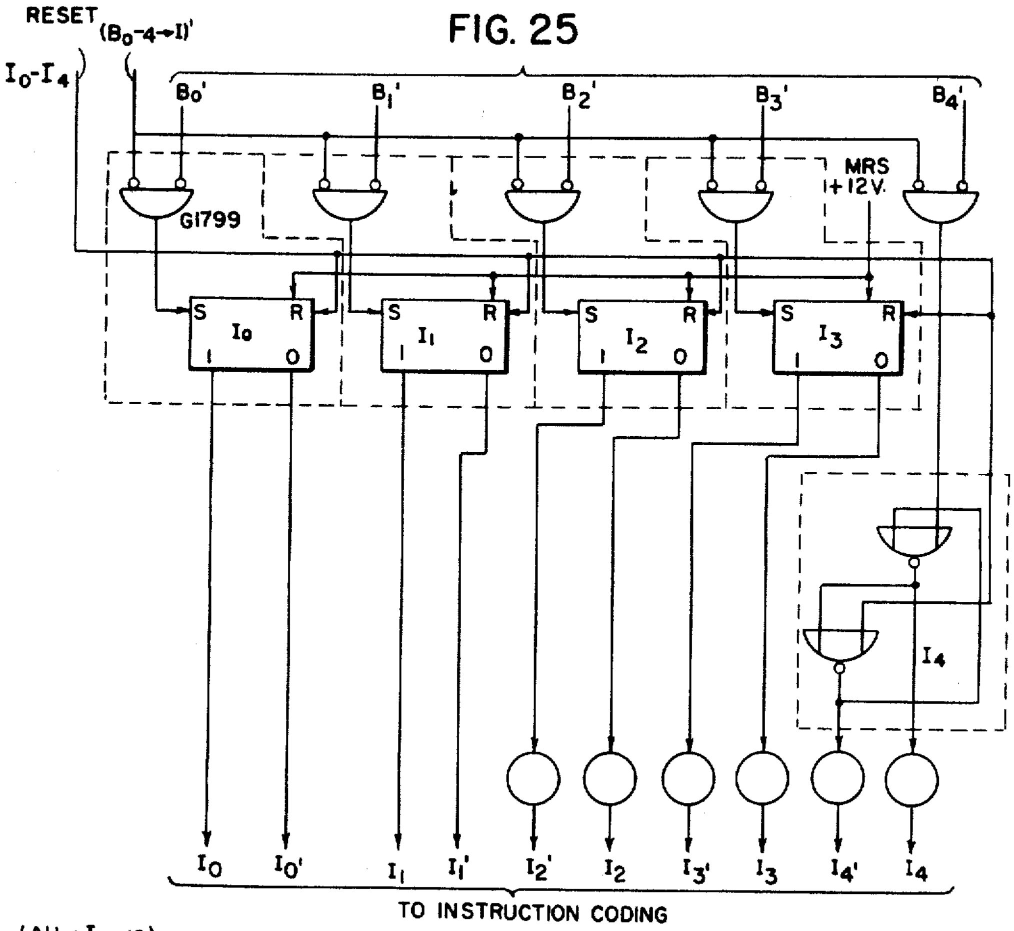
Figure 26:
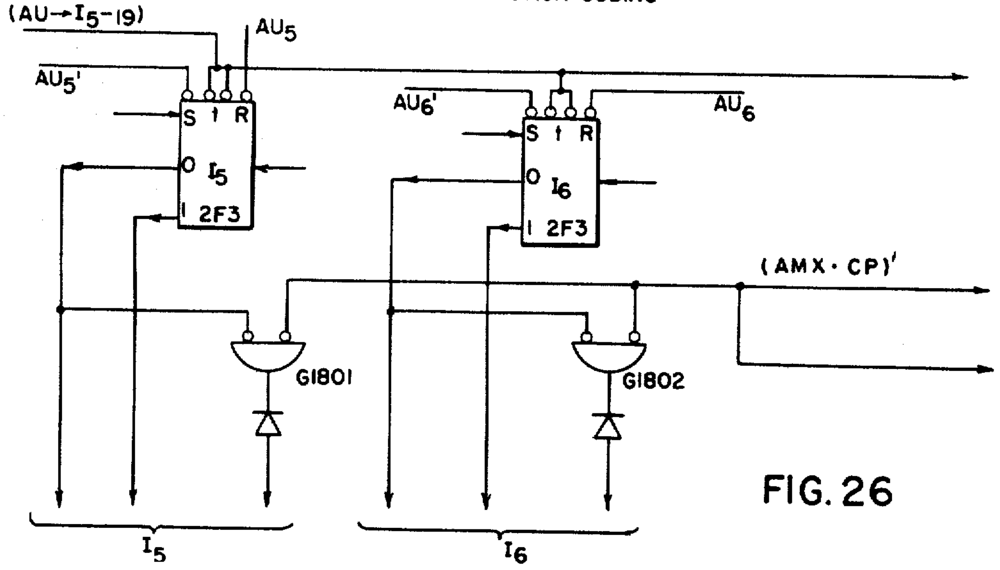
Figure 27:
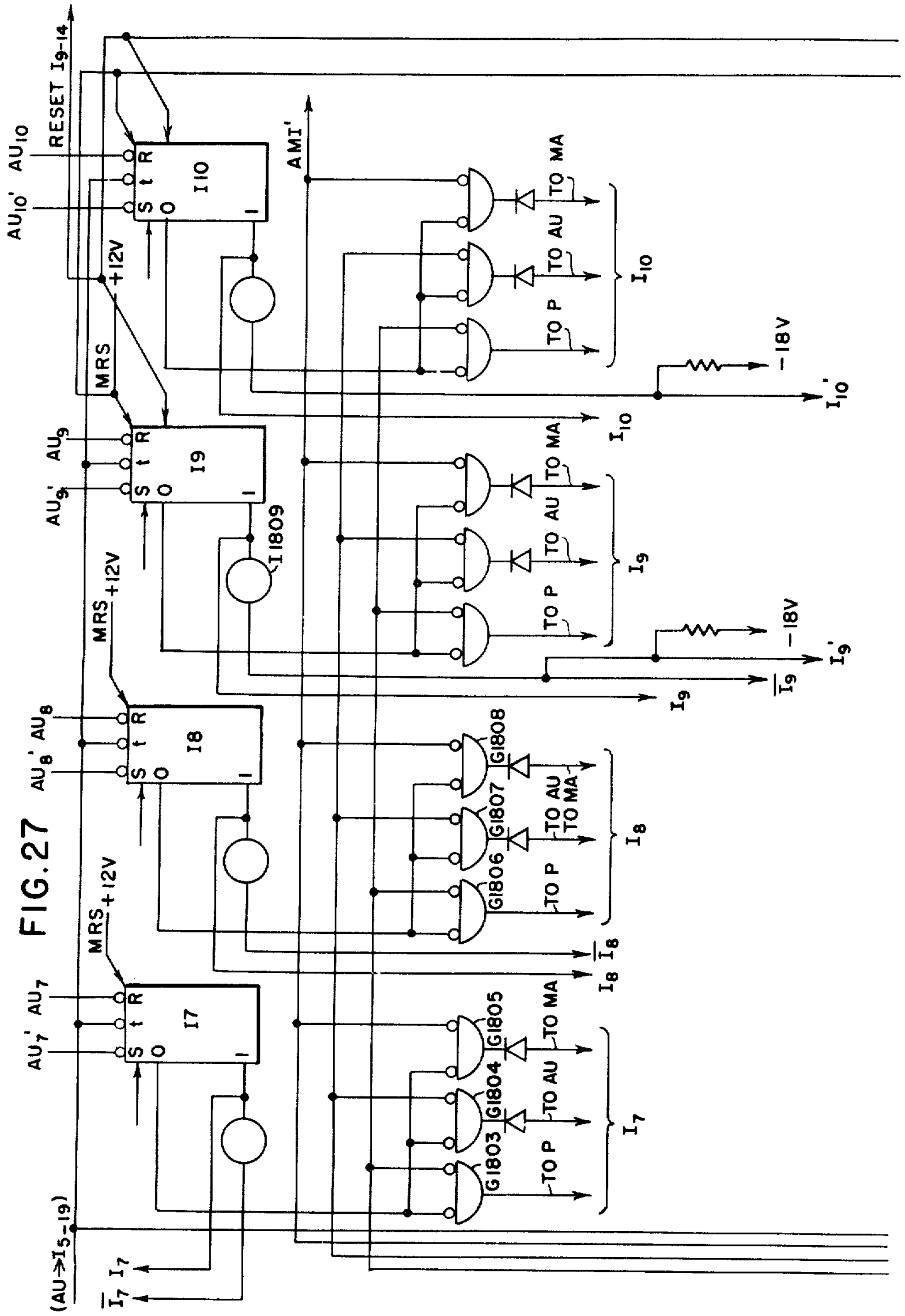
Figures 28, 29:
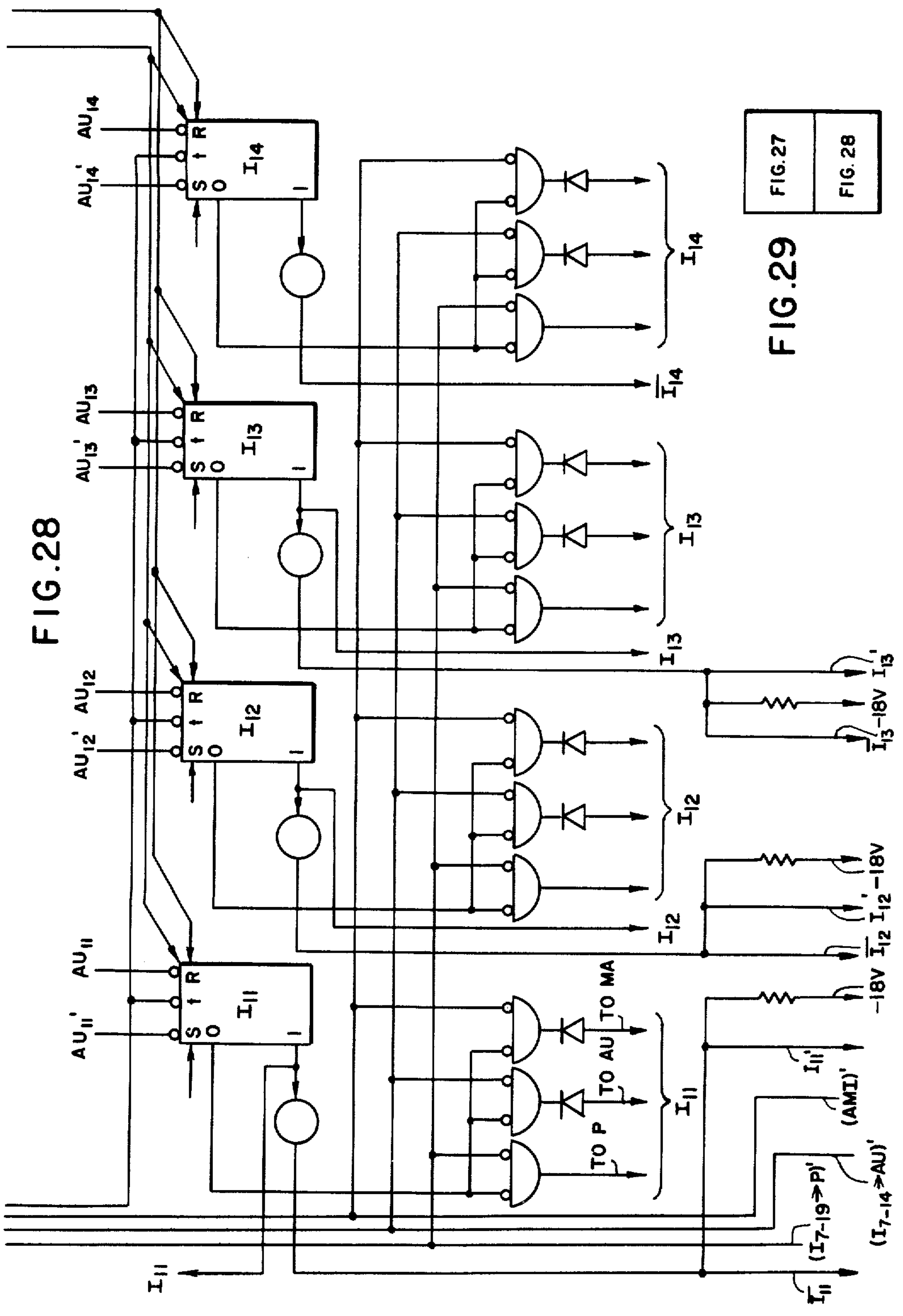

FIGS. 10*a* through 10*e* are diagrammatic and schematic illustrations of a pulse distributor;

FIG. 11 is a depiction of a simplified illustration of the central processor of the system of the invention;

FIG. 12 is a logical diagram of a timing generator suitable for use as the timing generator shown in block form in FIG. 11;

FIG. 13 is a timing diagram of the waveforms produced at the outputs of the timing generator of FIG. 12;

FIG. 14 is a logical diagram of the priority interrupt control arrangement in the central processor;

FIG. 15 is a logical diagram of the sequencer in the central processor;

FIG. 16 is a logical diagram of the arrangement for generating the control signal to clear the main portion of the B register;

FIG. 17 is a logical diagram of the arrangement for generating the control signal to clear the remainder of the B register;

FIG. 18 is a logical diagram of the arrangement for generating the control signal to effect the complementing of the contents of the B register;

FIG. 19 is a logical diagram of the arrangement for generating the control signal to effect the transfer of the contents of the arithmetic unit to the B register;

FIG. 20 is a logical diagram of the arrangement for generating the control signal to effect the transfer of the contents of the M register to the B register;

FIG. 21 is a logical diagram of a portion of the B register;

FIG. 22 is a logical diagram of the arrangement for generating the control signal to reset flip-flops $I_0$ to $I_4$ of the I register;

FIG. 23 is a logical diagram of the arrangement for generating the control signal which effects the transfer of the contents of flip-flops $B_0$ to $B_4$ of the B register to flip-flops $I_0$ to $I_4$ of the I register;

FIG. 24 is a logical diagram of the arrangement for generating the control signal which effects the transfer of the contents of the arithmetic unit to the $I_5$ to $I_{19}$ flip-flops of the I register;

FIG. 25 is a logical diagram of the circuit arrangement of the $I_0$ to $I_4$ flip-flops of the I register;

FIG. 26 is a logical diagram of the circuit arrangement of the $I_5$ and $I_6$ flip-flops of the I register;

FIGS. 27 and 28 taken together as in FIG. 29 is a logical diagram of the circuit arrangement of the $I_7$ to $I_{14}$ flip-flops of the I register.

Figure 30:
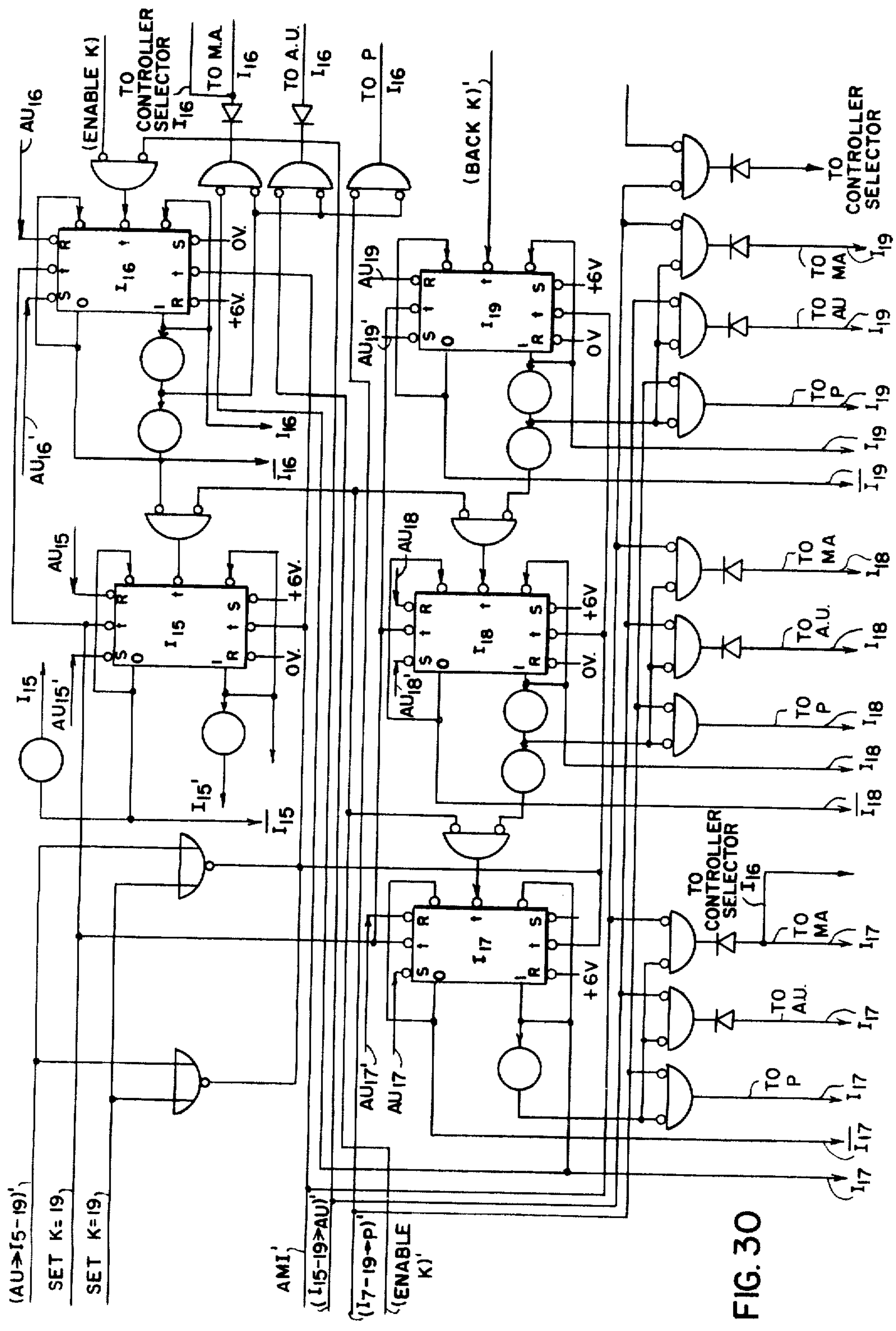
Figure 32:
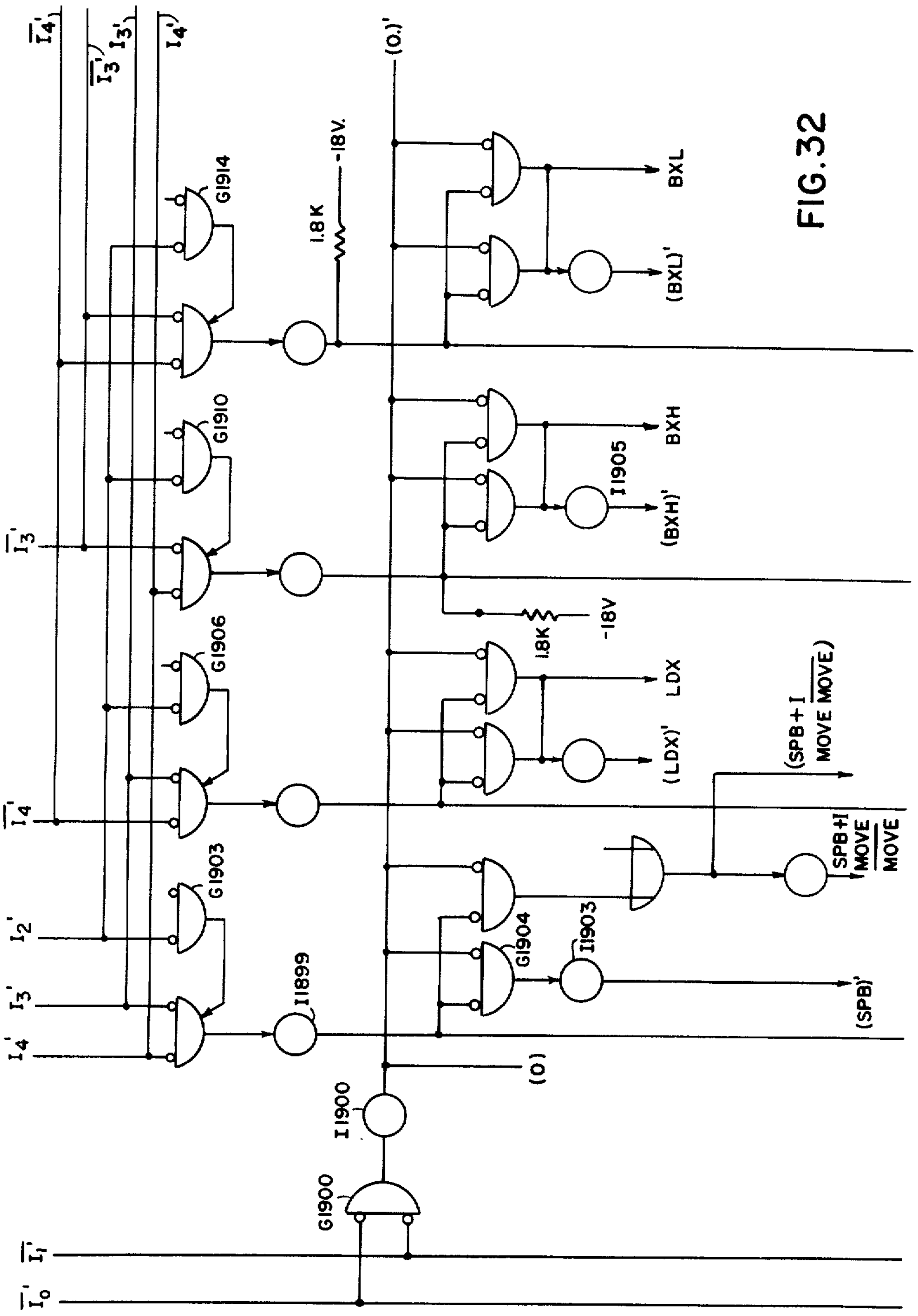
Figure 33:
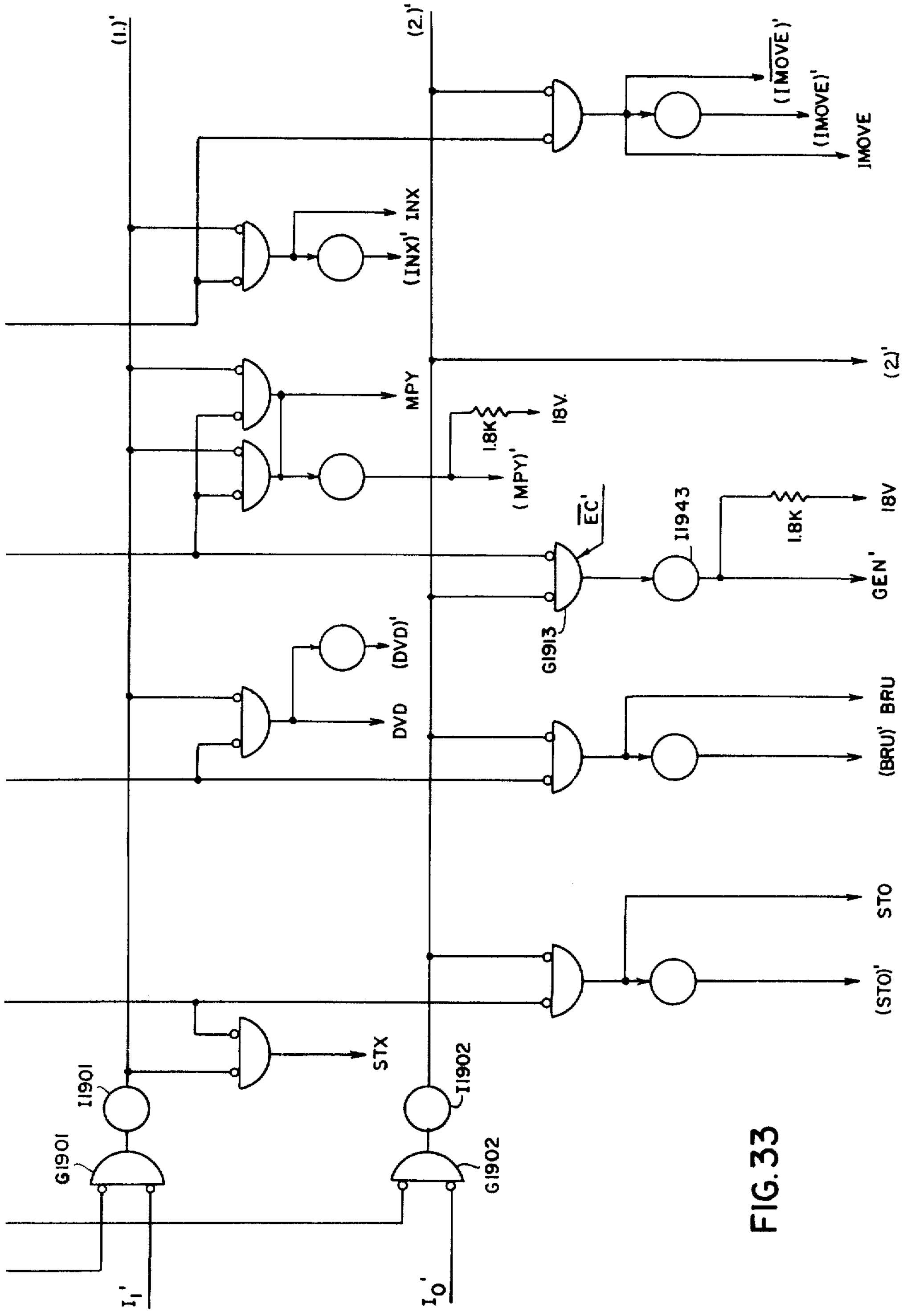
Figure 34:
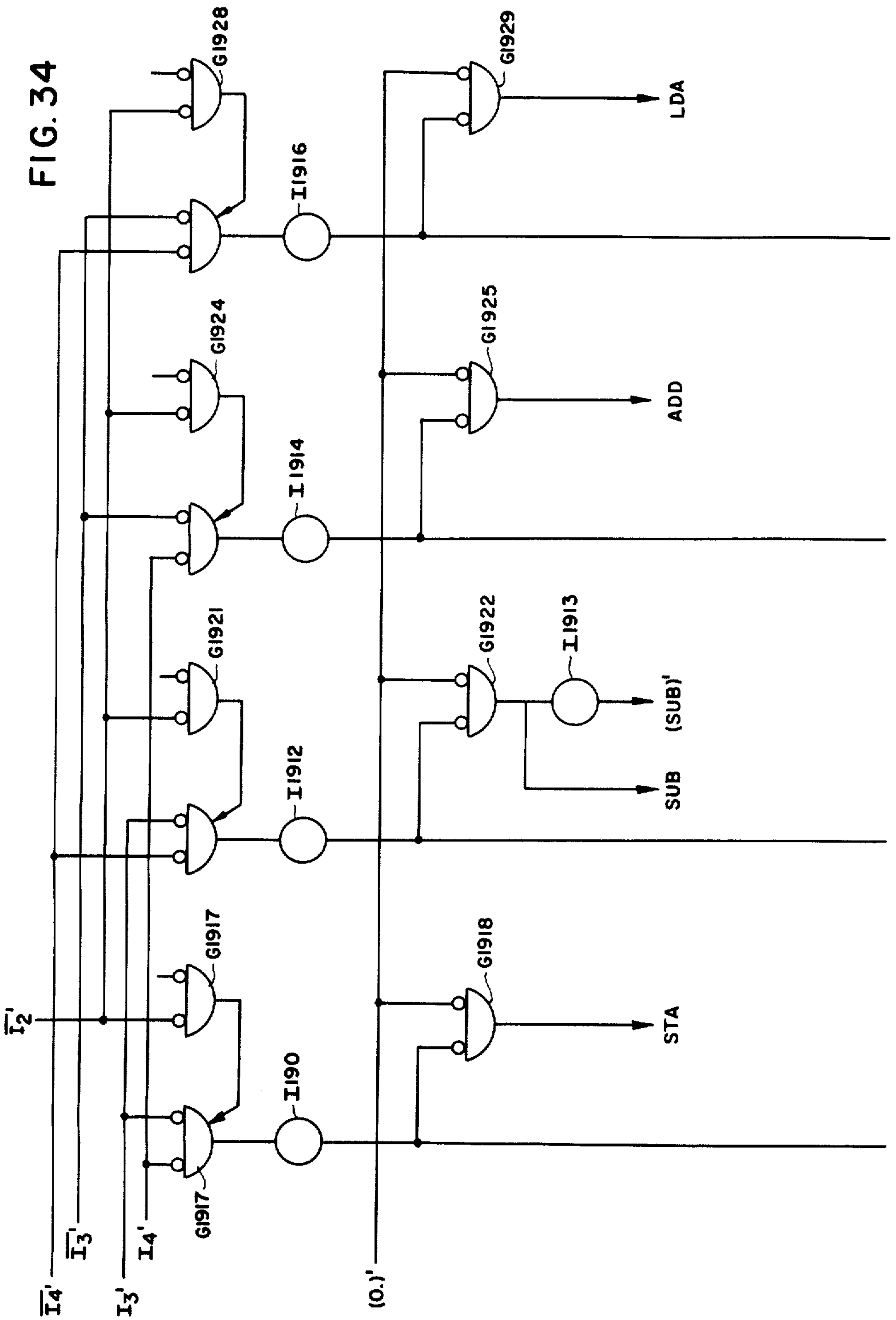
Figure 35:
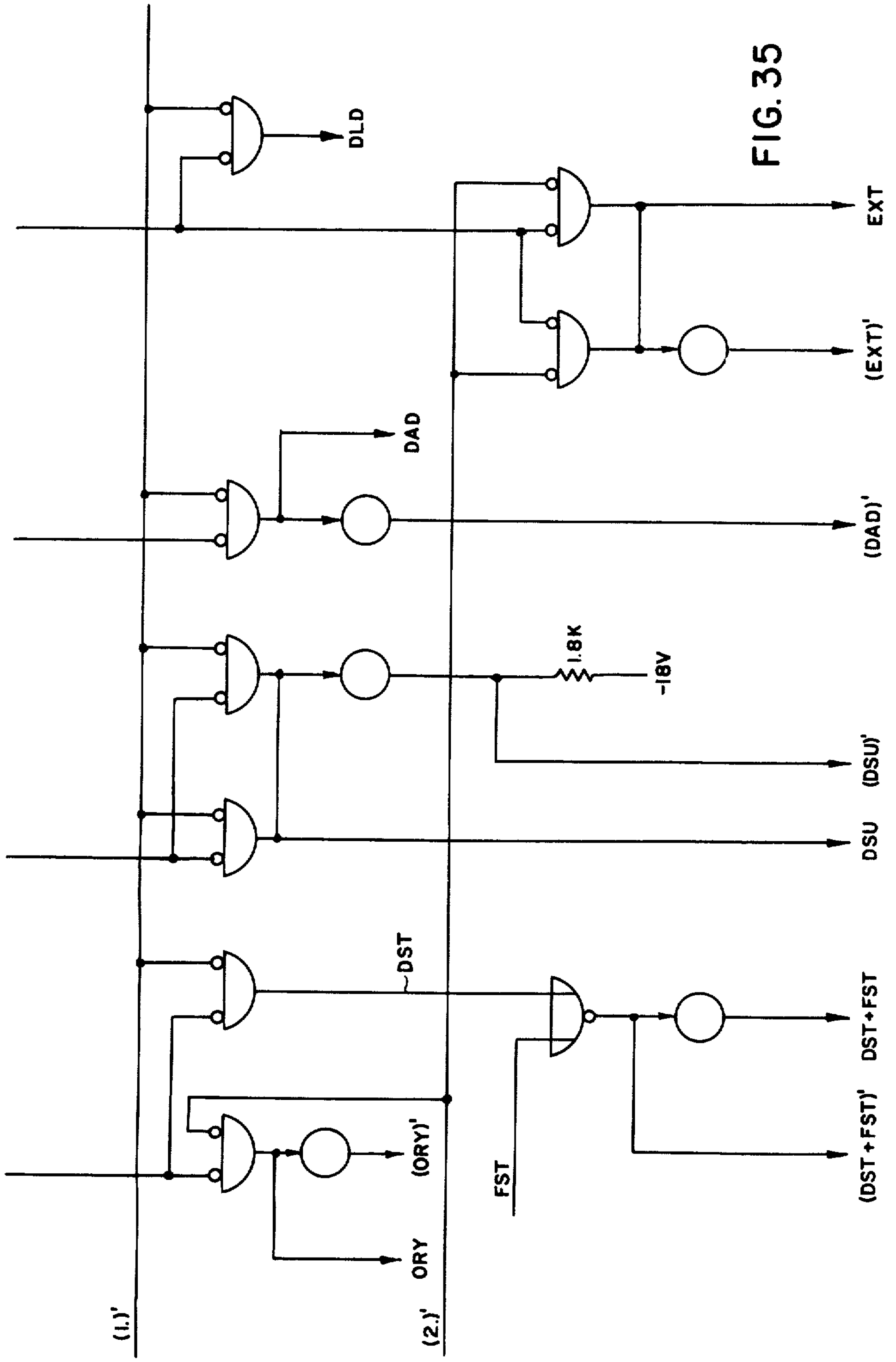
Figure 36:
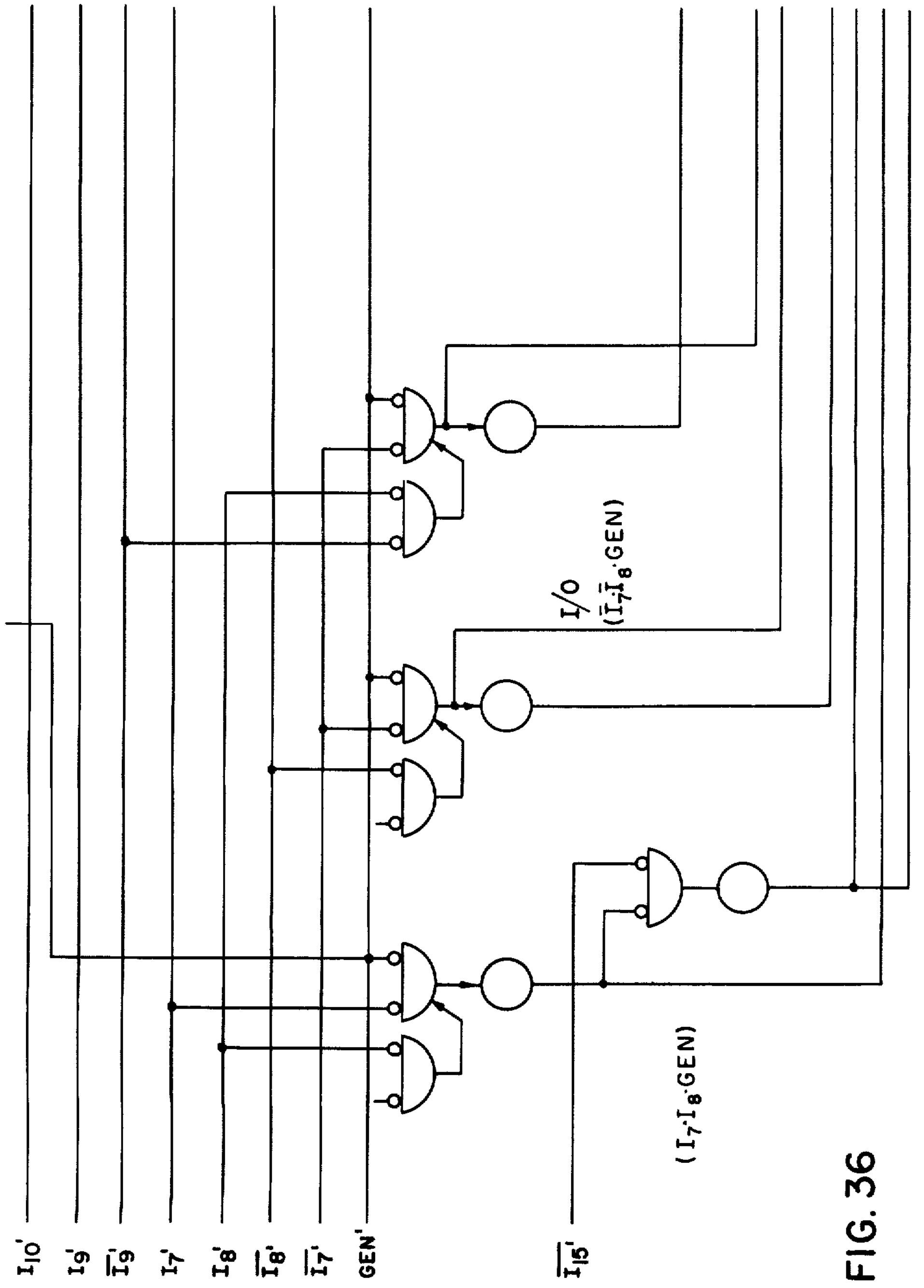
Figures 37, 40:
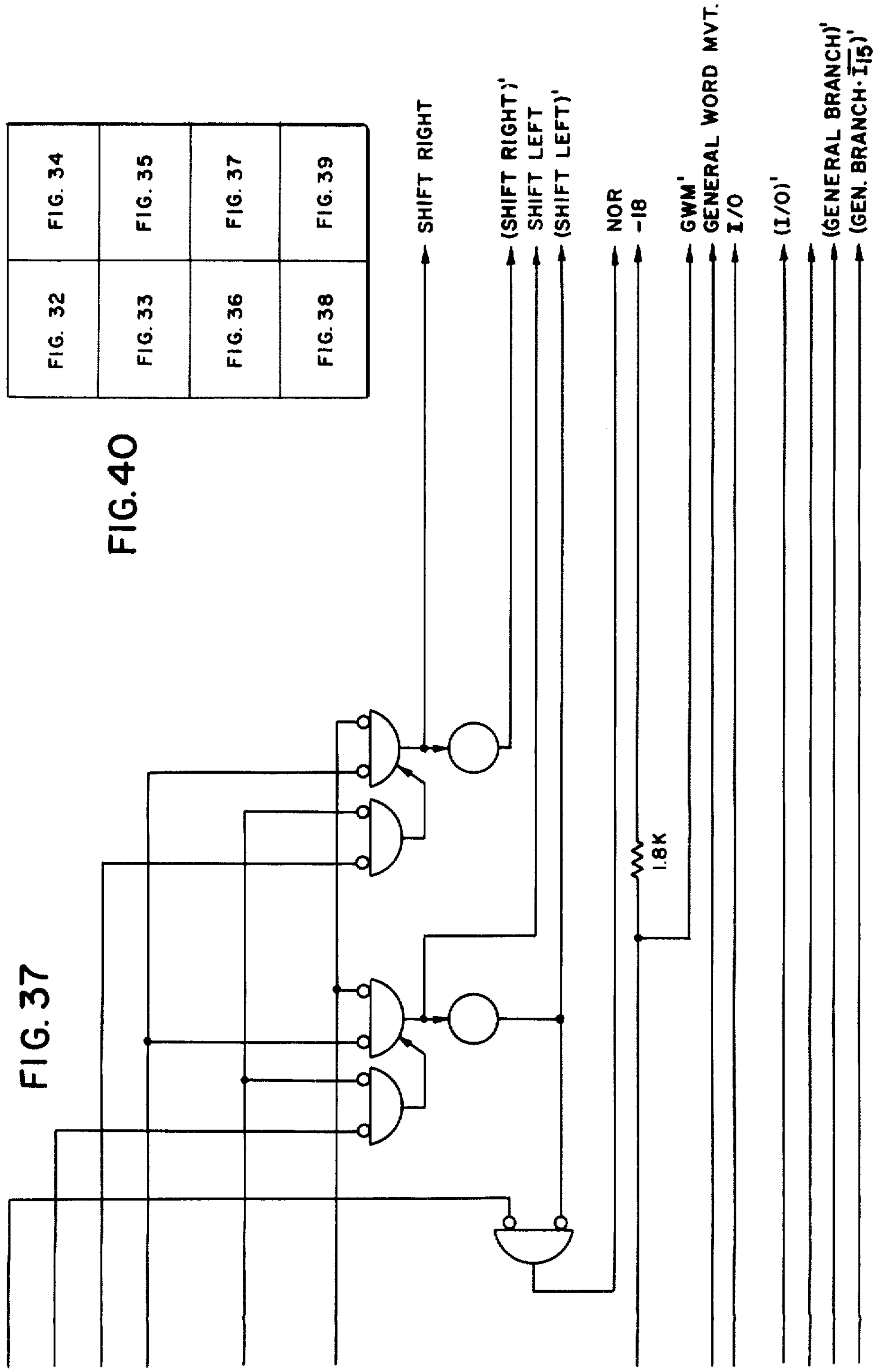
Figure 38:
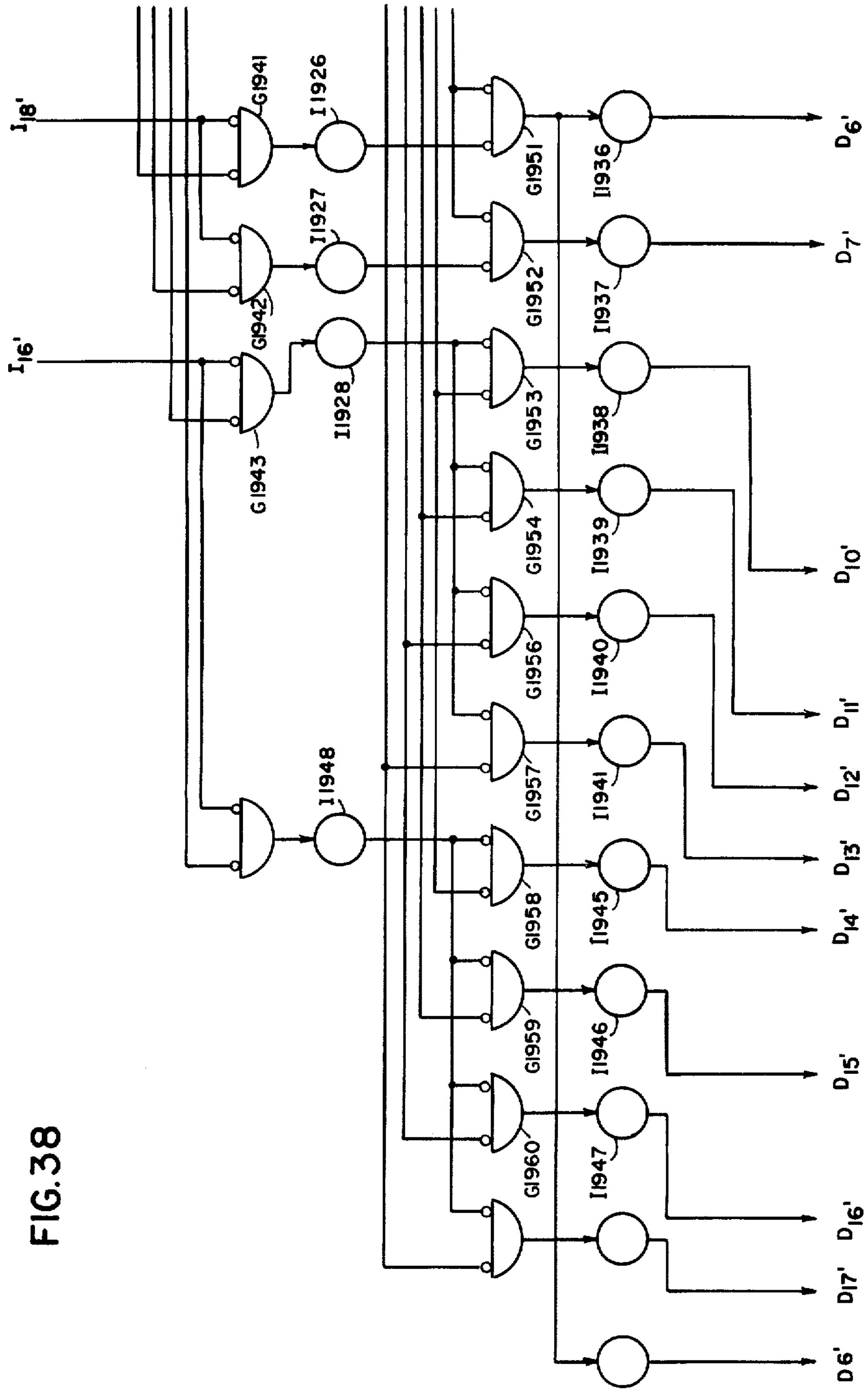
Figure 39:
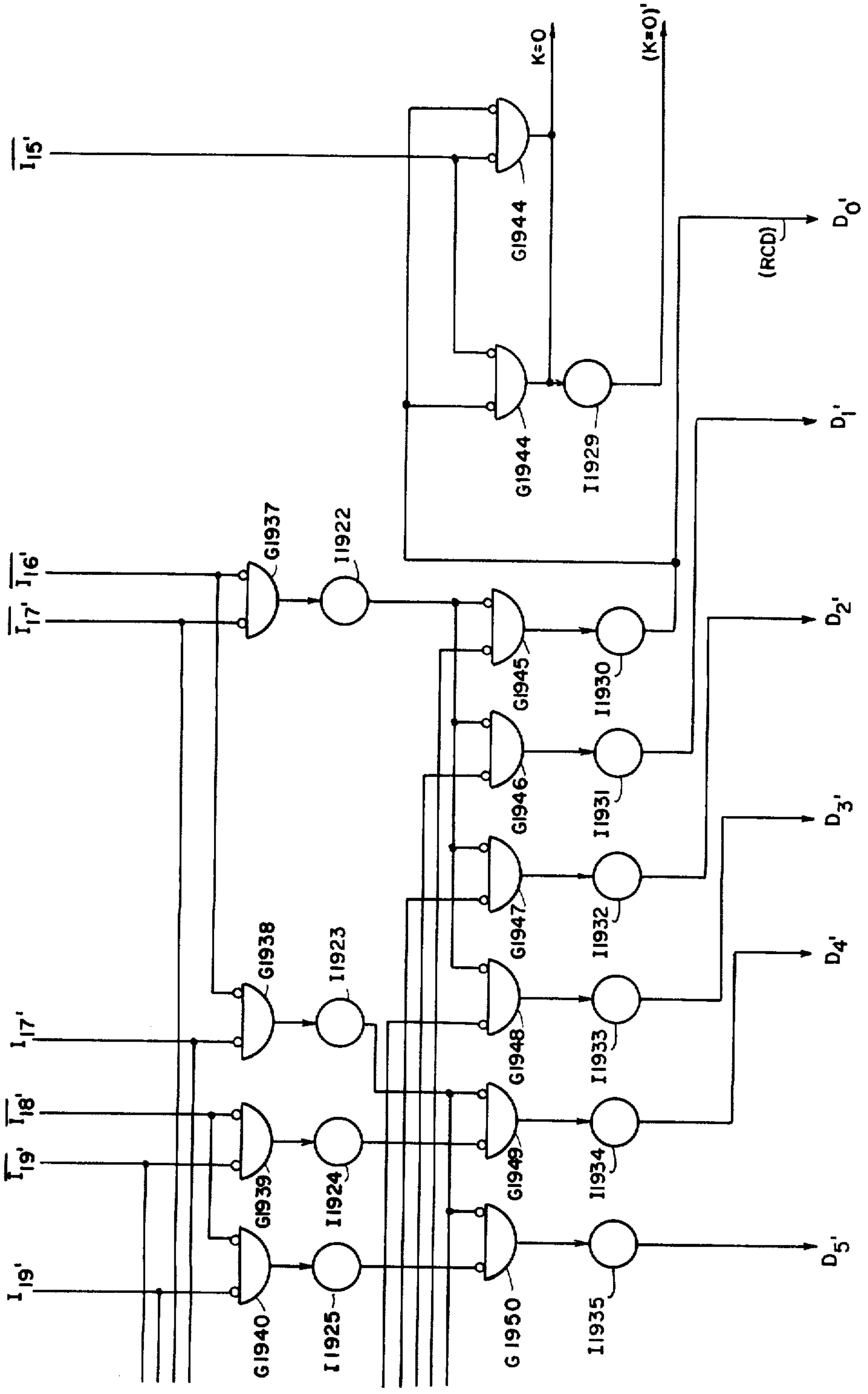
Figure 41:
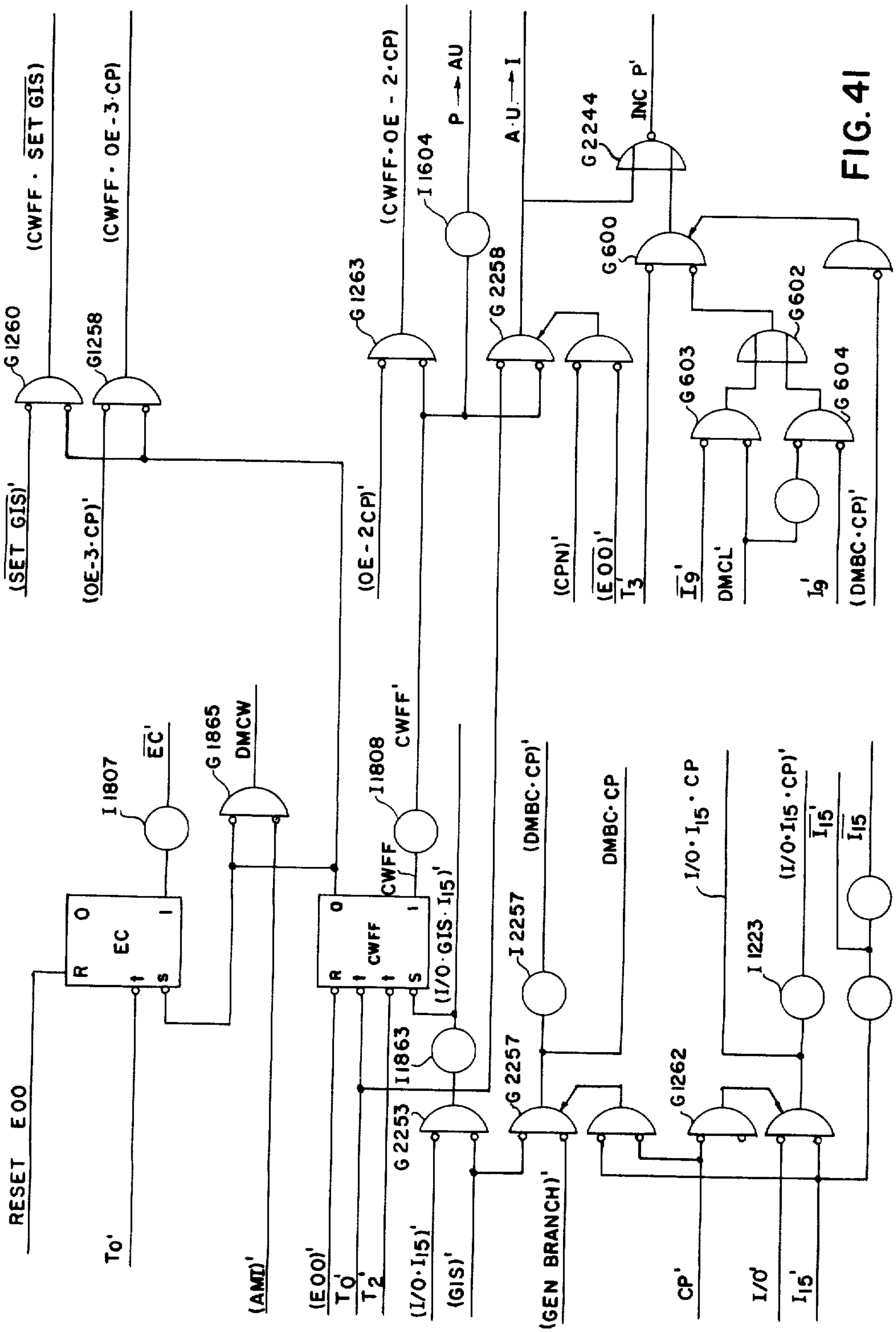
Figures 42, 43:
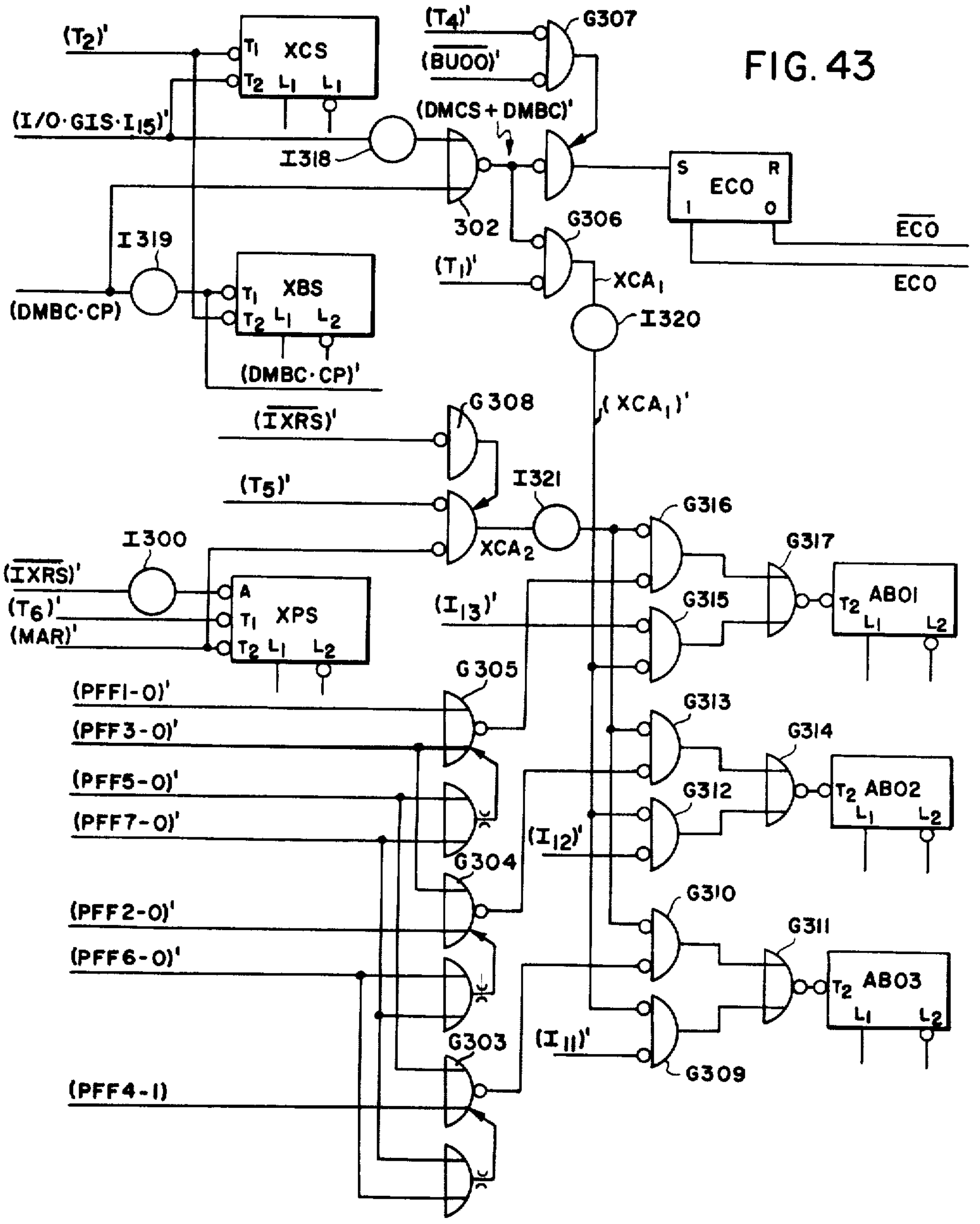
Figure 44:
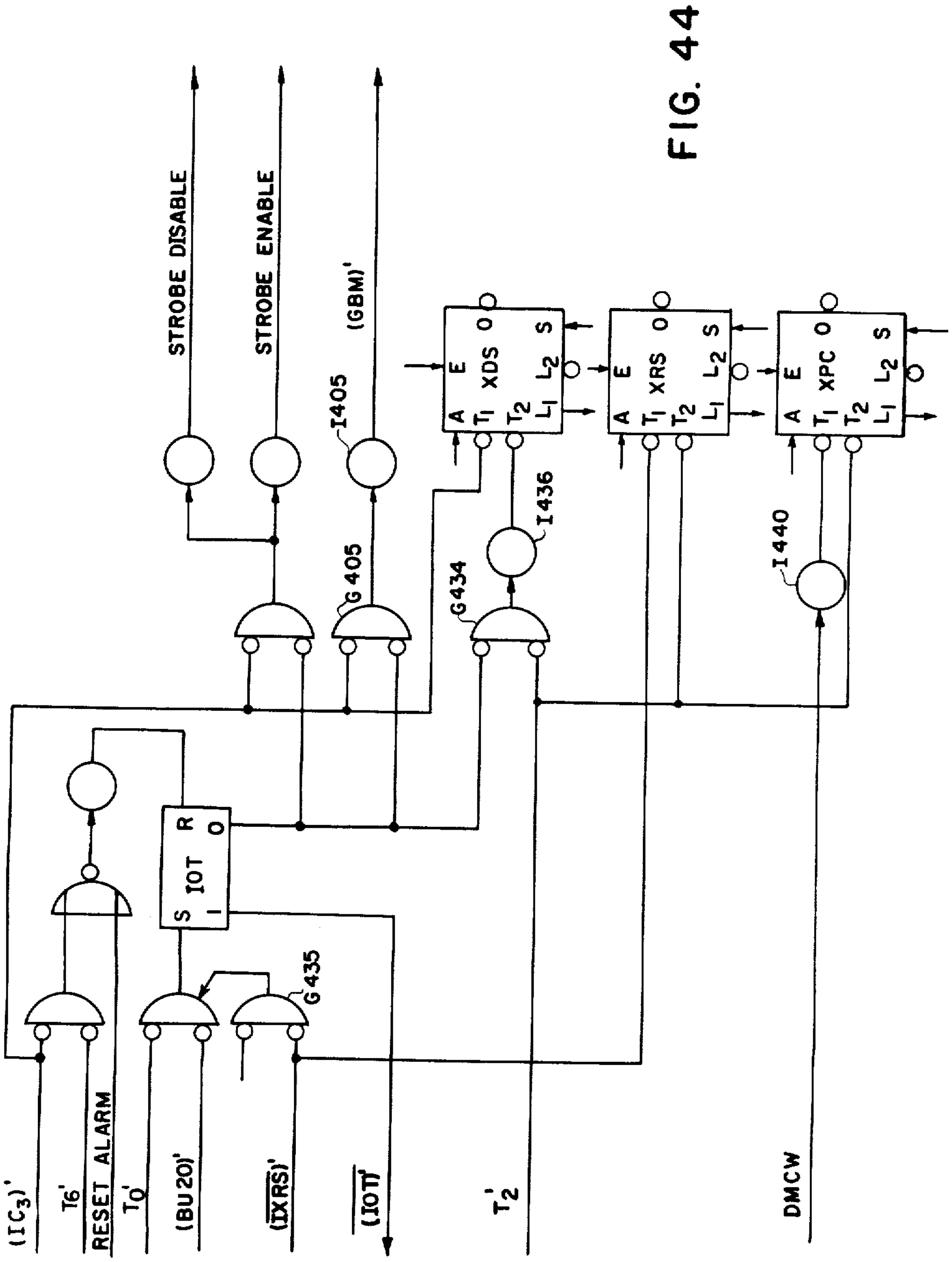
Figure 45:
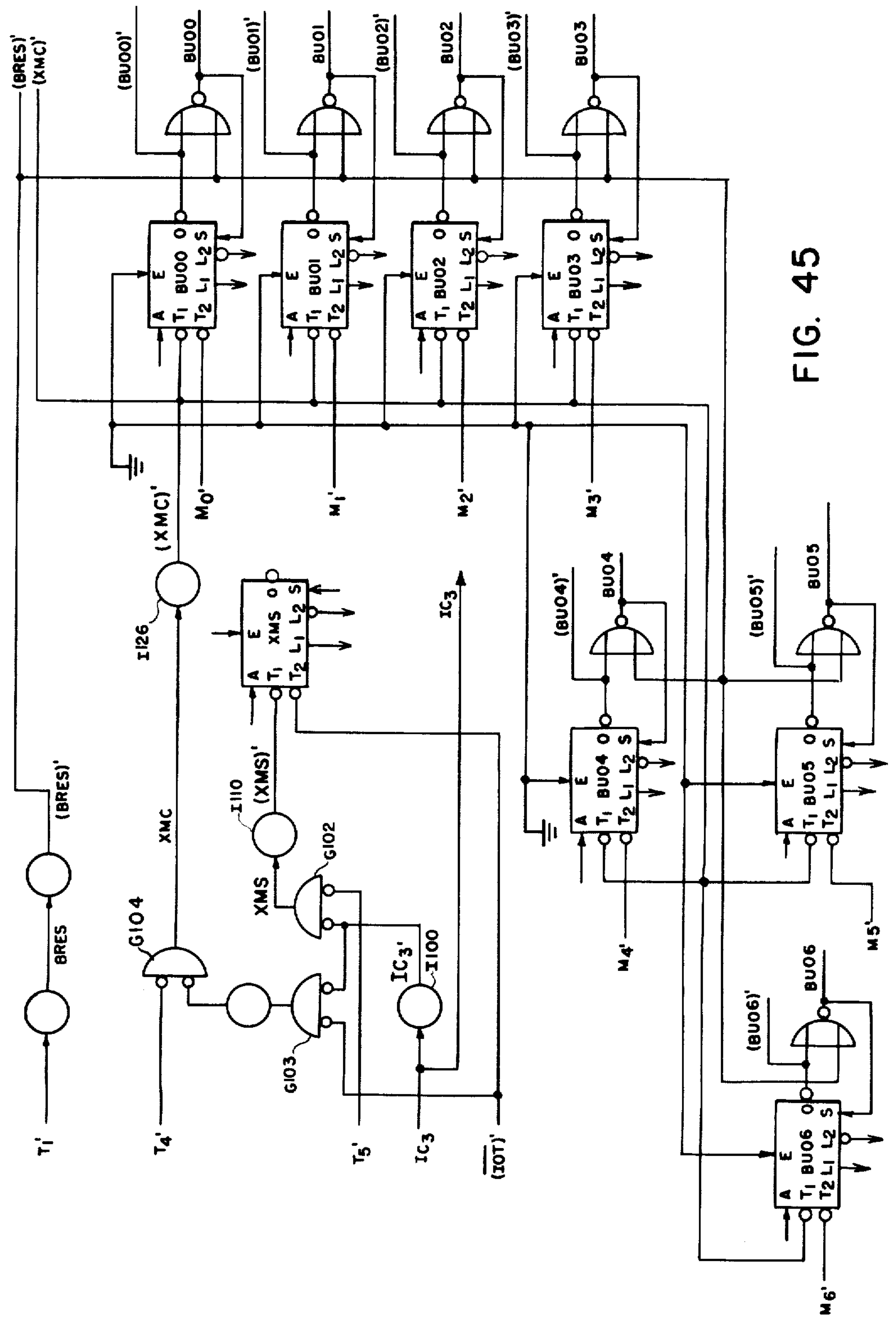
Figures 46, 47:
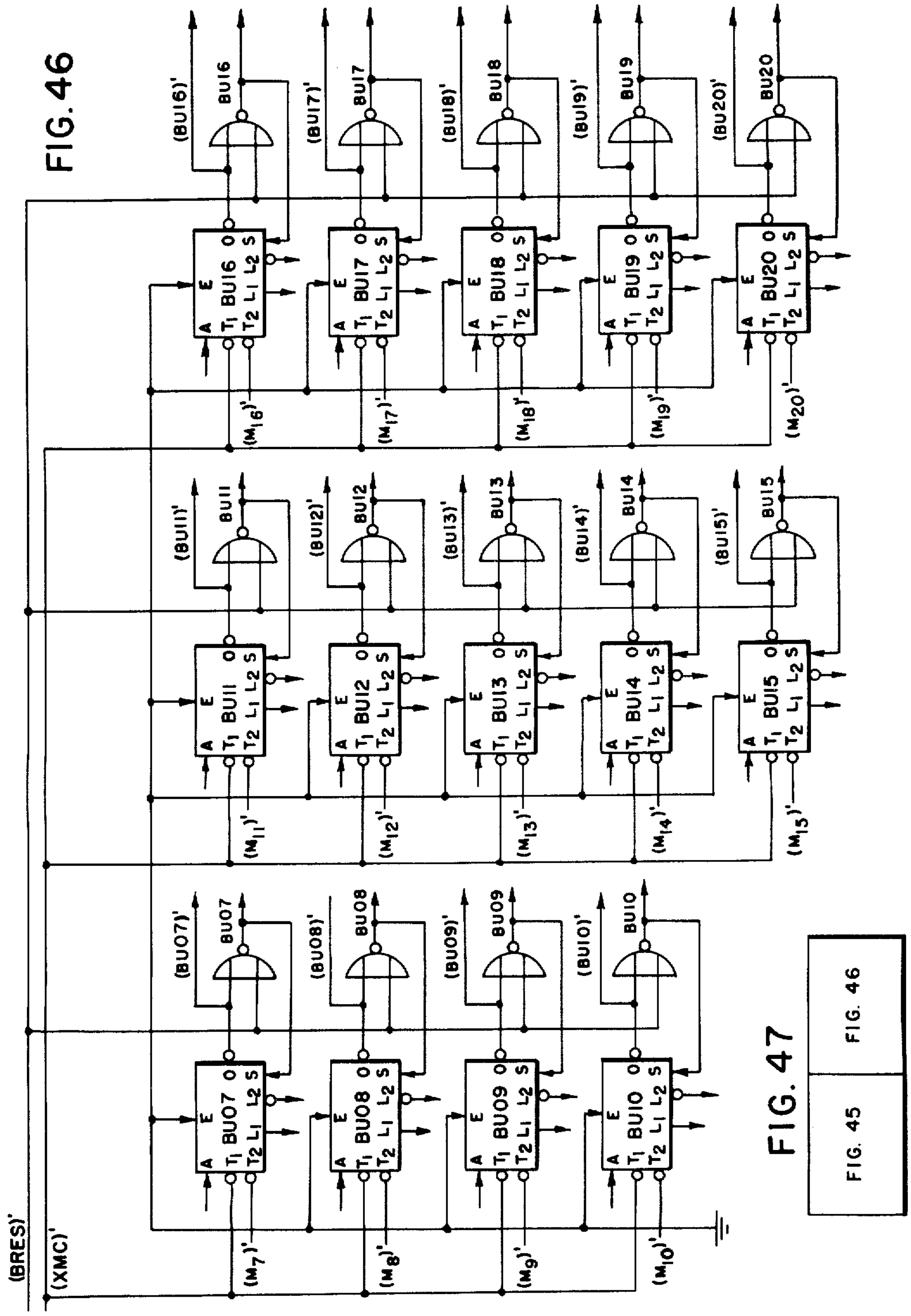
Figures 48, 51, 52:
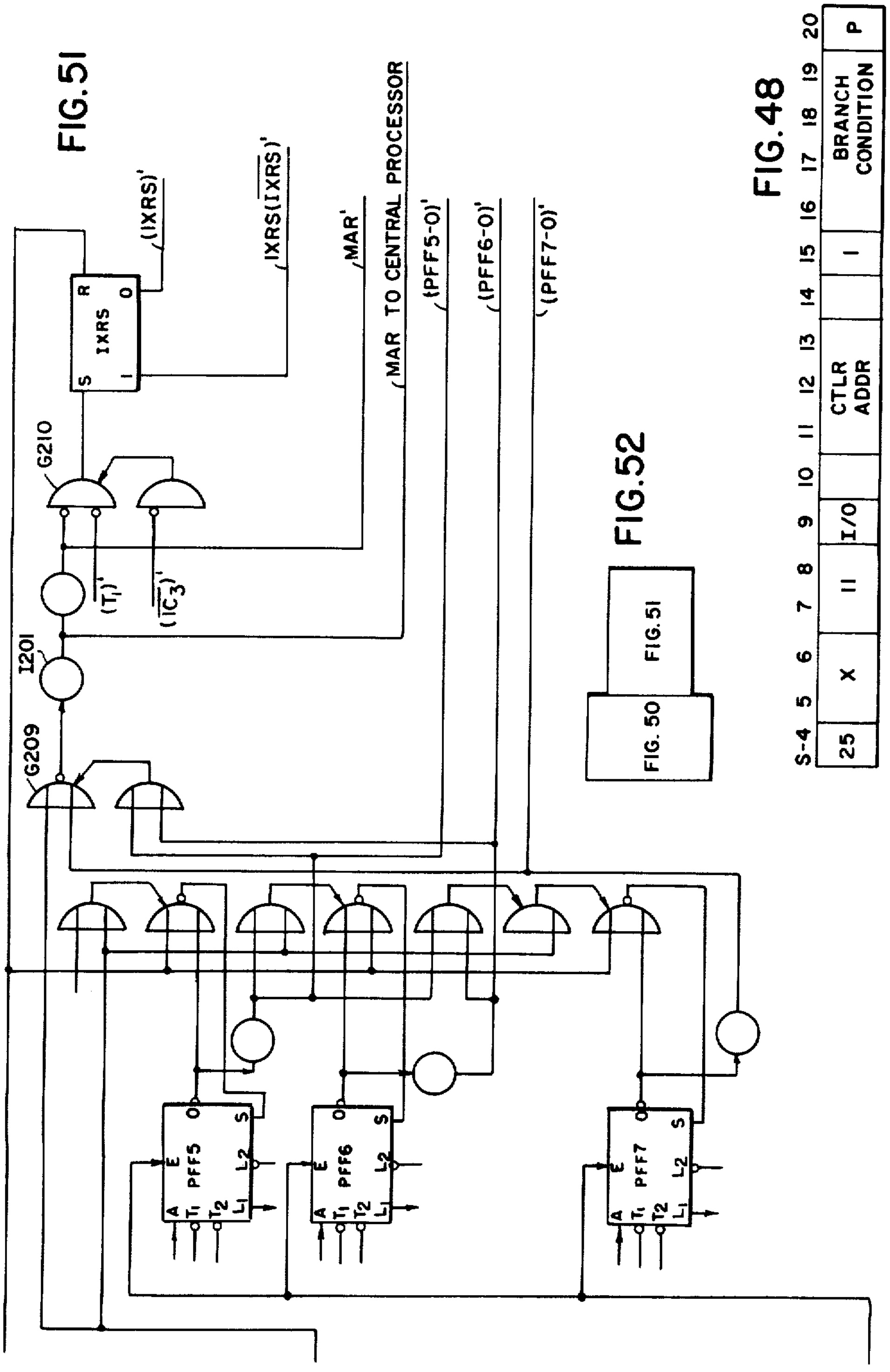
Figure 49:
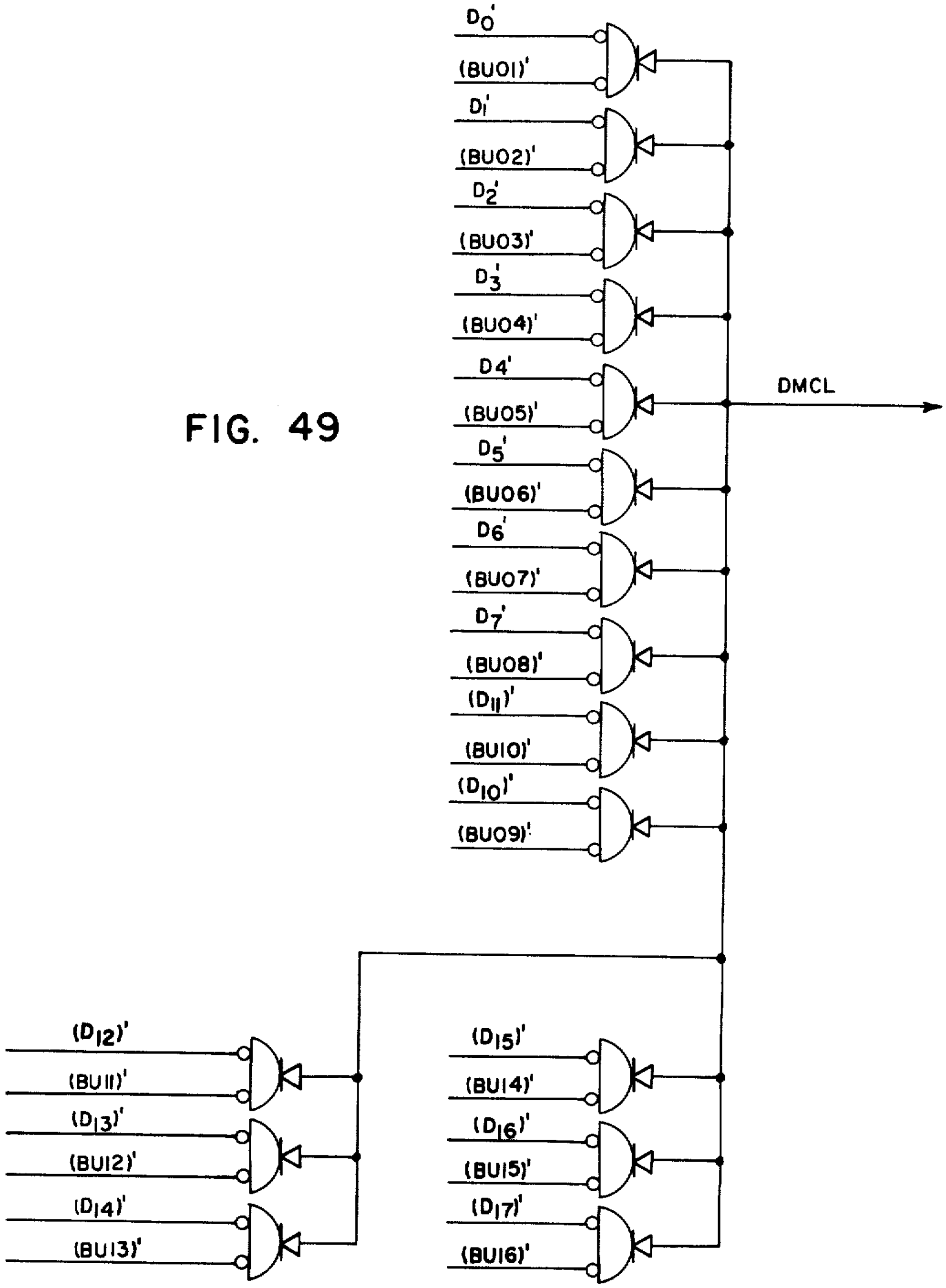
Figure 50:
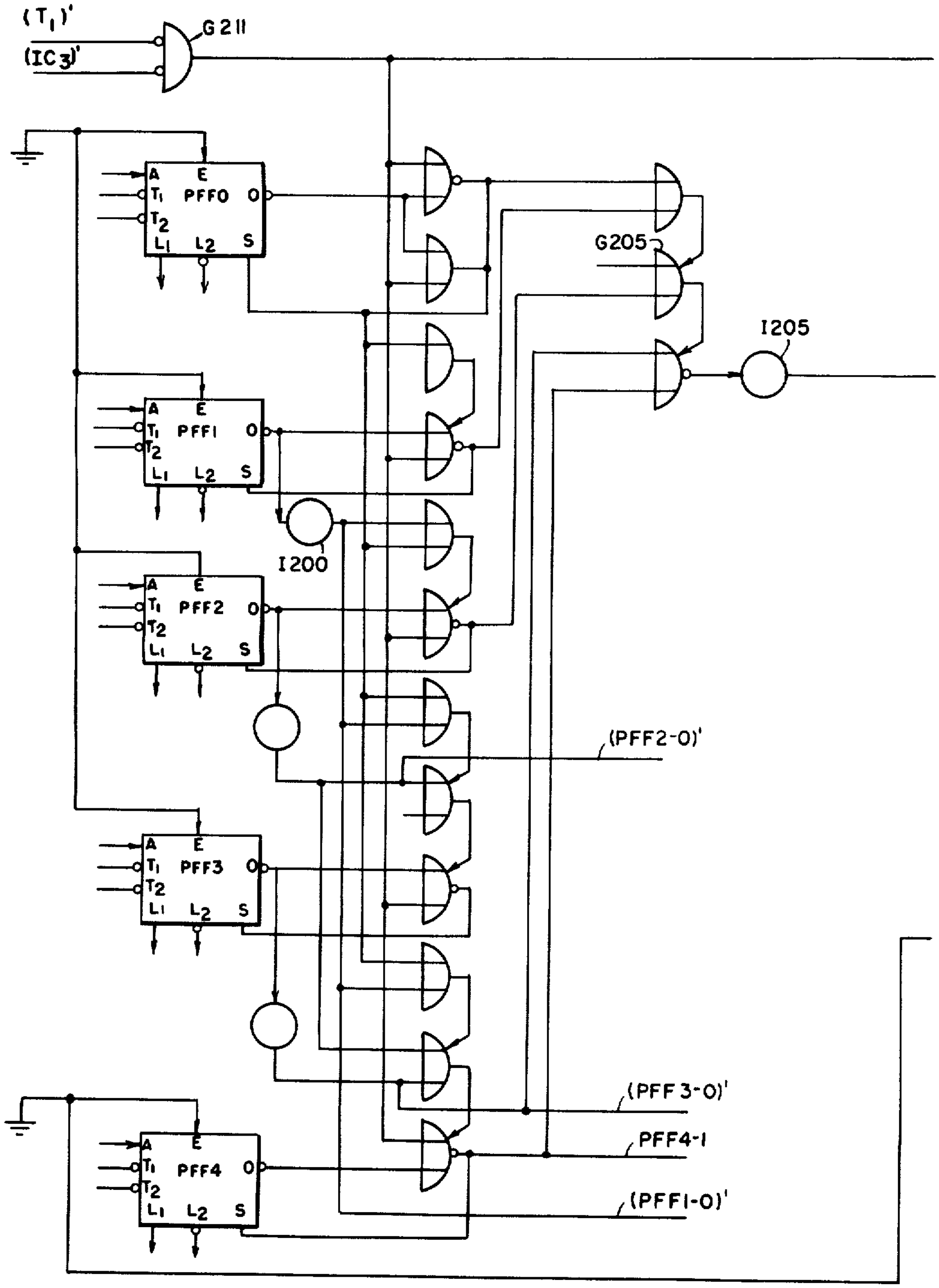
Figures 53, 55:
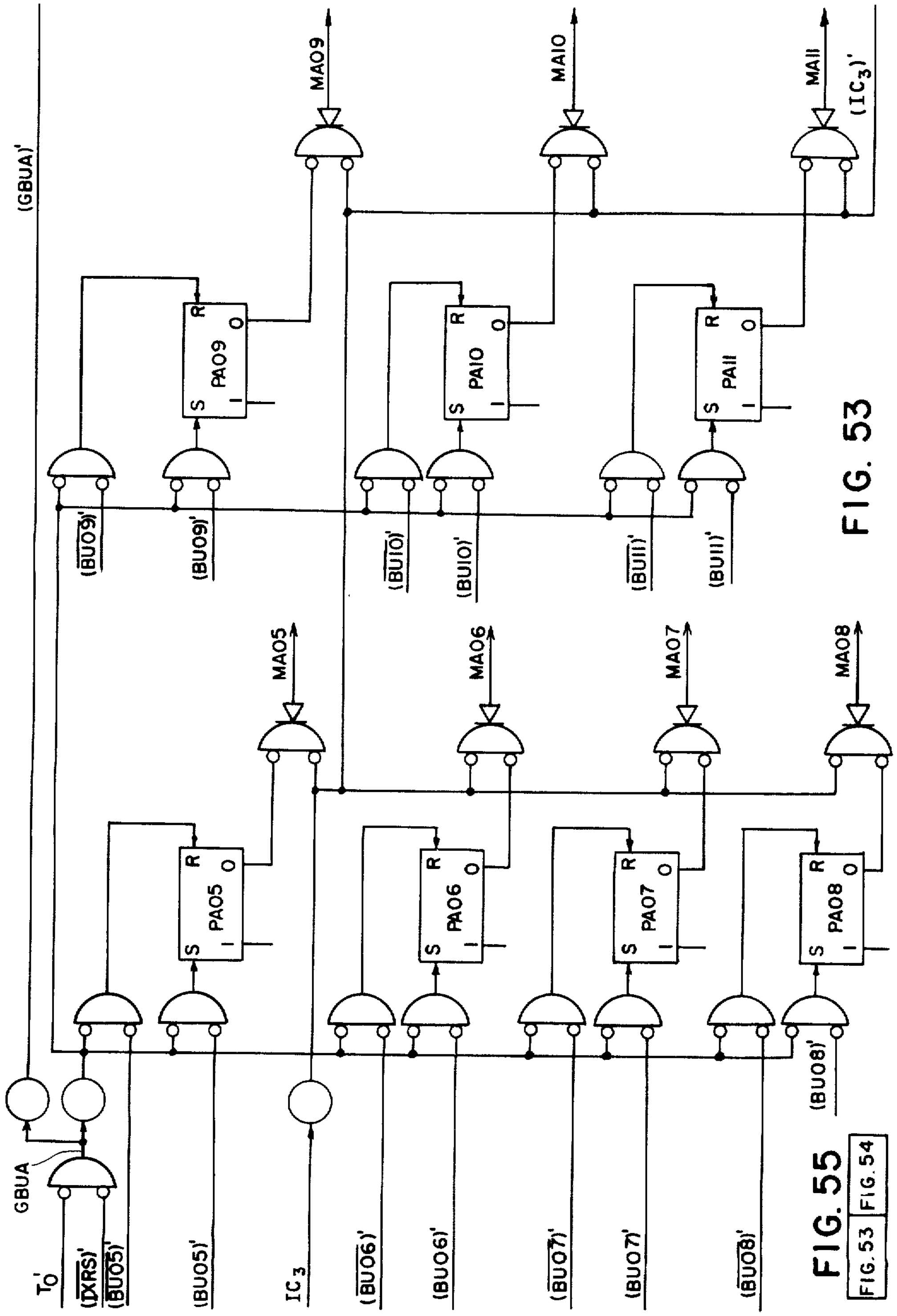
Figure 54:
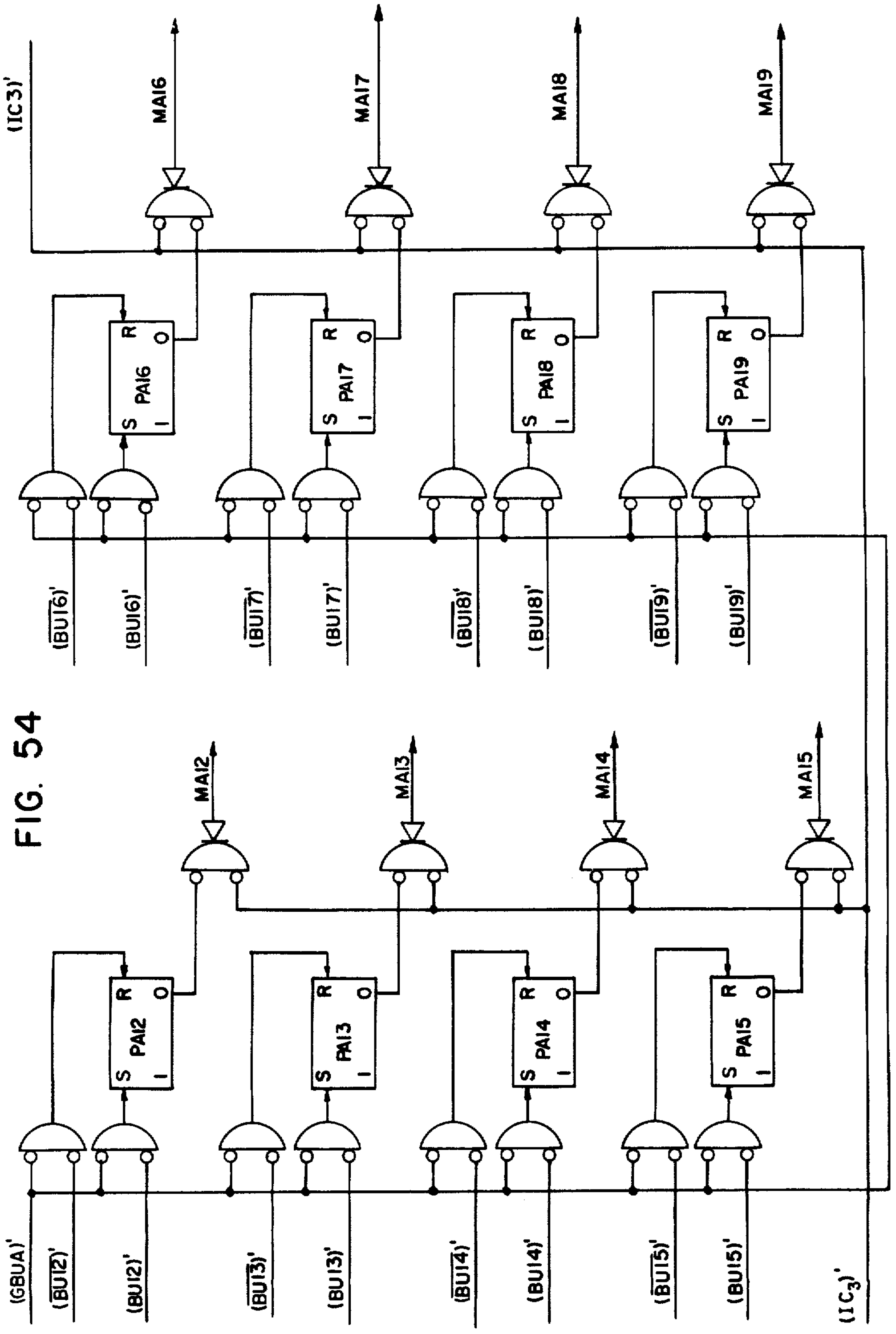
Figure 56:
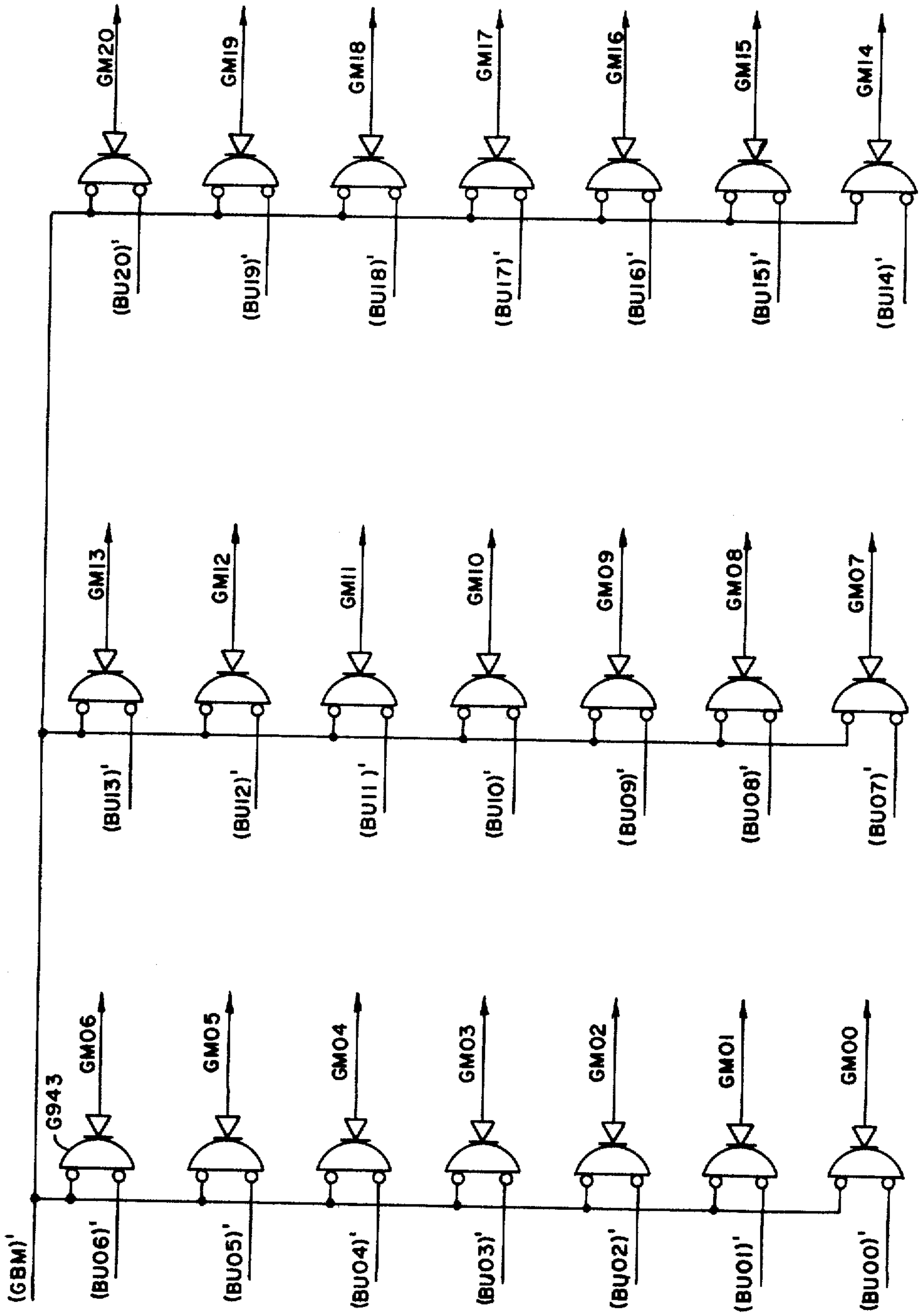
Figure 57:
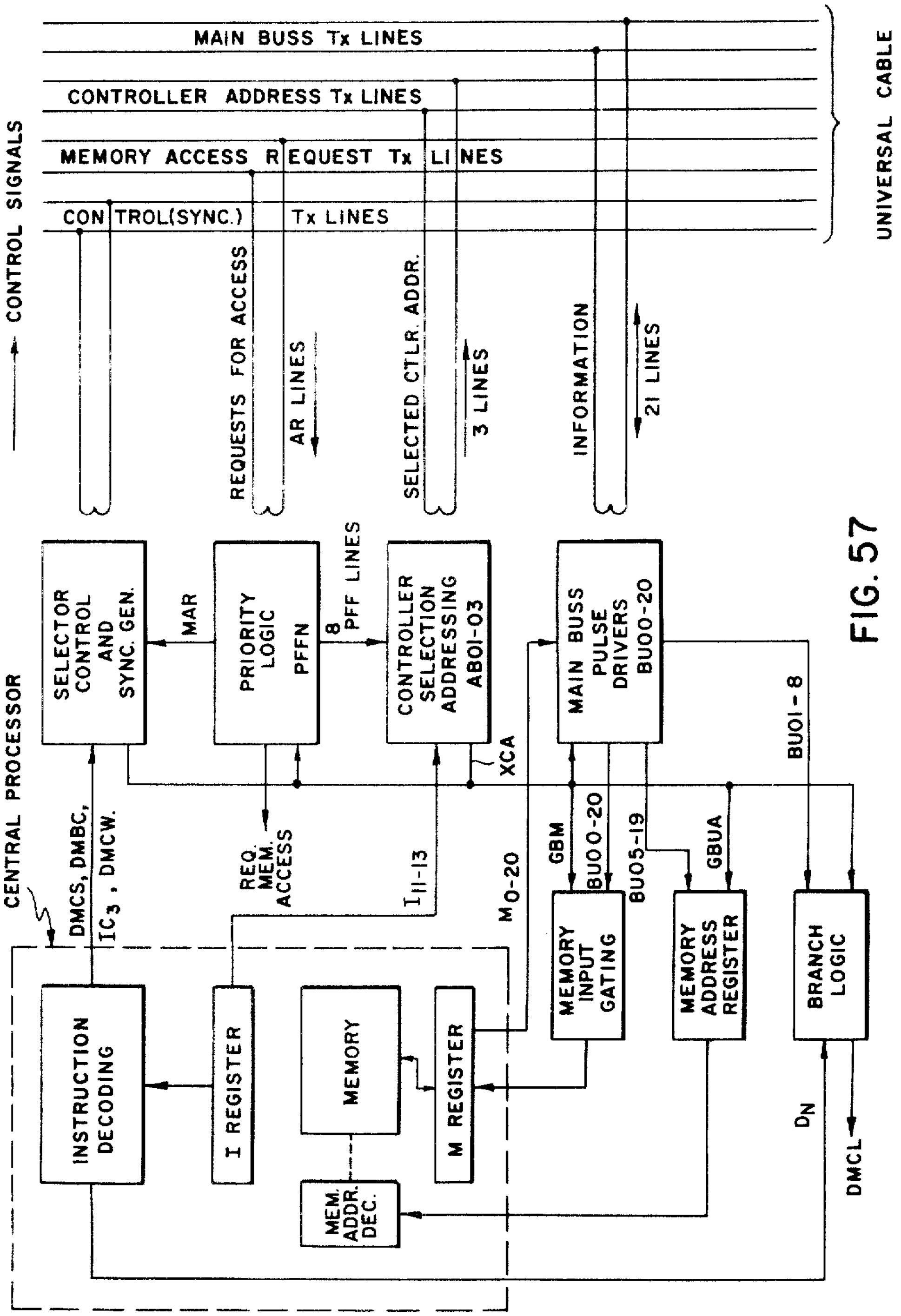

FIG. 30 is a logical diagram of the circuit arrangement of the $I_{15}$ to $I_{19}$ flip-flops of the I register;

FIG. 31 is a logical diagram of the circuit arrangement for generating a control signal in the I register control which is utilized in the controller selector;

FIGS. 32 to 39 taken together as in FIG. 40 is a logical diagram of the instruction decoding arrangement in the central processor;

FIG. 41 is a logical diagram illustrating the tie-in between the central processor and the controller selector;

FIG. 42 indicates the format of a general instruction;

FIG. 43 is a logical diagram of the addressing logic of the controller selector;

FIG. 44 is a logical diagram of the arrangement for generating several control signals utilized in the controller selector;

FIGS. 45 and 46 taken together as in FIG. 47 is a diagram of the main buss of the controller selector;

FIG. 48 shows the format of a branch instruction;

FIG. 49 illustrates the comparison arrangement for determining a branch operation;

FIGS. 50 and 51 taken together as in FIG. 52 illustrate the priority arrangement in the controller selector;

FIGS. 53 and 54 taken together as in FIG. 55 is a logical diagram of the memory register of the controller selector;

FIG. 56 is a logical diagram which illustrates the arrangement for transferring information from a peripheral controller to the memory in the central processor through the controller selector; and FIG. 57 is a block diagram of the controller selector.

Figure 1:
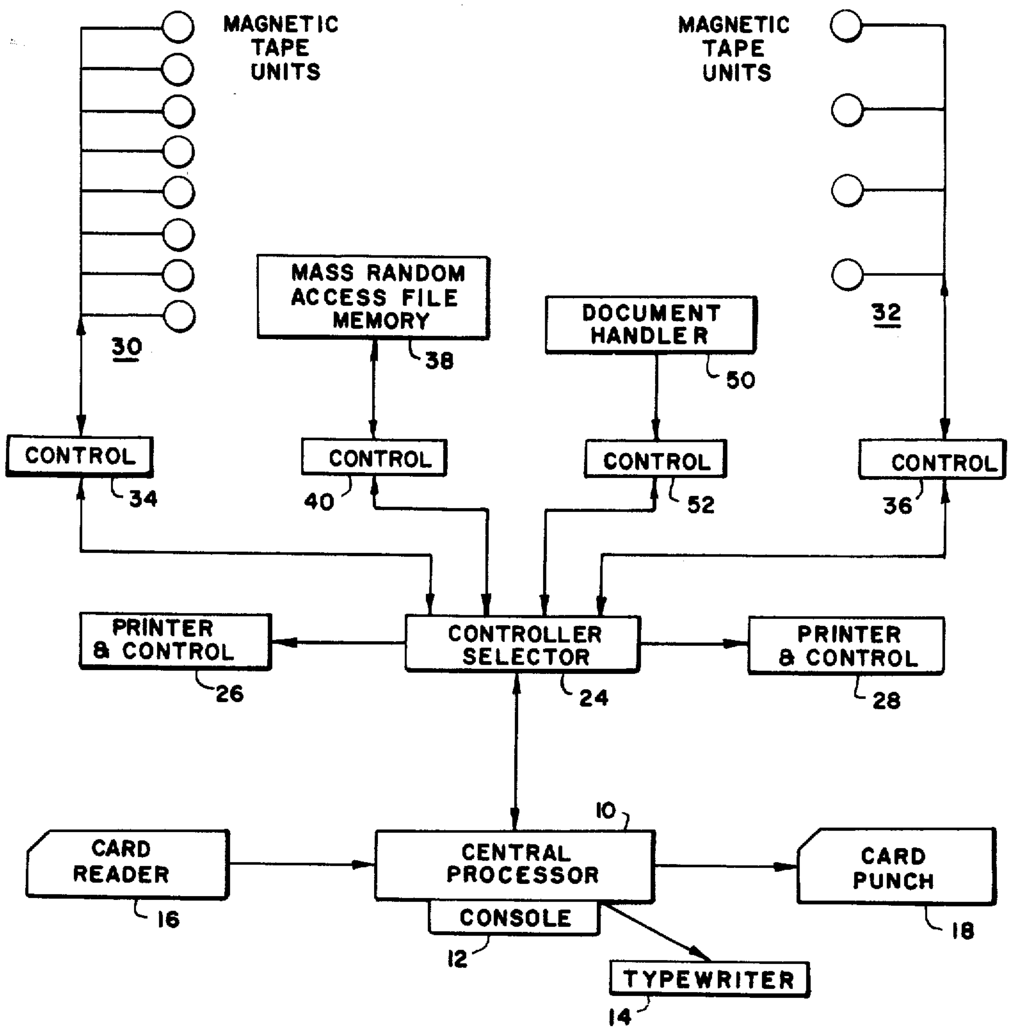
FIG. 1 is a block diagram of the data processing system of the invention.

Referring now to FIG. 1, the central processor 10 may suitably be a single address, stored program, general purpose digital computer which is capable of processing both alphanumeric and binary information. The central processor performs the computation (arithmetic), fast random access memory storage, and control functions for the system. The programs to be executed and the data to be immediately operated upon are stored in a suitable memory such as a three dimensional core memory wherein each core, depending upon its direction of magnetization, represents a binary digit (bit) of an instruction or data word, a word being the basic unit of addressable information in the memory.

The control exercised by the console 12 is of a manual nature in contradistinction to the control function performed by central processor 10 and need not be necessarily operative in normal program execution. Such manual control is essentially concerned with initially loading the program into the memory, initiating the execution thereof, monitoring the progress of a program via a console typewriter 14 and enabling the halting of the program for checking or for other purposes. The typing out of information on console typewriter 14 may suitably proceed at a rate of about ten characters per second. Information may be numeric or alphanumeric.

The card reader 16 is an on-line input device utilized in the system to read punched card information into the central processor's memory. For example, the reading of standard 80-column punched cards may proceed at a rate of about 400 cards per minute. Information on these cards may be recorded in either binary column or alphanumeric code, the interpretation of the data punched in the card being determined by the particular mode of the "read cards" instruction being executed by central processor 10. Card reader 16 is controlled by the control function of central processor 10.

The card punched 18 is suitably an on-line device wherein card punching may be effected in either binary or alphanumeric code at a rate suitably of about 100 cards per minute. Card punch 18 is controlled by the control function of central processor 10.

The ability of the system to incorporate a plurality of different peripheral devices is accomplished by means of a common connecting device, i.e., a controller selector 24 which performs a "data mating function." The controller selector is a common control and transfer point for the peripheral units, for example, as shown in FIG. 1, of high speed printers 26 and 28, magnetic tape systems 30 and 32 and their associated controllers 34 and 36 respectively, a mass random access file memory 38 and its associated controller 40, and a document handler 50 and its associated controller 52. It is noted that high speed printers 26 and 28, the document handler 50, the mass random access file memory 38, and the magnetic tape units 30 and 32 all have associated therewith controllers which are operatively associated with the controller selector. Thus, controller selector 24 permits the easy addition of peripheral equipment as the needs of a particular situation grow and the addition of new input-output devices with little, if any, logic or wiring changes.

Figures 2, 3, 4, 5, 6:
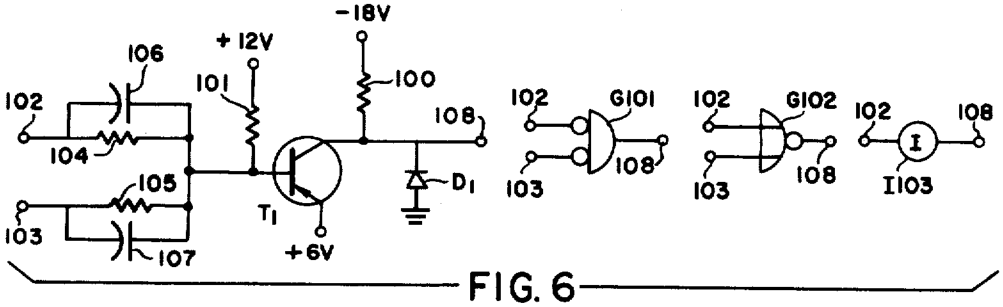
FIG. 2 is a depiction illustrating a data word comprising alphanumeric characters.
FIG. 3 is a diagram showing a binary data word.
FIG. 4 is a depiction illustrating an instruction word.
FIG. 5 is a diagram illustrating the first word of a general instruction.
FIG. 6 shows a schematic diagram of a basic functional circuit employed for the logical AND, OR and inverting functions and illustrates the various symbols employed to represent these functions of the circuit.

*Data word.*—In the illustration shown in FIG. 2, the symbolic code of the word B62, for example, in binary coded decimal form appears as shown therein. It can be seen from FIG. 2 that the most significant bit positions, viz., zero and one, are available to hold other information while bit positions two through nineteen store the three six-bit binary coded decimal digits.

For arithmetic operations, the computer operates in the binary mode in order to capitalize on the advantage of high speed versatile command structure and ability to handle data in binary as well as decimal and alphabetic forms. A binary data word consists of nineteen binary digits plus a sign bit. For example, as shown in FIG. 3, pure binary 49 may be represented as shown therein.

*Instruction word.*—An instruction word in the system of this invention is a single address word consisting of 20 bits. The basic format of the instruction word is shown in FIG. 4. In this figure, bits zero through four designate the operation which is to be performed (OP code), bits five and six are address modification or indexing bits, and bits seven through nineteen indicate the operand address in the memory of the central processor.

The significance of the instruction bits 7 through 19 varies depending upon the particular operation specified by the operation code. They may be utilized to elaborate the exact operation to be performed when no memory address is associated with the execution of an instruction. For example, word transfers between internal registers of the central processor do not require an operand address. Other instructions such as shift commands may require only bit positions fifteen through nineteen to indicate the length of the shift. Such use of the available bit positions of the operand address field extend the instruction repertoire of the system far beyond the maximum of thirty-two operations which would be permitted by the five bit positions of the operation code. The type of instruction which makes use of these additional bits to further specify the operation may suitably be referred to as a "general" instruction.

The number 5 and 6 bits of an instruction word may be employed for the automatic modification of the instruction before its execution. One of three modification words may be selected and the contents thereof added to the operand address portion of the instruction word. These three modification words are in chosen locations of the memory of the central processor, viz., locations one, two and three. Thus, as shown in FIG. 5, a combination 01 for bits 5 and 6 may effect the selection of memory location 1; a bit combination 10 may effect the selection of memory location 2; and a bit combination 11 may effect the selection of memory location 3. A 00 combination may indicate no address modification.

CIRCUITS

Prior to describing an illustrative embodiment of this invention, functional circuits which may be suitably utilized to effect its operation are first described. Symbols which are employed to represent the functions which the circuits provide in the logic diagrams are described in reference to their respective associated circuits. It is, of course, to be realized that these specific circuits which are shown are intended only to be illustrative and other known circuits may be suitably employed for the same functions.

The logic diagrams employ functional circuits, the output signals of which have two voltage levels, such levels representing the binary digits one and zero respectively. The voltage level which represents the binary digit "one" is chosen to be zero volt and the voltage level which represents the binary digit "zero" is chosen to be +6 volts. Accordingly, the binary complements of the binary one and zeros are zero and one respectively and are represented by the respective levels of +6 volts and zero volt. In other words, a zero volt signal represents a binary digit one which is the same as a complement of a binary digit zero and a +6 volts signal represents a binary digit zero which is the same as a complement of a binary digit one. As will be seen hereinbelow, whether a given signal represents a true binary digit or its complement may depend upon its position or level in a given logic diagram. For instance, a +6 volts signal which represents a binary zero at an input terminal of an inverter appears at the output terminal of the inverter as a zero volt signal representing the binary complement of the binary zero.

In this invention, the circuit elements employed to provide the AND and OR functions inherently provide an inverting or complementing function so that in order to derive a logical AND signal (AB) of two signals A and B at the output terminal of an AND gate, it is necessary to energize the input terminals of such gate with the complementing signals A′ and B′. Only a complementary logical OR signal ($A'+B'$) may be derived from an OR gate. To obtain a true logical OR signal ($A+B$), it is necessary to connect an inverter in cascade with the OR gate and thereby derive the logical OR signal ($A+B$) from the output terminal of the inverter.

Logic circuits which embody inherently an inverting operation are generally referred to as NOR circuits since such circuit is intrinsically neither an AND gate nor an OR gate. Consequently, when NOR logic circuits are pyramided, i.e., cascaded, such inherent inverting operation at each level is often cancelled since pyramided logic normally consists of alternate levels of AND and OR functions. Thus, for example, to obtain a signal which is represented by the expression, $(A+B)$ $(C+D)$ which signifies A or B and C or D, two OR gates, each having two input terminals are connected to drive to separate input terminals of an AND gate. The respective input terminals of the OR gates are energized by the signals A, B, C and D. The signal output of one OR gate may be represented by the expression $A'+B'$ and the output signal of the other OR gate may be represented by the expression $C'+D'$. The two expressions $A'+B'$ and $C'+D'$ are combined in the AND gate to derive the desired expression $(A+B)$ $(C+D)$. In this situation, it is seen that because of the double inversion through the two levels of logic, the inverting functions inherent in the OR gates and the AND gate cancel each other.

*Basic functional circuit*

The basic functional circuit from which many of the various circuits employed in this invention are constructed consists of a common emitter transistor amplifier which, when used by itself, may provide an AND function, an OR function or an inverting function. A circuit diagram and the three distinct symbols employed to represent the three different functions performed by the circuit are shown in FIG. 6. The circuit includes a PNP junction transistor $T_1$ of a type suitable for general digital circuit purposes and having its emitter connected to a source of +6 volts, its collector connected to a source of −18 volts through a load resistor 100 and its base connected to a bias source of +12 volts through a resistor 101. The collector of the transistor is clamped to ground by a diode $D_1$ whereby the potential at the collector does not go below ground potential when the transistor is at cutoff. When the transistor conducts, its collector potential rises to substantially +6 volts. Two input terminals 102 and 103 are coupled to the base of the transistor by resistors 104 and 105, resistors 104 and 105 being connected in parallel arrangement with capacitors 106 and 107 respectively. Depending upon the logic signal levels applied to the input terminals of the circuit of FIG. 6, the circuit may function as either an AND gate or OR gate with signal inversion in each instance and as a conventional inverter.

Throughout the system of this invention, each basic functional circuit has applied to its input terminal either a zero volt signal or a +6 volts signal to consequently produce at its output terminal either a +6 volts signal or a 0 volt signal. The 0 volt signal output is established by conduction of current through the clamping diode $D_1$ when the transistor is at cutoff and the +6 volts output signal is produced through the transistor when it conducts. Since both the diode and the transistor, of necessity, have some internal impedance, the output signal levels will not be exactly 0 volt and +6 volts respectively. However, since their values are so close to the latter, they will be referred to hereinbelow as the aforesaid 0 volt level and the +6 volts level. As noted hereinabove, the +6 volts signal level represents a binary zero and the 0 volt level represents a binary one.

Symbols G101 and G102 in FIG. 6 represent elements which perform the respective AND and OR logic functions. The logic AND function is derived from the AND gate G101 when the input signals at both of the input terminals 102 and 103 are at a +6 volts level for only then may the output terminal 108 be driven to a 0 volt level. This is so since if either one of the input terminals 102 or 103 is at a zero volt level, the base of transistor $T_1$ is driven sufficiently negative with respect to the emitter to cause the transistor to conduct at saturation and thereby clamp the output terminal 108 to a +6 volts level. When both of the input terminals 102 and 103 are at a +6 volts level, the base and the emitter of transistor $T_1$ are at substantially the same potential so that transistor $T_1$ is at cutoff and diode $D_1$ is forward biased by −18 volts through load resistor 100 to clamp the output terminal 108 to ground potential. Accordingly, if the signal applied to either input terminal 102 or input terminal 103 is at 0 volt level, the output terminal 108 is driven to +6 volts. Since the 0 volt level represents a binary value of one, a bit one signal A or a bit one signal B produces an A′ or B′ signal at output terminal 108. Similarly, since a +6 volts signal represents a binary value of zero or the complement of a signal having a binary value of one, to obtain a signal representing the logical AND of signals A and B, the complements A′ and B′ have to be applied to input terminals 102 and 103.

The symbol I103 in FIG. 6 represents a basic functional circuit employed only for an inverting function. In this latter situation, only one input terminal is required for inversion, for example, input terminal 102. When a signal is applied to an input terminal, the signal at the output terminal 108 is the complement of the input signal.

*Multi-input logic gates*

Figure 7:
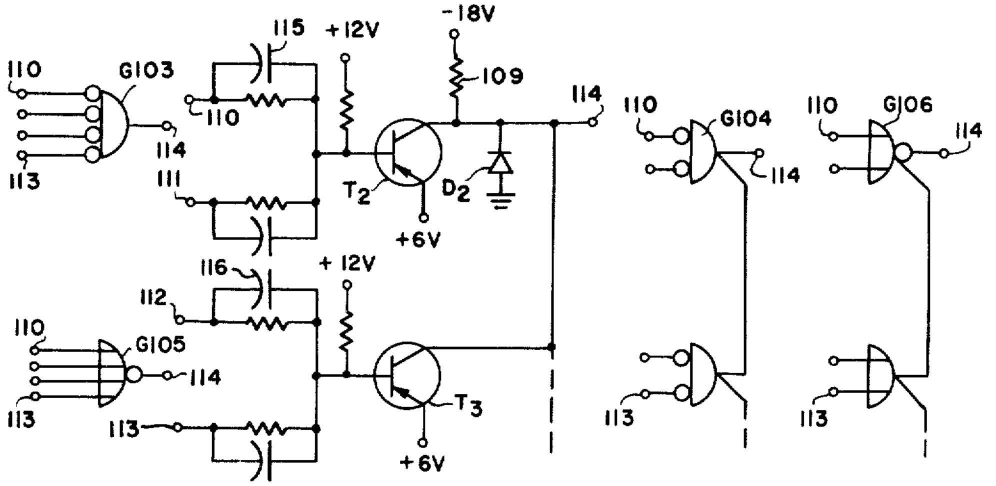
FIG. 7 illustrates a circuit diagram of a multi-input gate which may be employed for both AND and OR functions and the symbols employed to represent a multi-input gate.

In the system of this invention, when logic gates are required to combine more than two input signals, a plurality of two-input gates may be connected in parallel to provide the required number of input terminals. However, all of the basic circuit elements connected in parallel have to have a common load resistor connecting the collector electrodes of all of the transistors in the parallel connected circuits to a source −18 volts. A circuit diagram of a multi-input gate is illustrated in FIG. 7. It is seen in this figure that input terminals 110 to 113 are connected to the base electrode of PNP transistors $T_2$ and $T_3$, each of transistors $T_2$ and $T_3$ having a common load resistor 109. Only one diode $D_2$ is required to clamp the output terminal 114 to ground potential when transistors $T_2$ and $T_3$ are cutoff. If more than four input terminals are required, additional basic circuit elements may be connected in parallel, each having the common load resistor 109 and the common clamping diode $D_2$.

Symbols G103 and G104 are employed to represent a multi-input gate which provides an AND function and, similarly, symbols G105 and G106 are utilized to represent a multi-input gate which provides an OR function.

*Simple flip-flop*

Figure 8:
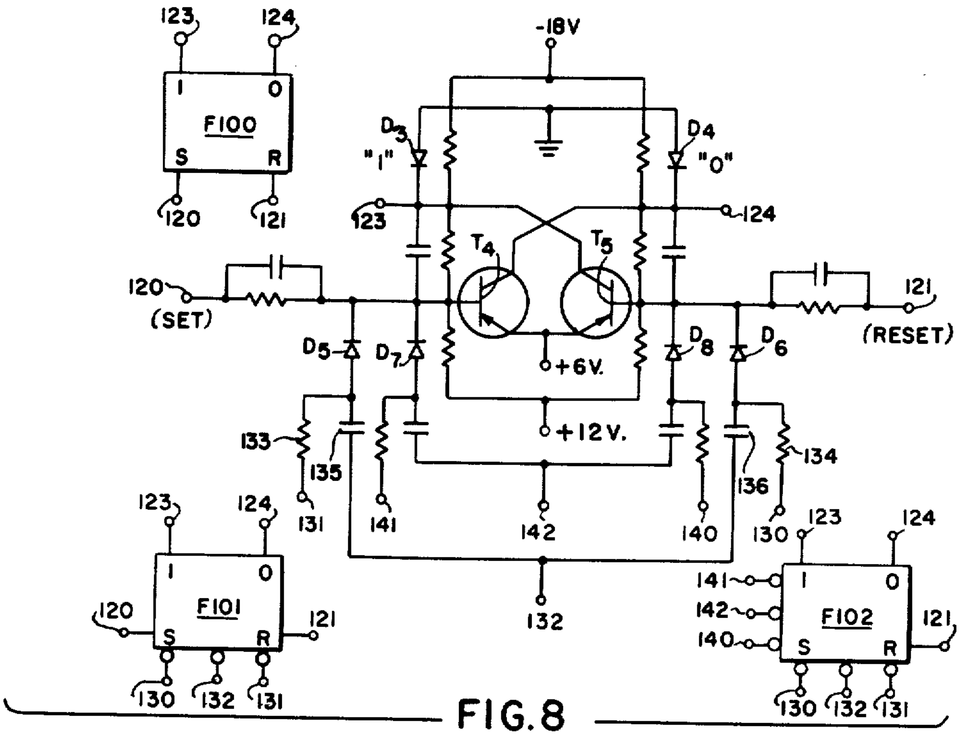
FIG. 8 illustrates a circuit diagram of a flip-flop having two trigger-pulse steering circuits, one or both of which may be eliminated as required, and symbols employed to represent a simple flip-flop circuit and flip-flop circuits having one or two steering input circuits.

As illustrated in FIG. 8, two basic functional circuits may be cross-coupled to provide a simple and conventional flip-flop circuit by connecting an input terminal of one basic circuit directly to the output terminal of the second basic circuit and by connecting an input terminal of the second basic circuit to the output terminal of the first circuit. The symbol F100, employed to represent a simple flip-flop, is also shown in FIG. 8.

A simple flip-flop constitutes a fundamental circuit element of a steered flip flop. The simple flip-flop consists of two transistors $T_4$ and $T_5$ respectively and includes all of the circuits schematically illustrated except steering circuits which are coupled to base electrodes of transistors $T_4$ and $T_5$ by diodes $D_5$ and $D_7$, and $D_6$ and $D_8$ respectively.

An input terminal 120 coupled to the base electrode of transistor $T_4$ may be arbitrarily denominated as the set input terminal. When such set input terminal is energized by a 0 volt signal, transistor $T_4$ is driven into conduction and transistor $T_5$ is driven into nonconductivity. While transistor $T_4$ is conductive, the flip-flop is in its "set" state and its true or "one" output terminal 123 is clamped at zero volts by a diode $D_3$. The false or "zero" output terminal 124 is consequently clamped to a source of +6 volts by the conducting transistor $T_4$. If a 0 volt signal is applied to a terminal 121 which may be arbitrarily denominated as the reset terminal, transistor $T_5$ is driven into conduction and transistor $T_4$ is rendered nonconductive thereby driving the flip-flop to its "reset" state and causing the true output terminal 123 to be clamped to a source of +6 volts by the conducting transistor $T_5$. Since output terminal 123 is the true output terminal, the reset flip-flop may be described as storing a binary value of zero when it is at the +6 volts level. Conversely, when true output terminal 123 is clamped to 0 volt by diode $D_3$, the set flip-flop may be described as storing a binary value of one. False output terminal 124 is always at a voltage level which represents the complement of the true binary value stored in the flip-flop.

*Single steered flip-flop*

A single steered flip-flop is represented by the symbol F101 shown in FIG. 8. It has a set steering input terminal 130, a reset steering input terminal 131 and a trigger input terminal 132. A positive going (0 to +6 volts) pulse is applied to the trigger input terminal 132 to set flip-flop F101 when the signal level applied to the steering input terminal 130 is +6 volts. Similarly, if the reset steering input terminal 131 is at a +6 volts level, a positive going pulse applied to trigger input terminal 132 resets the flip-flop.

When a +6 volts signal is applied to input terminal 130, a +6 volts signal is coupled by a resistor 134 to the anode of a diode $D_6$, the cathode of which is at about +6 volts so that a positive going trigger pulse applied to trigger input terminal 132 and coupled to the anode of diode $D_6$ by a capacitor 136 is transmitted to the base of transistor $T_5$ to render it nonconductive and drive the flip-flop into its set state. If a +6 volts signal is not applied to input terminal 130, the trigger pulse applied to the anode of diode $D_6$ is insufficient to drive the flip-flop into its set state.

Reset steering input terminal 131 is coupled to the anode of a diode $D_5$ by a resistor 133 so that when it is at a +6 volts level, a +6 volts trigger pulse applied to the trigger input terminal 132 and coupled to the anode of diode $D_5$ by a capacitor 135 is transmitted to the base of transistor $T_4$ to render it nonconductive and drive the flip-flop to its reset state. The complement of a binary signal applied to set steering input terminal 130 is normally applied to reset steering input terminal 131.

*Double steered flip-flop*

A second steering input circuit may be provided to steer a trigger pulse applied to a trigger input terminal 142 to the anode of the diode $D_7$ or the anode of the diode $D_8$ in response to signals applied to steering input terminals 140 and 141. A symbol F102 illustrated in FIG. 8 is employed to represent a double steered flip-flop. A double steered flip-flop may have either a direct set or direct reset input terminal or both in addition to two steering circuits. If the direct reset input terminal 121 is employed with such a flip-flop, the input terminals for the second steering circuit are shown on the set side as illustrated in the symbol F102. Similarly, if a direct set input terminal is employed, the input terminals of the second steering circuit may be shown on the reset side of the flip-flop symbol. In either case, the steering input terminals proximate to a common corner of the symbol will be associated with the set or the reset function as specified by either the letter S or R in the corner. For instance, in the symbol F102, both of the input terminals 130 and 140 proximate to the corner S are associated with the set function. The remaining steering input terminals 131 and 141 which are diagonally opposite each other are associated with the remaining function, the reset function in the instance of the illustrated symbol.

With regard to the above, transistor NOR circuits, single and multiple steered flip-flops, etc., useful for the system of this invention are disclosed in a standard text on transistorized digital logical components entitled "Design of Transistorized Circuits for Digital Computers" by Abraham I. Pressman, John F. Rider, Publisher, Inc., New York, 1959.

*Shift register*

Figure 9:
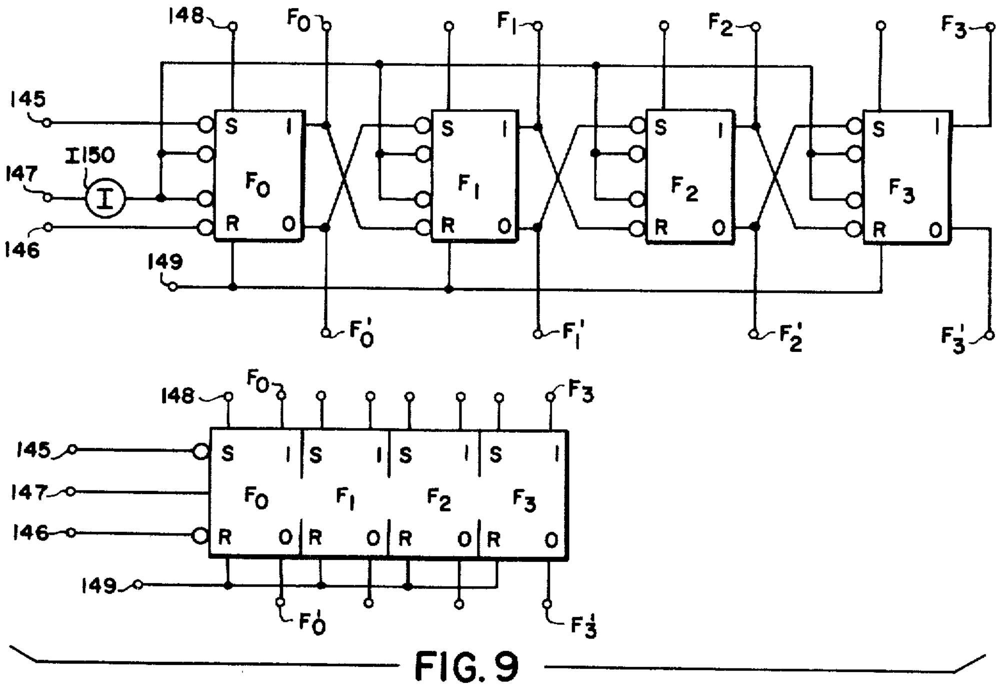
FIG. 9 is a schematic diagram of a shift register.

A shift register (FIG. 9) having as many stages as required may be provided by connecting, in cascade, a plurality of four-stage shift registers, one of which is illustrated in FIG. 9. Such shift register includes four steered flip-flops $F_0$ to $F_3$. If an odd number of stages is required in a shift register, or a number which is not a multiple of four, some flip-flops may be removed from the last of the cascaded four-stage shift registers.

The steering input terminals of each flip-flop are connected to the output terminals of an immediately preceding flip-flop so that a trigger pulse applied to all stages, in parallel, drives each stage to the stable state of its preceding stage. A steering input terminal 145 of the first flip-flop $F_0$ is connected to a source of data; a second steering input terminal 146 is connected to a source of the complement of the data signal applied to input terminal 145. The trigger input terminals of each of the flip-flops $F_0$ to $F_3$ are coupled to a common input terminal 147 by an inverter 1150. If a second four-stage shift register is connected in cascade, another inverter couples its trigger input terminals to the common input terminal 147. By employing inverters to couple the common trigger input terminal 147 to the trigger input terminals of the steering circuits in various stages of a large shift register, simultaneous triggering of each stage is provided without overloading the trigger pulse source connected to input terminal 147.

The inverters I150 are to be considered an integral part of a shift register so that negative going (+6 volts to 0 volt) shift pulses are required at input terminal 147.

For convenience of description, each shift register is identified by the same character which is employed to identify flip-flop stages. In the example in FIG. 9, the shift register may be identified as the "F-register," the stages of which are identified by the letter F with subscripts that specify the order of the flip-flops in a descending order of significance such that the binary order of a flip-flop $F_n$ is one greater than that of a flip-flop $F_{n+1}$.

A shift register may be employed for serial-to-parallel or parallel-to-serial conversion. For serial-to-parallel conversion, data is serially entered into the first stage $F_0$, one binary digit at a time, and shifted to the right as successive binary digits are entered. After the data has been fully registered, the static data may be transferred in parallel from output terminals, such as the output terminal $F_0$ of the first stage, and the one's complement of the static data may be transferred in parallel from false output terminals, such as the output terminal $F_0'$ of the first stage.

For parallel-to-serial conversion, a configuration of binary coded signals may be transferred in parallel into corresponding stages of a shift register by applying a 0 volt signal to the set input terminal of each stage that is to receive and store a binary one, such as the set input 148 of the first flip-flop $F_0$. Data registered may thereafter be serially transferred to another functional circuit or device. Before data may be registered in parallel, it is necessary to reset each stage of the shift register by either applying a zero volt signal to the common reset input terminal 149 or by serially shifting a binary zero into all stages. The latter shifting may be done while serially transferring out previously registered data.

*Pulse distributor*

Figures 10A, 10B, 10C, 10D:
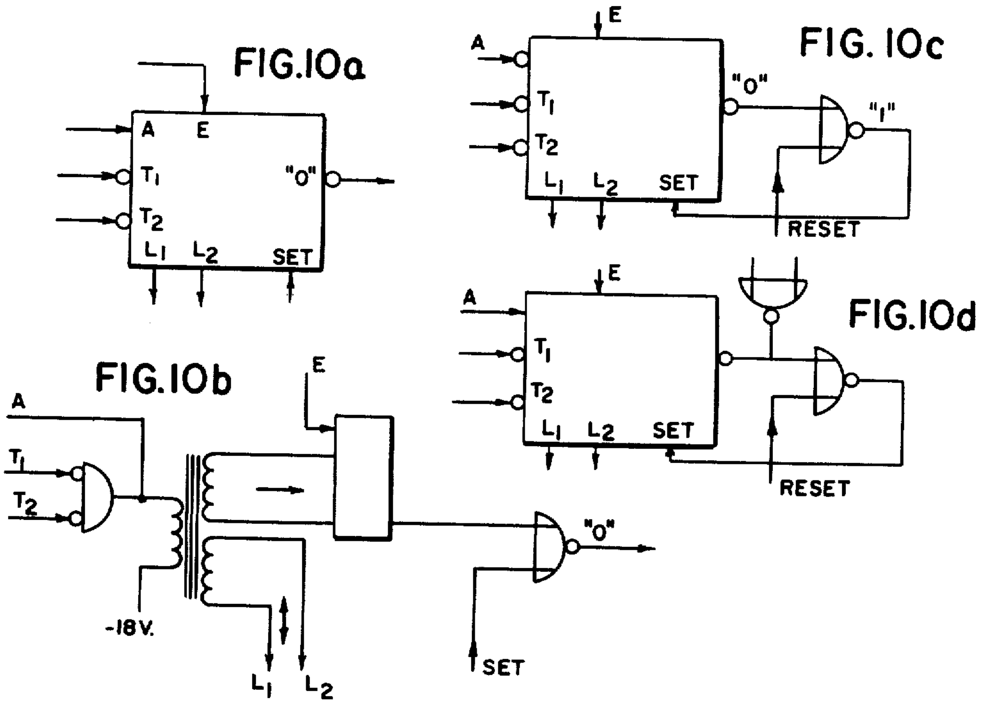
Figure 10E:
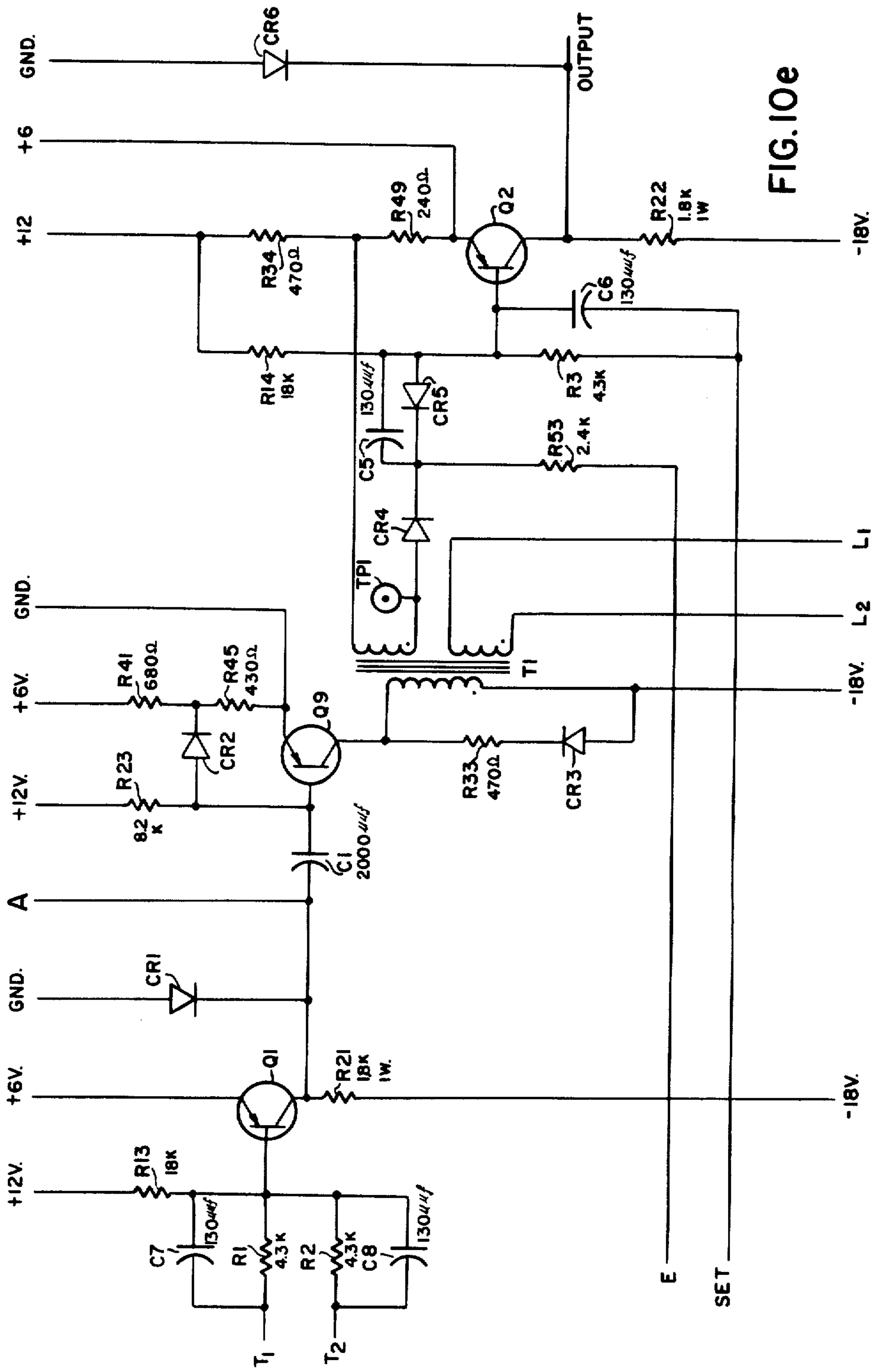

In FIG. 10*a*, there is shown the symbol utilized for a pulse distributor; FIG. 10*b* is an elaboration of the circuit of FIG. 10*a*; FIG. 10*c* depicts the arrangement for "latching up" a pulse distributor, and FIG. 10*d* shows the arrangement for "setting" a pulse distributor externally. FIG. 10*e* is a schematic depiction of the pulse distributor. A transmission line attaches to points $L_1$ and $L_2$ of the circuit of these figures.

Data transmission onto line $L_1$–$L_2$ by the pulse distributor is accomplished by a two or three input trigger (T) which functions as an "AND" circuit to positive going input signals. Normally operating as a two input gate, point A can be connected to an external source thereby converting it to a three input "AND" circuit.

In the operation of the pulse distributor circuit, one of the inputs to this AND gate (or two, if point A is externally connected) enables the circuit with a +6 volts level so that when the remaining input rises sharply from 0 volt to +6 volts, this rise in signal level is coupled through the transformer to the transmission line via points $L_1$, $L_2$. The width of the signal output is approximately one microsecond.

Data reception can be effected by the same pulse distributor from the transmission line or from the transmitting gate receiving its own signal. The received signal samples the pulse enable gate shown in FIG. 10*b*. However, the received signal does not effect the trigger AND circuit. If the pulse enable gate is enabled by outside logic, i.e., point $E=0$ volt, the received signal appears at the output. If the voltage at point E is +6 volts, the circuit is disabled and no output results.

The output of the pulse distributor is a positive going signal. This output is energized by:

(1) A received signal on the transmission line, or from the transmitting gates, when the pulse enable gate is enabled by 0, volt; or (2) A negative going signal at the "set" input. The signal output, like the received pulse, is of short duration.

Since the received signal on the transmission line input to the pulse distributor is of a relatively short duration, its use in the external logic may require that this pulse be "latched up." To accomplish this latch-up action, i.e., to in effect simulate a flip-flop, an external logic element is tied to the pulse distributor output as shown in FIG. 10*c*. As illustrated in FIG. 10*c*, a positive output of the pulse distributor is combined with the reset enable (normally=+6 volts) of the external logic element. The output of the logic element returns to the pulse distributor as a binary one level thereby holding the circuit "latched up."

The "R" or reset input to the external logic element (FIG. 10*d*) provides a means for resetting the pulse distributor when the voltage at terminal "R" goes to zero volt.

Under some conditions as shown in FIG. 10*d*, the pulse distributor can be "set" externally. When the OR logic element output rises to +6 volts, it enables the external logic element to the pulse distributor. This in turn sets the pulse distributor.

The pulse distributor arrangement enables the parallel use thereof as a flip-flop and a transmitting device with the latching up at its output by the external element, the transmitting gates are completely separated from the output when the pulse enable gate is disabled by +6 volts. Thus, the pulse distributor can store a received or set pulse and still transmit a pulse without effecting its latched-up output.

CENTRAL PROCESSOR

Referring now to FIG. 11 wherein there is depicted a simplified illustration of the central processor of the system of invention, there is provided a core memory 200 which may suitably be a 4096 word magnetic core memory consisting of a three dimensional matrix. This matrix may comprise 21 square planes arranged vertically, each plane resembling a screen with 64 wires threaded in each direction. Thus, if only one of these planes is considered, it is seen that there are 4096 points at which these sets of wires intersect. A small magnetic core capable of storing one binary bit encompasses each of these intersections. Each plane corresponds to a particular bit position of a word. Accordingly, all of the bits (4096 in the case of a 4096 word memory) associated with a particular bit position of a word are found in one plane. When a particular location in memory 200 is addressed for either a reading or a writing operation, actually, there are being selected one of 64 wires in one direction (X direction) on each plane and one of 64 wires in the other direction (Y direction) on each plane, the same X and Y wire number being selected on each of the 21 planes. Consequently, all of the bits of a selected word are read out in parallel.

At this point, it may be mentioned that a memory address register is included in the logic of each unit of the system of this invention; the particular unit selected to address core memory 200 at any one time being determined by the priority interrupt logic which is further explained hereinbelow.

The system of this invention, for convenience of explanation of operation, is being described as utilizing words comprising 20 bits. However, an extra bit, i.e., a 21st bit, appears only in core memory 200 and in the M register 202 (FIG. 11) and functions as a check or parity bit. In this parity check, the binary "one" bits of a 20 bit word written into the memory are counted. If the total number of "one" bits of this 20 bit word is an even number, a binary "one" is written into the 21st bit position. If such total is an odd number, a binary "zero" is written into the 21st bit position. In either situation, the attempt is made to write an odd number of binary "one" bits into core memory 200. When a word is read out at some later time, another count is made to determine whether a word still comprises an odd number of binary "one" bits. If the latter count indicates an even number of "one" bits in a word, then the word was either not written into or read out of the core memory properly and a parity error is indicated.

All information written into or read out of core memory 200 has to pass through the 21 bit M register 202 of the central processor. The M register comprises 21 flip-flops which receive and store the signals read out of core memory 200 so that the same information read out of the core memory may be re-entered during writing, thus restoring information back into the memory. The M register 202 effectively is the focal point for all information transfers among the units of the system of this invention since all information received by the central processor from any of the input units or any information sent from the central processor to an output unit passes through M register 202. The parity checking and generating circuits referred to hereinabove work in conjunction with the M register.

All information transferred from core memory 200 via M register 202 to other registers and components internal to the central processor pass through the central processor's B register 204 which is a 20 bit register. With this arrangement, therefore, B register 204 effectively functions as a "buffer" between the central processor's arithmetic and control components and core memory 200 and M register 202 thereby freeing the latter so that they can be accessed and utilized simultaneously with central processor operations not requiring core memory 200. Examples of such operations might be those, for example, which occur during multiply and divide instructions which may consist of addition and shifting operations. The output of B register 204 is continuously applied to the arithmetic unit 206 with no intervening gating logic.

In the arithmetic unit 206, the arithmetic operations of the computer are performed. In addition to these operations, arithmetic unit 206 functions as an information transfer buss between the other registers in the central processor and core memory 200. If, for example, it is desired to transfer the contents of the A register 208 of the central processor to core memory 200 via the M register 202, the information in A register 208 is permitted to enter the arithmetic unit 206 thereby permitting the output of arithmetic unit 206 to be inserted into the M register.

The A register 208 is a 20 bit register which may receive information from and transfer information into arithmetic unit 206. Accordingly, A register 208 serves as the accumulator for the central processor and performs the following functions.

(a) Holds the addend during addition.

(b) Holds the minuend during subtraction.

(c) Holds the most significant half of the product after multiplication.

(d) Holds the most significant half of the dividend before division.

(e) Holds the quotient after division.

(f) Holds the most significant half of a word after the execution of all double precision instructions.

In addition to the above-tabulated functions, binary coded decimal information may be transferred from A register 208 to the N register 210 which is a six bit register and functions as a buffer during typeout operations. Manual input to A register 208 is enabled by 20 console switches provided for this purpose, an example of a use of these switches being during initial program startup when it is necessary to insert the first instruction into the system. Information in A register 208 may also be shifted to the Q register 212.

Q register 212 is a 20-bit register which functions with the A register to form a 38-bit (and sign) accumulator during the execution of double precision instructions. Information is not transferred directly from core memory 200 or arithmetic unit 206 into the Q register 212 but is rather shifted from A register 208 into Q register 212. During the execution of double precision operations, Q register 212 holds the least significant half of a double precision word. After a multiplication operation, Q register 212 holds the least significant half of the result. During division, Q register 212 holds the least significant half of the dividend. After division, Q register 212 contains the remainder.

In order for the central processor to fetch and execute program instructions in an orderly and sequential manner, a definite time base for these operations is provided. The effective pulse repetition for all central processor operations may suitably be a frequency such as 450 kc., the reciprocal of the latter, approximately 2.25 microseconds, being the time between pulses and designated for convenience of description of operation as T times. In the system of this invention, eight consecutive pulses may comprise a basic unit of time suitably designated as a "word time," such word time in a 450 kc. system being approximately 18 microseconds in duration.

A word time is the time required to read one word out of core memory 200, transfer this word to the appropriate register or registers, and re-write the word back into the core memory 200. Consequently, a word time is required to "fetch" an instruction from core memory 200 and a word time is normally required to "look-up" the operand associated with the instruction and to perform all of the operations that are necessary to its proper execution. In order to execute a given instruction during a specific word time, an orderly sequence of operations within the word time is followed, such sequence being determined by the operation code of the instruction being executed and the particular "T time" indicated by the timing generator 214 which provides these T pulses basic to all components in the central processor.

To insure the orderly sequence of (1) "fetching" an instruction, (2) modifying a data address (if it is required) and (3) executing the instruction, control logic is provided and depicted in FIGS. 11 and 15 as a sequencer 216. Sequencer 216 also insures the repetition of the foregoing steps in a cyclic manner thereby permitting program execution.

Each of the foregoing steps typically requires one word time. The T pulse from timing generator 214 at the beginning of a word being suitably designated as $T_0$ and the T pulse at the end of a word time consequently being designated as $T_7$. Sequencer 216 initiates the performance of a step with a $T_0$ pulse and terminates the performance of a step with a $T_7$ pulse. In addition to these functions, sequencer 216 provides signals which direct information flow during the aforementioned steps (1) and (2).

The P register 218 is a 15 bit register which stores the address of the next instruction. When the first step of the instruction cycle ("fetch" instruction) is to be performed as determined by sequencer 216, the address stored in P register 218 is utilized to select the appropriate core memory X and Y current drive lines thereby enabling the readout from core memory 200 of the next instruction (and subsequent rewriting thereof back into the core memory) to be executed. Logic auxiliary to P register 218 is provided which enables the flip-flops comprising P register 218 to function as a straight binary counter thereby permitting computation of the address of the next instruction following the one currently being read out of core memory 200. This counting up in P register 218 (by ones) occurs at the end of the "fetching" of the instruction. Under certain conditions, an address in the I register 220 may be transferred to P register 218. This is the implementation of a process conveniently designated as branching.

The I register 220, which is a 20 bit register, receives the instruction read from core memory 200 during the "fetching" of the instruction and stores this current instruction during the steps of modifying the data address and executing the instruction. The five left-most bits of an instruction comprise the OP code (instruction bits 0–4). Bits 5 and 6 of I register 220 indicate whether an address modification is to be performed and the thirteen right-most bits in the I register 200 normally indicate the core memory address of the operand. Bits 5 and 6 are also used as the two most significant address bits of the 15 bit operand address in I register 220. The latter use of bits 5 and 6 occurs when no address modification is to be performed or if it has already been performed on an instruction extracted from core memory 200. This particular interpretation of instruction bits as has been described, is designated as "Instruction Format I."

Included in Format I instructions are core memory transfer, arithmetic and double precision instructions. As in the case of P register 218, the address bits in I register 220 are utilized to select the appropriate core memory X and Y drive lines necessary to read out the required operand (data). This, of course, depends upon the furnishing of proper enabling signals from sequencer 216 when the execution of the instruction is to be performed.

Instructions in Format II and III do not require the use of core memory 200 for their execution thus freeing the normally required thirteen address bits in I register 220 for supplementing OP code designators. Format II instructions are conveniently designated as "word transfer commands" since the transfer of a full word is common to their execution.

Format III instructions involve shifting partial words between the various arithmetic registers. The number of bits to be so shifted are specified by the five right most bits in I register 220, viz., bits 15–19. Bits 15–19 in the I register are collectively designated as the K counter and are used in shift instructions.

After the instruction has been stored in the I register, the operation code bits 0–4 therein are examined by the instruction decoding logic stage 222 which then provides the appropriate signals which are necessary to direct information flow during the execution of the instruction. If the examination of the operation code bits 0–4 indicates a Format II or Format III type instruction, the remaining bits in I register 220 are examined in instruction decoding logic stage 222 so that additional signals may be made available to the central processor for proper instruction execution.

In accordance with the system of this invention, core memory 200 serves the dual function of: (1) main memory, and (2) input/output buffer. Thus, two or more asynchronous operations may be performed simultaneously such as reading cards at a relatively slow rate while computing at the 450 kc. central processor repetition rate. Since only one pair of core memory X and Y lines may be selected at any one time, and since several requests for memory access may occur at the same time, provision is made in the system of this invention to grant only one such request for access during a particular word time.

The granting of a request for core memory access is dependent upon the priority assigned (built into the central processor) to a particular device which, in turn, is determined by the repetition rate of pulses, i.e., information going to or coming from the input/output device. Thus, if a request for access to core memory 200 is received from two input/output devices simultaneously, the one with the higher repetition rate has the higher priority and, hence, is the first to be granted access, the other device waiting for one word time. The reasoning behind this basis for priority assignment is, of course, that the slower speed device can afford to wait without danger of loss of information. The faster device cannot afford to wait since additional information is soon to follow. Sequencer 216 of the central processor always has the lowest priority since no loss of information results if it has to wait for core memory access during its normal cyclic operation. The analysis of the various requests for core memory access, and the determination as to whether an input/output device or sequencer 216 is to have access to the memory is performed by priority interrupt logic stage 224.

When the analysis of the operation code (bits 0–4 in I register 220) by instruction decoding logic stage 222 indicates a PUNCH CARD instruction, several operations are performed: (1) the starting core memory address from which information is to be an output to the Card Punch is transferred from I register 220 (data address) to a combination register/counter in card punch logic stage 226; and (2) a signal is sent to the Card Punch mechanism causing a clutch associated therewith to be actuated thereby effecting the movement of a blank card into the punching position.

Following this initial starting sequence, the remainder of the execution of this instruction, i.e., the actual punching of information into the card proceeds in parallel with other central processor operations, sequencer 216 immediately initiating the "fetching" of an instruction step in the instruction cycle. The cyclic operation of the central processor has to be interrupted occasionally to permit the "high speed" transfer, i.e., at the central processor's normal 450 kc. repetition rate, of information from core memory 200 to the Card Punch at the request of the Card Punch. It is to be noted that in this interrupt mode of operation, by permitting card punching to proceed with other instruction executions, the central processor need not be slowed down; i.e., halting between characters to be punched, to the relatively slow speed in which the Card Punch can accept this output information.

Since the central processor will have additional information to be punched at a later time in a different card, provision is made to insure completion of the execution of the first PUNCH CARD instruction before punching of the next card may begin. Card Punch logic stage 226 monitors the operating status of each PUNCH CARD instruction execution and provides a terminating signal upon the completion of each PUNCH CARD execution.

Provision is made in card punch logic stage 226 to punch either binary or alphanumeric information. The alphanumeric information is first converted from binary coded decimal to standard Hollerith card code. To perform this conversion, a decoding matrix is provided in card punch logic stage 226 whenever the alphanumeric variation of the PUNCH CARD instruction is indicated to instruction decoding logic stage 222.

The components included in the card reader logic stage 228 are functionally similar to those in card punch logic stage 226. Thus, the starting core memory address into which information is to be read from the card is stored in a register counter contained in card reader logic stage 228. A "start reader signal" is sent to the card reader to initiate card reading and the operation of the central processor is temporarily interrupted to permit entry of this new information into core memory 200.

The controller selector 230 is the focal point for information transfers between the central processor and other input/output units. The decision as to which of these peripheral devices is to be granted access to core memory 200 during any given word time is made by controller selector 230, the basis for this decision being the priority assigned to each controller which in turn is dependent upon the respective addresses associated with the controllers of the input/output (peripheral) devices. An inverse relationship exists between an assigned address to a peripheral device and its priority level. Thus, the highest priority is associated with the peripheral device controller which has been assigned address No. 1; the next highest priority is associated with the peripheral device which has been assigned address No. 2, etc. Effectively, controller selector 230 functions as an extension of priority interrupt logic stage 224 and this latter stage considers controller selector 230 as another input/output device.

Information transfers to the console typewriter are made via the N register 210 which is a six bit register. The six bits in N register 210 are decoded into a single unique signal which actuates a corresponding typewriter key during typing. This operation occurs in parallel with other central processor operations due to the presence of N register 210 which receives its information from A register 208. Typing of the character then proceeds when a TYPE instruction is executed.

An interrupt control logic arrangement is provided associated with each unit comprising the system of this invention and determines whether these units such as the Card Reader, the Controller Selector, the Card Punch or the Central Processor may have access to the core memory during any given word time. Each interrupt control logic stage comprises four flip-flops. In the event that more than one of these units requires memory access at the same time, the unit with the highest priority is granted access during the following word time. The priority has been assigned that, for example, the:

The Card Reader has the highest priority.
The Controller Selector has the second highest priority.
The Card Punch has the third highest priority, etc., and
The Central Processor's arithmetic and control components have the lowest priority.

Although this arrangement may seem to be in conflict with the statement set forth hereinabove that the device with the highest information rate is normally awarded the highest priority, it is necessary to grant the card reader the highest priority because of the relatively short duration of pulses received therefrom. The controller selector, which is treated as just one more input/output device by the Central Processor's interrupt control logic, has the responsibility of selecting which of the controllers of the peripheral devices in the system of this invention is to have access to core memory 200 once the controller selector has been granted access. Actually, the central processor does not request access to core memory 200 as do the other units. It rather, in a sense, awaits the time during which access to the core memory is not required by any of the other units and then proceeds to "fetch" an instruction or word of data from the memory as a part of the normal program execution.

*Timing generator*

Referring now to FIG. 12 wherein there is shown a logical diagram of a timing generator suitable for use in the system of this invention such as timing generator 214 in FIG. 11, and to FIG. 13 wherein there is shown a timing diagram of the waveforms occurring at various points in the arrangement of FIG. 12, an oscillator 240 is provided which produces two identical pulse trains 180° displaced in phase with respect to each other. Oscillator 240 may suitably be of the type well known in the art which provides at the output thereof, a square wave that swings between two chosen levels. Suitably, oscillator 240 may have an output frequency of 225 kc. and the base and pedestal levels of the output may be at 0 volt and 6 volts respectively, i.e., the logic levels utilized in the system of this invention. A logic level of 0 volt is used to provide a binary one level and +6 volts is utilized to provide a binary zero level as has been stated hereinabove.

For convenience in explanation of description, the output of oscillator 240 on lead 241 has been designated as the "phase 1" output and the output on line 243 has been designated as the "phase 2" output. The waveforms of the phase 1 and phase 2 outputs are shown on lines 255 and 252 respectively and the phase 1′ and phase 2′ outputs are shown on lines 254 and 251 respectively in FIG. 13.

In the operation of the timing generator, the phase 1 output of oscillator 240 is applied to the reset input terminal of a flip-flop 242 and the phase 2 output of oscillator 240 is applied to the set terminal of flip-flop 242. Accordingly, at the occurrence of the first phase 2 pulse (0 volt), flip-flop 242 is switched to its set state whereby a binary zero appears on lead 242R. Now, when the phase 2 output again rises to a +6 volts level, a gate G1011 is enabled to provide a binary one at the output thereof.

A ring counter comprising steered flip-flops $L_1$, $L_2$, $L_3$ and $L_4$ respectively is provided. The trigger input to flip-flop $L_1$ of the ring counter is provided when AND gate G1011 is enabled. The ring counter is arranged in accordance with well known ring counters whereby only one flip-flop thereof is set at any one time. Thus, flip-flop $L_1$ is switched to its set state every fourth trigger pulse.

To provide the steering input to flip-flop $L_1$, i.e., to enable the AND-gate G1000, it is required that flip-flops $L_1$, $L_2$ and $L_3$ be in their reset states and that a +6 volt level exist on lead 245 (this may be provided by the closing of an external switch, not shown) whereby the binary one output of enabled gate G1000 is inverted to a binary zero in an inverter I1001 and such binary zero level appears at the set steering input of flip-flop $L_1$. With the coincidence of a zero level at this set steering input and the positive transition on trigger lead 247 (the output of an inverter I1012), flip-flop $L_1$ is switched to its set state whereby a +6 volts output is provided at its reset output terminal.

It is seen that upon the occurrence of the next phase 2 pulse, flip-flop $L_1$ will be switched to its reset state since a binary zero appears at the output of gate G1000, a binary one level existing on lead 248, whereby a binary zero appears at the reset steering input to flip-flop $L_1$. In this manner, the ring counter, comprising flip-flops $L_1$–$L_4$, cycles. In line 258 of FIG. 13, there is shown the waveform of the output at the reset output terminals of the flip-flops $L_1$–$L_4$.

The phase 1 and phase 2 outputs of oscillator 240 are inverted by inverters I1000 and I1002 to provide the phase 1′ and phase 2′ outputs respectively. When flip-flop $L_1$ is in its set state and a phase 1′ pulse occurs, an AND gate G1001 is enabled to provide at the output thereof the pulse designated $T_0$, the output of an inverter I1004 being designated as $T_0'$. When flip-flop $L_1$ is in its set state and a phase 2′ pulse occurs, an AND gate G1002 is enabled to provide at the output thereof a $T_1$ pulse, the $T_1'$ pulse being provided at the output of an inverter I1010. Upon the coincidence of the set state of flip-flop $L_2$ and a phase 1′ pulse, gate G1003 is enabled to provide at the output thereof the $T_2$ pulse and to provide at the output of an inverter I1003 the $T_2'$ pulse.

Similarly, when there is a coincidence of a phase 2′ pulse, a gate G1004 is enabled to provide at the output thereof the $T_3$ pulse, the $T_3'$ pulse being provided at the output of an inverter I1009. Upon the coincidence of the set output state of flip-flop $L_3$ and the occurrence of a phase 1′ pulse, a gate G1005 is enabled to provide at the output thereof a $T_4$ pulse and to provide at the output of an inverter I1005, the $T_4'$ pulse. Similarly, when flip-flop $L_3$ is in its set state and there occurs a phase 2′ pulse, a gate G1006 is enabled to provide at the output thereof a $T_5$ pulse and consequently there is provided at the output of an inverter I1006 a $T_5'$ pulse.

When flip-flop $L_4$ is in its set state, and upon the coincident occurrence of a phase 1′ pulse, a gate G1007 is enabled to provide at the output thereof the $T_6$ pulse and to provide at the output of an inverter I1007, the $T_6'$ pulse. Also, with the coincidence of the set state of flip-flop $L_4$ and the occurrence of a phase 2′ pulse, a gate G1008 is enabled whereby there is provided at the output thereof the $T_7$ pulse and whereby there is provided at the output of an inverter I1008, the $T_7'$ pulse.

In FIG. 13, the lines 259–266 show the waveforms of the $T_0'$–$T_7'$ pulse trains respectively.

Line 253 in FIG. 13 shows the set output waveform of flip-flop 240 and line 256 shows the output waveform of gate G1011.

*Priority interrupt control in the central processor*

In FIG. 14, there is depicted the arrangement for determining whether the card reader, the controller selector, the card punch or the central processor is to have access to the core memory 200 (FIG. 11) during any given word time. The arrangement shown in FIG. 14 comprises four flip-flops, each of the latter being respectively associated with one of the aforesaid system units. In the event that more than one of these units requires access to the core memory at the same time, the unit with the highest priority is granted access during the immediately following word time. It will be shown that in accordance with the arrangement in FIG. 14, the card reader, the controller selector, the card punch, and the central processor have priority in that order of descending significance. Logic included in the card reader, the controller selector and the card punch produces the signals representing requests for access, such signals respectively being provided as a +6 volts level.

In operation, let it be assumed that a request for memory access is received from the card reader whereby a +6 volts level appears at one input to a gate G1101. Since a +6 volt level is maintained during operation at the other input to gate G1101, gate G1101 is enabled whereby the binary one appearing at the output thereof is inverted in an inverter I1101 to provide a binary zero at the set steering input of a flip-flop PR–4. Consequently, at the coincidence of such zero level and a $T_0'$ pulse, flip-flop PR–4 is switched to its set state.

It is seen that with the enabling of AND gate G1101, an OR gate G1102 is enabled, the binary zero output of gate G1102 being inverted in an inverter I1111 whereby a binary one appears as an input to a gate G1110. Accordingly, even if a request for access by the controller selector appears as the other input to gate G1110, gate G1110 cannot be enabled and consequently flip-flop PR–3 remains in its reset state. Similarly, when a binary one level appears at the output of inverter I1111, an OR-gate G1109 is enabled, the binary zero output thereof being inverted in an inverter I1103 to provide a binary one input to an AND gate G1104 whereby AND gate G1104 is also prevented from being enabled to prevent the setting of flip-flop PR–2. The binary one output of inverter I1103 in this situation enables an OR gate G1105 whereby its binary zero output inverted in an inverter I1104 provides a binary one level at the set steering input to flip-flop PR–1 and consequently flip-flop PR–1 also remains in its reset state. With this arrangement accordingly only the card reader attains memory access at the next word time.

It is readily seen that if AND gate G1101 is not enabled in response to a request for priority, then one of the lower order priority system units can get memory access. For example, if a memory access request is received from the card punch and no requests simultaneously occur from the card reader and the controller selector, the output of inverter I1102 is a binary zero whereby flip-flop PR–2 is switched to its set state. It is to be noted that when a particular priority request terminates, the AND gate associated with that request is disabled and the corresponding flip-flop is switched to its reset state due to the appearance of a binary zero level at the reset steering input of the corresponding flip-flop. Since, the $T_0'$ pulse is the trigger pulse which is utilized for effecting the switching of the states of the flip-flops, a priority request flip-flop which is switched to its set state remains in such set state at least one word time.

The OR gate G1105 is a three input OR gate, one input being the output of inverter I1103, a second input being the output of AND gate G1104 the third input being a binary one level when a condition exists which requires that the central processor be rendered inoperative, such conditions, for example, being due to malfunctions. Accordingly, when the input on the alarm logic line is at 0 volt indicating such malfunction, OR gate G1105 is enabled whereby a binary one level appears at the set steering input of flip-flop PR–1 due to the inverting action of inverter I1104 and consequently flip-flop PR–1 is not switched to its set state.

Normally, each of the four system units represented by flip-flops PR–4 to PR–1 respectively, require access no more frequently than every other word time. The mnemonics conveniently utilized for the outputs of the flip-flops are PR–4, the card reader priority signal; $IC_3'$, the controller selector priority signal; PR–2', the card punch priority signal and CP', the central processor priority signal. When OR gate G1105 is enable, i.e., it functions as an AND gate, there is generated at the output thereof a signal conveniently designated as CPN (central processor next priority) and at the output of inverter I1104 there is produced the signal CPN'. The latter signals are utilized in the sequencer as will be further explained hereinbelow.

*Sequencer*

The sequence control logic of the central processor insures the orderly sequence of central processor operations whereby (1) an instruction is extracted from a memory cell and stored in the I register (AMP), (2) the instruction in the I register is modified by adding to the data address bits of the I register; viz., bits 7–19, the contents of a specified X register; viz., bits 5–19 thereof (AMX), and (3) the instruction in the I register is executed (AMI, AMX, or GIS). As will be further shown hereinbelow each of the above set forth alphabetic mnemonics is also a designation of one of the respective flip-flops comprising the sequencer. These flip-flops function to provide enabling signals depending upon the particular phase of an instruction cycle currently being performed. These flip-flops also serve as memory devices in that their setting in a sense effects their "remembering" which operation is to be performed next. Thus for example, if the flip-flop which is designated AMP is currently in its set output state, upon the completion of the currently existing word time, flip-flop AMX or flip-flop AMI will next be switched to its set output state, of course, assuming that central processor priority is available at this next word time.

Referring now to FIG. 15 it is to be noted that the end of operation flip-flop, designated EOO is switched to its set output state at $T_6$ time of the last word time of the execution of an instruction. Since in the system of this invenion generally only one word time is required for the execution of an instruction, such last word time will also be the first word time of execution for these instructions. Similarly, an input/output (I/O) or branch type of general instruction enables an OR gate G1209, the output of the latter gate in turn being ANDed with the GIS term (general instruction sequencing) in a gate G1213, the output of gate G1213 being inverted in an inverter I1214. The binary zero output of inverter I1214 is ANDed with the $T_6'$ pulse in a gate G1215, the binary one output of gate G1215 being applied to the set input of flip-flop EOO to switch it to the set state. Other instructions whose execution require more than one word time are terminated by the switching of flip-flop OE–2 to its set output state.

In order that there may be a convenient method provided for commencing the execution of a program, flip-flop EOO is initially switched to its set output state when power is applied to the system with the manual reset line at the flip-flop's set input terminal. Since the L (ring) counter of the timing generator is also initially manually reset, the flip-flop AMP is initially switched to its set output state.

Upon the occurrence of the first $T_0$ signal after flip-flop EOO is switched to its set output state, all other flip-flops in the sequencer shown in FIG. 15 except flip-flop AMP are switched to their reset output states. The conditions required to switch flip-flop AMP to its set output state is described hereinbelow. However, at this point, it should be noted that flip-flop EOO is always switched to its reset output state during time $T_5$ of AMP by the same signal that gates the OP code bits ($B_{0-4}$) from the B register to the I register.

When flip-flop AMP is switched to its set output state and the central processor has been granted memory access, an AND gate G1255 at the output of flip-flop AMP is enabled by the AMP'–CP' terms whereby there is produced a positive going signal at the output of inverter I1204 to gate the address stored in the P register into the memory address decoding logic. With this arrangement, the contents of the memory cell whose address is in the P register is read out of the memory into the M register and ultimately into the I register.

If flip-flop EOO is switched to its set output state and the central processor is to receive the following memory access, i.e., the CPN′ signal is +6 volts, an AND gate G1217 is enabled to provide the pedestal to the set input of flip-flop AMP through OR gate G1218. A positive going pulse at $T_0$ time ($T_0'$) provides the trigger input to switch flip-flop AMP to its set output state. Thus, if one of the input/output devices is to receive memory access during the following word time, the switching of flip-flop AMP to its set output state has to wait for a later $T_0'$ signal. Accordingly, it is seen that flip-flop EOO effectively remembers the current state of the central processor's operating cycle.

Flip-flop AMP is switched to its reset output state at the $T_0'$ pulse of the word time after it was switched to its set output state if the central processor is to be granted memory access during this next word time. However, if the central processor is not to receive memory access at such next word time, the signal $\overline{CPN}'$ at the input to AND gate G1216 enables this gate, the output of gate G1216 providing an input to OR gate G1218. Thus, the positive pedestal at the set input terminal of flip-flop AMP is maintained thereby preventing it from being switched to its reset output state. It is appreciated that such gating network is necessary in order to enable the sequencer to keep track of the next operation to be performed such as AMX, AMI, GIS. If flip-flop AMP were switched to its reset output state at the beginning of a word time during which the central processor was not granted access to the memory, the next operation would be either AMI or GIS, the possibility of the operation AMX being bypassed. For this reason the signal AMF′ is one of the necessary conditions for switching flip-flop AMX to its set output state.

It is because of the above logical relationship that flip-flop AMP is arranged to remain in its set output state during manual operation, i.e., the automatic/manual switch is in the manual position. Depression of the start button causes the central processor to perform an AMI, AMX or GIS operation.

After an instruction has been extracted from memory during the AMP operation, flip-flop AMX may be switched to its set output state prior to the switching of flip-flop AMI (memory reference instruction) to its set output state or flip-flop GIS (general instruction sequencing) to its set output state. When flip-flop AMX is switched to its set output state and the central processor has been granted memory access, an AND gate G1254 at the output of flip-flop AMX is enabled thereby effecting the gating of bits 5 and 6 of the I register into the memory address decoding network as the least significant address bits of the memory word. Since no other information is gated into the addressing logic at this time, the eleven most significant address bits in the memory word appear as zeros. With this arrangement, the contents of the address modifying cells are extracted during the AMX operation.

Flip-flop AMX is switched to its set output state at $T_0$ time of the first word time that access to the memory is available to the central processor following the AMP operation provided that either bit No. 5 or bit No. 6 in the B register have the value of a binary one. The latter bits, viz., $B_5$ and $B_6$, are not cleared until $T_1$ time of the AMX operation. Thus, after an AMP operation, a binary one bit in either position $B_5$ or $B_6$ remains in the B register.

It is to be noted that flip-flop AMX may be switched to its set state when an address modification is to be performed. In such situation, flip-flop AMX is initially switched to its set state due to the binary one value of bit $B_5$ or bit $B_6$ in the B register. Flip-flop AMX remains in its set output state for only one word time whether or not there is available to the central processor memory access during the word time following AMX. If bits 5 or 6 of the B register contain a binary one, flip-flop AMX remains at its set output state if there is a general instruction in the I register following the switching of flip-flop AMX to its set output state. The GIS flip-flop is accordingly switched to its set state and the general instruction is executed. If there is not a general instruction in the I register, flip-flop AMI (address memory from the I register) is switched to its set output state if access to the memory is available to the central processor during the next word time and the execution of a BXL instruction or BXH instruction is not being completed.

Flip-flop AMI is switched to its set output state at time $T_0$ provided that there is the coincidence of conditions, viz., $\overline{EOO}'$, GEN, CPN′, and $\overline{B_5}'$ or $\overline{B_6}'$. This arrangement is shown in the input to AND gate G1225 in FIG. 15. Thus, if all the other flip-flops of the sequencer are in the reset output state such as might be the case after the execution of an AMX instruction, not followed by the priority request to the central processor for memory access, where the instruction in the I register is not a general instruction, flip-flop AMI is switched to its set output state thereby maintaining the normal sequence of operations in the instruction cycle. Unlike flip-flops AMP or AMX, the output of flip-flop AMI is not ANDed with the CP′ term. Thus, whenever, flip-flop AMI is switched to its set output state, bits 7–19 of the I register are gated into the memory address decoding network.

The preceding terms permit the flip-flop AMI to be switched to its set output state to cause the contents of the cells specified in the I register to be read out of the memory into the M register even though it is not intended that the central processor use such information.

The flip-flop designated GIS is switched to its set output state whenever a general instruction is detected in the instruction decoding network, i.e., condition GEN′. In this situation, flip-flop EOO is switched to its reset output state ($\overline{EOO}'$), and no address modification is performed $(B_5+B_6)'$. The absence of any of the foregoing conditions causes the switching of flip-flop GIS to its reset state at $T_0$ time.

The flip-flop OE–2 included in the sequencer provides the orderly sequence of operations during the execution of instructions which require more than one word time.

Flip-flop OE–2 is normally switched to its set output state simultaneously with the switching of flip-flop GIS to its set output state, during the second word time of the execution of word movement, i.e., word transfer instructions. The term required to switch OE–2 to its set state at $T_0$ time is $GIS' \cdot (I/O \cdot I_{15} \cdot CP)' + \overline{OE\text{-}3}$, the $(I/O \cdot I_{15} \cdot CP)'$ term being utilized in the controller selector operation during a general instruction.

Flip-flop OE–3 is utilized in the controller selector operation. The term to switch it to its set state is $$(OE\text{-}2)' \cdot EOO' + OE\text{-}2 \cdot CP \cdot CWFF$$

*M register*

The M register 202 of FIG. 11 comprises 21 flip-flops $M_0$–$M_{20}$ which are switched to their reset states every $T_0$ time of a memory cycle and then are set from the cores of the core memory 200 just about at $T_3$ time, the slight variance being due to the fact that the pulse for strobing the memory may be arranged to occur at either side of the leading edge of the $T_3$ pulse.

In operation, an instruction is pulled out of memory in accordance with the sequencer arrangement in the central processor and the contents thereof are inserted into the B register. The outputs of the M register flip-flops when set are designated as signals $M_0$ to $M_{20}$. The latter signals are inverted to provide the signals $M_0'$ to $M_{20}'$.

*B register*

In FIG. 16, wherein there is shown the arrangement for generating the signal to clear the $B_0$ to $B_4$ bits and $B_7$ to $B_{19}$ bits of the B register, the coincidence of the AMP' signal and $T_7'$ timing pulse enables a gate G1720 to provide a binary one signal which is directly applied to the respective reset terminals in the $B_0$ to $B_4$ and $B_7$ to $B_{19}$ flip-flops of the B register.

In FIG. 17, wherein there is shown the arrangement for generating the control signal to effect the clearing of the $B_5$ and $B_6$ bits of the B register, the coincidence of the (AMX·CP)' and the $(\overline{OE\text{-}2})'$ signals and the $T_1'$ timing pulse enables an AND gate G1727 to provide a binary one signal at the output thereof which is directly applied to the respective reset terminals in the $B_5$ and $B_6$ flip-flops of the B register.

In FIG. 18, wherein there is shown the arrangement for effecting the complementing of the contents of the B register, a gate G1733 is enabled upon the coincidence of the (GIS)' signal (general instruction sequencing) and the reset state of the operation enable flip-flop $(\overline{OE\text{-}2})'$, the resulting binary one output of gate G1733 being inverted in an inverter I1703. The consequent binary zero output of inverter I1703 is ANDed with the $I_{13}'$ signal to enable a gate G1738. The binary one output of gate G1738 when it is enabled is inverted in an inverter I1701 to provide the $(\overline{B}\rightarrow B)'$ signal.

In FIG. 19 wherein there is shown the arrangement for generating the control signal for effecting the transfer of the contents of the arithmetic unit to the B register, upon the coincidence of the (AMI)' and $(\overline{OE\text{-}2})'$ signals, a gate G1736 is enabled. The consequent binary one output from gate G1736 is inverted in an inverter I1740.

Upon the coincidence of the $(AMI\cdot\overline{OE\text{-}2})'$ signal and the $T_4'$ signal, a gate G1741 is enabled to provide at the output thereof a binary one signal which is inverted in an inverter I1702, the binary zero output of inverter I1702 being the $(AU\rightarrow B)'$ signal.

In FIG. 20, the M→B signal is generated upon the coincidence of the (AMP)' signal and the $T_4'$ timing pulse. The resulting binary one level at the output of gate G1728 is inverted in an inverter I1705 to generate the $(M\rightarrow B)'$ signal.

FIG. 21 depicts flip-flops $B_0$ to $B_6$ of the B register. The connections of flip-flops $B_7$ to $B_{19}$ (not shown) of this register are the same as that of flip-flops $B_0$ to $B_4$.

In FIG. 21, it is seen that the flip-flops $B_0$ to $B_6$ are directly switched to their set states by the application to a set input terminal thereof of the output of an AND gate such as gate G1500 associated therewith. Applied to gate G1500 is the $M_0'$ output of the $M_0$ flip-flop of the M register and the $(M\rightarrow B)'$ signal provided by the arrangement of FIG. 20. The consequent binary one output of gate G1500 is applied to the set input terminal of flip-flop $B_0$ to switch flip-flop $B_0$ to its set state to provide the $B_0$ signal. Similarly, flip-flops $B_1$ to $B_6$ are switched to their set states.

To correspondingly switch flip-flop $B_0$ to its reset state, there is applied to the reset input terminal of flip-flop $B_0$ the binary one signal provided by the arrangement of FIG. 16. Similarly, flip-flops $B_1$ to $B_4$ are switched to their reset states. In this manner, $B_n'$ signals are produced.

To switch flip-flops $B_5$ and $B_6$ to their reset states, there is directly applied to the respective reset input terminals, thereof, the binary one signal produced by the arrangement of FIG. 17.

To transfer the contents of the arithmetic unit to the B register flip-flops, there is applied to the set steering inputs thereof, the $S_n'$ signals provided from the arithmetic unit which are, of course, at binary zero levels. To the trigger inputs of the B register flip-flops, there is applied the $(AU\rightarrow B)'$ signal produced in the arrangement of FIG. 19.

To reset the B register, flip-flops in the immediately foregoing situation, the $S_n'$ signals are applied to the respective reset steering inputs of the B register flip-flops. Applied to the other trigger input of the B-register flip-flops is the $(\overline{B}\rightarrow B)'$ signal produced by the arrangement of FIG. 18.

*Arithmetic unit*

The arithmetic unit of the central processor (arithmetic unit 206, FIG. 11), is composed of 20 full adder circuits. Each of these circuits has three inputs which represent the two operands to be added and the carry from the preceding, i.e., less significant, full adder circuit. Inputs to each of these full adder circuits are chosen to be in the form of +6 volts logic levels. Thus, since each of the operand bits to be added represent a binary one (true condition) a signal level of +6 volts must be present at both of the A and B inputs of a full adder circuit.

Three outputs are produced from each full adder circuit; viz., a sum (S), a sum bar $(\overline{S})$, and a carry (C). These output signals are also represented in positive logic levels.

It is to be appreciated that these full adder circuits are constantly adding whether the result of the addition is significant or not, i.e., they are producing a binary sum of whatever signals are present at their inputs currently. Since each of the 20 flip-flops in the B register are permanently wired to the arithmetic unit, one of the three inputs to each full adder circuit of the arithmetic unit is tied to the corresponding reset output terminal of the B register (B'). With this arrangement, whenever there is a binary one bit stored in the B register, a +6 volt signal is present in the arithmetic unit.

The control logic of the arithmetic unit produces the enabling signal from the arithmetic unit to the M register. Information transfer from the I register bits 7–19 is enabled by signals produced by this control logic.

*I register*

The I register receives the instruction to be executed during the time that flip-flop AMP is in its set state (sequencer, FIG. 15) and stores this instruction during the entire period of the execution thereof.

In FIG. 22, there is shown the arrangement for generating the signal to switch flip-flops $I_0$ to $I_4$ of the I register to their reset states. In this figure, it is seen that when a gate G1857 is enabled upon the coincident application thereto of the AMP' signal and the $T_4'$ timing pulse, there is provided at the output of gate G1857, the reset $I_0$–$I_4$ signal. This signal is directly applied to the reset inputs of the $I_0$ to $I_4$ flip-flops in the I register to switch them to their reset states.

In FIG. 23, there is shown the arrangement for generating the signal which effects the transfer of the contents of flip-flops $B_0$ to $B_4$ of the B register to the corresponding flip-flops, viz., $I_0$ to $I_4$ of the I register. In this figure, it is seen that upon coincident occurrence of the AMP' signal and the $T_5'$ timing pulse at the inputs of a gate G1858, there is produced at the output of this gate a binary one level which is inverted in an inverter I1825 to produce the $(B_0\rightarrow{}_{-4})'$ signal.

In FIG. 24 there is shown the arrangement for generating the signal which effects the transfer of the contents of the arithmetic unit to the $I_5$ to $I_{19}$ flip-flops of the I register. To generate this signal, upon the coincident appearance of the AMP' and the $T_7'$ pulse at the inputs to a gate G1859, there is produced at the output of this gate the binary one level which is inverted in an inverter I1826 to produce at the output of the inverter the $(AU\rightarrow I_{5-19})'$ signal.

In FIG. 25 wherein there is shown a diagram of flip-flops $I_0$ to $I_4$ of the I register and the logic elements associated therewith, the reset $I_0$–$I_4$ signal generated in the circuit of FIG. 22 is applied directly to the reset input terminals of flip-flops $I_0$ to $I_4$ to switch them to their reset states. To switch flip-flops $I_0$ to $I_4$ to their set states, a gate is associated with each of the flip-flops, the output of each gate being directly connected to the set input terminal of the corresponding flip-flop. Thus, for example, to switch flip-flop $I_0$ to its set state, a binary one appears at the set input terminal of this flip-flop upon the coincident application as inputs to a gate G1799 of the $(B_{0-4} \rightarrow I)'$ signal and the $B_0'$ signal. The output at the set output terminal of flip-flop $I_0$, for example, is designated $I_0$ and the output at the reset output terminal of flip-flop $I_0$ is designated as $I_0'$. It is thus seen from the above that the operation code bits that are to be stored in the I register flip-flops $I_0$ to $I_4$ are received directly from the B register at $T_5$ time of the AMP operation. The remaining 15 bits which comprise the instruction to be stored in the I register are received via the arithmetic unit at $T_7$ time of AMP. There are other instances during which the arithmetic unit is gated to these remaining 15 bit positions of the I register such as, for example, an address modification.

A separate path for the aforesaid remaining 15 positions are not included from the B register. However, because of the inherent delay through the arithmetic unit due to the requirement that the decoded operation code be available out of the instruction decoding network which receives its input from flip-flops $I_0$–$I_4$ before $T_0$ time, the separate path for the operation code bits of the B register to the I register is required. Thus, depending upon the result of the analysis of the operation code by the instruction decording network, the next operation to be performed might be either the AMI instruction, the AMX instruction, or the general instruction (GIS). The switching to the set output state of any of the flip-flops AMI, AMX, or GIS, is performed by a trigger pulse furnished at $T_0$ time of the following word time. The number five and six bits of the I register are gated into the two least significant positions of the memory address decoding network when flip-flop AMX is switched to its set state.

In FIG. 26, wherein there is shown the arrangement of the $I_5$ and $I_6$ flip-flops of the I register, the $AU_5'$ and $AU_6'$ signals are applied respectively to the set steering inputs of these flip-flops. The trigger input is the aforesaid $(AU \rightarrow I_{5-19})'$ signal. In this manner, flip-flops $I_5$ and $I_6$ are switched to their set states. Flip-flops $I_5$ and $I_6$ are switched to their reset states upon the application of the $AU_5$ and $AU_6$ signals to their respective reset input terminals.

To generate the $I_5$ signal, there are applied as inputs to a gate G1801, the reset output of flip-flop $I_5$ (it is a binary zero when flip-flop $I_5$ is in its set state) and the $(AMX \cdot CP)'$ signal whereby there is produced at the output of gate G1801, a binary one level designated as the $I_5$ signal. Similarly, to generate the $I_6$ signal, there are applied as inputs to a gate G1802, the reset output of flip-flop $I_6$ and the aforesaid $(AMX \cdot CP)'$ signal whereby when flip-flop $I_6$ is in its set state there is provided at the output of gate G1802, the $I_6$ binary one level.

The remaining bit positions of the I register, viz., $I_7$ to $I_{19}$ are utilized in several other components of the central processor. The I register bits 7 to 19 are transferred to the arithmetic unit whenever flip-flop AMX is switched to its set state. The information in bit positions 7 to 19 in the I register are also gated to the memory address decoding network whenever flip-flop AMI is in its set state. They are also gated into an alternate section of the instruction decording network by the presence of the general instruction in the primary section of the instruction decording network, i.e., the portion which decodes the operation code bits $I_0$ to $I_4$.

In FIGS. 27–29 wherein there is shown the arrangement of flip-flops $I_7$ to $I_{14}$ and their associated circuit elements, it is seen, for example, that flip-flop $I_7$ is switched to its set state upon the application to its set steering input of the $AU_7'$ signal and upon the application of the $(AU \rightarrow I_{5-19})'$ signal to its trigger input. The resulting binary zero level signal appearing at the reset output terminal of flip-flop $I_7$ when it is in its set state is applied as one input to a gate G1804, the other input to gate G1804 being the $(I_{7-14} \rightarrow AU)'$ signal which is generated in the control logic of the arithmetic unit. Upon the coincidence of the application of two binary zero inputs to gate G1804, the $I_7$ signal is generated at the output thereof. The $I_7$ signal is also generated upon the coincidence of a binary zero from the reset output terminal of flip-flop $I_7$ and the AMI' signal, these signals being applied as inputs to a gate G1805. The $I_7$ signal is also generated upon the coincidence of the binary zero level appearing at the reset output terminal of flip-flop $I_7$ and a signal generated in the control logic of the P register, viz., $(I_{7-19} \rightarrow P)'$ whereby the $I_7$ signal is produced at the output of a gate G1803. The same arrangements are provided in connection with flip5flop $I_8$, the $I_8$ signal being provided at the outputs of gates G1806, G1807 and G1808, Bits 9–12 of the I register specify the starting memory address during input/out operations and as such are made available to the memory address registers associated with the particular input/output devices included in the system. The sequencing of an input/output type of general instruction provides an enabling signal whereby the information in the $I_9$ to $I_{12}$ flip-flops may be entered into the selected register.

In FIGS. 27–29 wherein there is also shown the arrangement of flip-flops $I_9$ to $I_{12}$ of the I register, it is seen that these flip-flops have substantially the same circuit arrangement as flip-flops $I_7$ and $I_8$. In addition, the output appearing at the set output terminal of flip-flop $I_9$ is inverted in an inverter I1809 whereby when flip-flop $I_9$ is in its set state, the output of inverter I1809 is a binary zero level and designated as the signal $I_9'$. It was shown in FIG. 22 how the signal to effect the switching of flip-flops $I_0$ to $I_4$ at $T_4$ time of AMP is generated. At $T_5$ time of AMP, there are also generated signals to switch flip-flop EOO of the sequencer to its reset state and to gate bits 0–4 of the B register to bit positions 0–4 of the I register. Logic in the I register control as shown in FIG. 24 enables the entry of the remainder of the next instruction into bits 5–19 of these corresponding positions of the arithmetic unit. FIG. 30 is a depiction of the circuit arrangement of the $I_{15}$ to $I_{19}$ flip-flops.

In FIG. 31 there is shown the arrangement for generating the $(I/O \cdot GIS \cdot \overline{I_{15}})$ signal. This signal is provided at the output of a gate G1854 when there coincidentally appears as inputs to this gate the (I/O)', the (GIS)' and the $(\overline{I_{15}})'$ signals. It will be shown later below that this signal is utilized in the controller selector operation. The output of gate G1854 is inverted in an inverter I1820 to provide the $(I/O \cdot GIS \cdot \overline{I_{15}})'$ signal.

In FIGS. 32 to 40 wherein there is shown a logic diagram which depicts the decoding network for the I register, in the case of bits $I_0$ to $I_4$ (operation code), a gate G1900 is enabled provided that the two most significant I register flip-flops, viz., $\overline{I_0}'$ and $\overline{I_1}'$ are in their reset output states. The resulting binary one level appearing at the output of gate G1900 is inverted in an inverter I1900. Similarly, when flip-flop $I_0$ is in its reset state, and flip-flop $I_1$ is in its set state, a gate G1901 is enabled to provide a binary one output therefrom, such binary one output being inverted in an inverter I1901. When flip-flop $I_0$ is in its set state and flip-flop $I_1$ is in its reset state, a gate G1902 is enabled to provide a binary one output therefrom, such binary one output being inverted in an inverter I1902. In a similar manner, the I register flip-flops $I_2$ to $I_4$ are decoded in gates G1903, G1906, G1910 and G1914, etc. Thus, when the output of inverter I1899 and the output of inverter I1900 are both binary zeros, there is produced at the output of a gate G1904, a binary one level which is inverted to a binary zero level in an inverter I1903 to provide an instruction designated (SPB)′ wherein flip-flops $I_0$–$I_4$ have a chosen setting. Accordingly, when the output of a gate G1913 is a binary one with a consequent binary zero level at the output of an inverter I1943, the latter binary zero level is conveniently chosen to be the GEN′ (general instruction signal). It is to be realized that the operation code is decoded by the logic as shown in FIGS. 32–40 before the end of the AMP operation, thus permitting the sequencer to proceed to the next correct operation, namely, GIS in the event that the GEN′ signal is generated.

*P register*

The P register performs the function of storing the address of the next instruction to be executed. The register comprises 15 flip-flops whose output terminals are gated into the memory address decoding logic by the (AMP·CP)′ term. The next instruction to be executed is entered into the I register from the memory at this time.

To summarize the foregoing, the sequence control logic of the central processor insures the orderly sequence of processor operations whereby (1) an instruction is extracted from a memory cell and stored in the I register (AMP), (2) the instruction in the I register is modified by adding to the data address (bits $I_7$ to $I_{19}$), the contents of the specified address modification register (AMX), and (3) the instruction in the I register is executed, (AMI, AMX or GIS). As has been shown, each of the latter alphabetic mnemonics is the designation of corresponding flip-flops comprising the sequencer. They serve the function of providing appropriate enabling signals depending upon the particular phase of the instruction cycle currently being performed. In addition to this major function, they also serve as memory devices in that they remember which operation is next to be performed. Thus, for example, if the flip-flop designated AMP is currently in the set condition, upon the completion of the existing word time and assuming that central processor priority is available in the next word time, one of the flip-flops AMX, GIS or AMI will next be switched to its set state. If the index bits of the I register, viz., bits $I_5$ and $I_6$ have a setting of 00, either flip-flop AMI or flip-flop GIS is switched to its set state and the instruction is executed in the next available word time. If the I register bits $I_5$ and $I_6$ contain a binary one in either one or both bit positions, i.e., their setting is either 01, 10 or 11, flip-flop AMX is switched to its set state and the instruction is modified by adding to the data address in bits $I_7$ to $I_{19}$, the contents of a specified address modification register. Usually flip-flop EOO is switched to its set state at $T_6$ of the last word time of an execution of an instruction. For a majority of instructions, this is the first word time of execution since only one word time is required for execution.

*AMP (address memory from P register)*

At $T_0$ time, flip-flop AMP is switched to its set state by the end of operation flip-flop (EOO)′ and the memory access next word time (CPN)′. At the same time, this first $T_0$ timing pulse resets all the other sequencing flip-flops due to the presence of the EOO′ signal.

When flip-flop AMP is switched to its set state, a signal is produced which gates the address stored in the P register into the memory address decoding logic. This results in the readout of the addressed memory cell contents into the M register at $T_3$ time.

At $T_2$ time, the B register (bits $B_0$ to $B_{19}$) is cleared so that it will be able to accept a new instruction from the M register (single ended input to B register).

At $T_3$ time, flip-flop AMP is switched to its set state from flip-flop AMI.

At $T_4$ time, the contents of the M register are transferred into the B register and the $I_0$ to the $I_4$ flip-flops in the I register are switched to their reset states. Flip-flop AMI is also switched to its reset state.

At $T_5$ time, the EOO flip-flop is switched to its reset state.

At $T_7$ time, the contents of the arithmetic unit are transferred to the I register bits $I_5$ to $I_{19}$. The B register flip-flops are switched to their reset state, excluding flip-flops $B_5$ and $B_6$.

At the next $T_0$ time, flip-flop AMP is switched to its reset state if central processor priority is available. If there are one or more binary one address modification bits, the flip-flop AMX is switched to its set state. Otherwise, either flip-flop AMI or flip-flop GIS is switched to its set state.

The switching of flip-flop AMP to its reset state is dependent upon the central processor being granted memory access during this next word time. If the central processor is not to obtain access to the memory because of a priority request from other equipment, flip-flop AMP remains in its set state.

*AMX·CP (index instruction)*

If bits $I_5$ or $I_6$ have anything but zeros in them, this operation, is effected. In this operation at $T_0$ time flip-flop AMX is swtiched to its set state by the AMP flip-flop, index bits $I_5$ and $I_6$ of the I register and the central processor priority pulse (CP). At $T_1$ time, the B register is cleared to all zeros so as to erase bits 5 and 6 therefrom which caused entry into AMX. The remaining positions of the B register were cleared at $T_7$ time of the AMP operation. At $T_2$ time, the information in the I register is transferred into the arithmetic unit by the enabling of the gating from the I register to the arithmetic unit. The modification address register modification word is transferred from the M register into the B register. Two words are added in the arithmetic unit resulting in the address positions $I_5$ to $I_{19}$ of the I register being modified.

At $T_0$ time, after the modification has taken place, the modified data address is transferred into the I register making it available to address the new memory position during this succeeding word time. At $T_1$ time, the B register is cleared to all zeros. At $T_2$ time, the gating from the I register to the arithmetic unit is enabled thereby allowing the transfer of the contents of the I register to the arithmetic unit. At $T_4$ time, the address modification word in the M register is transferred to the B register and added to bits $I_7$–$I_{19}$ of the I register. At $T_0$ time of the next word, the modified word is transferred to the I register from the arithmetic unit and the B register is switched to its reset state.

With the new word now in the I register, flip-flop AMI is switched to its set state if this is not a general instruction and central processor priority is available. If this is a general instruction (GIS), flip-flop GIS is switched to its set state whether or not the central processor has priority. In either case, i.e., AMI or GIS, at $T_1$ time following the completion of indexing, the gating from the I register to the arithmetic unit is disabled. Flip-flop AMI is switched to its said state at $T_0$ time if the term ($\overline{EOO'}\cdot\overline{GEN}'$, CPN′) is true.

If flip-flop AMI was switched to its set state, the memory is addressed from bits $I_5$ to $I_{19}$ of the I register. Flip-flop GIS is switched to its set state if the general instruction is detected, i.e., (GEN·$\overline{EOO}$)′. Both operations, AMI and GIS are execution of instruction word times. The AMI operation indicates "execute memory reference instruction" (address memory from the I register) and GIS indicates "execute general instruction" (general instruction sequencing).

CONTROLLER SELECTOR

The controller selector comprises the control logic which directs the flow of information between the central processor and selected peripheral devices.

The two essential functions of the controller selector are: (1) To provide an arrangement for the central processor to communicate with any of a number of peripheral controllers, i.e., the controllers associated with the peripheral devices in order to initiate the execution of an input/output instruction; and, (2) to provide an arrangement for the controllers associated with the peripheral devices to communicate with the central processor during the execution of the instructions.

In making the connection between a number of peripheral controllers to the controller selector, each peripheral controller is assigned a unique address. Each of the latter addresses is assigned a chosen memory access priority by the logic comprising the controller selector. In accordance with the logic arrangement, such priority assignment gives the highest priority to the lowest number addressed. Thus address 0 (zero) has the highest priority.

In the assignment of addresses to different controllers of the peripheral devices respectively, there has to be taken into consideration the memory requirements of each of such peripheral devices. The frequency of memory reference is normally directly proportional to the information transfer rate of the particular peripheral device involved. For example, the proper assignment of controller addresses in accordance with this system could be a high speed printed controller which would have a higher numbered address than a magnetic tape controller, the magnetic tape controller in turn having a higher numbered address than a random access memory controller. The reason for such choice is that the information transfer rate from the random access memory is normally higher than the information transfer rate from the magnetic tape, etc.

In the description of the sequencer, it was shown how the (AMI)′, (EOO)′, (GIS)′, $(\overline{SET\ GIS})'$, (OE–3CP), (OE–2·CP)′ and $(\overline{EOO})'$ signals were generated. The instruction decoding logic (FIGS. 36 and 37) showed the generation of the (GEN. BRANCH)′ signal. The I/O signal is generated upon the coincidence of the $\overline{I_7}'$, the $\overline{I_8}'$ signals and the GEN′ signal produced in the instruction decoding logic. The $I_{15}'$, the $I_9'$ and the $\overline{I_9}'$ signals, of course, are provided from the I register.

Referring now to FIG. 41, it is seen that upon the coincident occurrence of the $(I/O\cdot I_{15})'$ and (GIS)′ signals at the inputs to a gate G2253, gate 2253 is enabled to provide a binary one at the output thereof. This binary one output is inverted in an inverter I1863 to provide the $(I/O\cdot GIS\cdot I_{15})'$ signal.

The $(I/O\cdot GIS\cdot I_{15})'$ signal is applied to the set steering input of a flip-flop designated CWFF. Upon the arrival of the $T_2'$ pulse at a trigger input of flip-flop CWFF, it is switched to its set state, its set output being inverted in an inverter I1808. The output of inverter I1808 is applied as an input to a gate G1263 as is the (OE–2·CP)′ signal provided from the sequencer to enable gate G1263 and to produce at the output thereof the (CWFF·OE–2·CP) signal. Flip-flop CWFF is switched to its reset state when the (EOO)′ signal is true (applied to the reset steering input of flip-flop CWFF) and a $T_0'$ occurs. The reset output of flip-flop CWFF is applied to the set steering input of a flip-flop EC whereby when a $T_0'$ pulse appears at the trigger input of flip-flop EC, flip-flop EC is switched to its set state, the binary one set output of flip-flop EC being inverted in an inverter I1807 to provide the $\overline{EC}'$ signal. The EC′ signal is presented to the instruction decoding logic to derive the GEN instruction.

Upon the coincidence of the set output state of flip-flop CWFF (whereby a binary zero level appears at its reset output terminal) and the (AMI)′ signal at the inputs of gate G1865, the gate is enabled to provide at the output thereof the DMCW signal whose function will be further explained hereinbelow.

The coincident occurrence of the $(\overline{SET\ GIS})'$ signal and the output from the reset output terminal of flip-flop CWFF, when flip-flop CWFF is in its set state (CWFF)′, at the inputs to a gate G1260 enables gate G1260 whereby there appears at its output a binary one level which is the $(CWFF\cdot\overline{SET\ GIS})$ signal.

The coincident occurrence of the (OE–3·CP)′ signal and the CWFF′ signal at the inputs to a gate G1258 enables gate G1258 to produce at the output thereof a binary one level which is the (CWFF·OE–3·CP) signal.

The (CWFF)′ signal from the output of inverter I1808 is reinverted in an inverter I1604 to provide a binary one level at the output of inverter I1604 which is the P→AU signal. Also upon the coincidence of a $T_0'$ pulse, the (CPN)′ signal from the priority interrupt arrangement in the central processor indicating that the central processor has the next priority, the reset state of the EOO flip-flop $(\overline{EOO})'$ and the CWFF′ signal a gate G2258 is enabled, the binary one level consequently appearing at the output of gate G2258 being the AU→I signal.

Upon the joint occurrence of the (GIS)′ signal the (GEN. BRANCH)′ signal, the CP′ signal and the $I_{15}'$ signal, a gate G2257 is enabled to provide a binary one level at the output of gate G2257 which is the (DMBC·CP) signal, the output of gate G2257 being inverted in an inverter I2257 to provide the (DMBC·CP)′ signal.

Upon the joint occurrence of the CP′ signal, the I/O′ signal and the $I_{15}'$ signal, a gate G1262 is enabled to provide at the output thereof a binary one level which is the $(I/O\cdot I_{15}\cdot CP)$ signal, the output of gate G1262 being inverted in an inverter I1223 to produce at the output thereof the $(I/O\cdot I_{15}\cdot CP)'$ signal.

The coincident occurence of the $\overline{I_9}'$ and the DMCL′ signals appearing at the inputs to a gate G603 enables gate G603 to produce at the output thereof a binary one level which is the $(DMCL'\cdot\overline{I_9}')$ signal and the coincident occurrence of the $I_9'$ signal and the DMCL signal at the inputs of an AND gate G604 enables gate G604 whereby there appears at the output thereof a binary one level which is the $(DMCL\cdot I_9')$ signal.

The outputs of gates G603 and G604 are applied as inputs to a gate G602 whereby when there is a binary one level at either of these inputs, gate G602 is enabled to produce a binary zero level at the output thereof.

Upon the joint occurrence of $T_3'$ pulse, a binary zero level from the output of gate K602 and the (DMCL·CP)′ signal, a gate G600 is enabled to produce a binary one level at the output thereof which is the $$[(I_9\cdot DMCL+\overline{I_9}\cdot DMCL)\cdot T_3\cdot(DMBC\cdot CP)]$$

signal. The outputs of gates G2258 and G600 are applied as inputs to gate G2244 whereby when there is a binary one output from either gate G2258 or gate G600, gate G2244 is enabled to provide a binary zero level at the output thereof which is the (INC P)′ signal, i.e., increment P register signal.

In the operation of the arrangement of FIG. 41, the $\overline{EC}'$ is a necessary term in the input of a G1913 (see FIG. 33) in the instruction decoding logic to generate the (GEN)′ signal. The DMCW signal is the command word signal in the operation of the controller selector. The I/O signal is provided from the instruction decoding logic (FIGS. 32–40) and is $(\overline{I_7}\cdot\overline{I_8}\cdot GEN)$. The $GIS\cdot I/O\cdot I_{15}$ signal is necessary to generate the DMCS (controller select command) signal shown in FIG. 43.

The GEN. BRANCH signal is provided from the instruction decoding logic (see FIGS. 32–40) and is $(I_7\cdot I_8\cdot GEN)'$. This signal is necessary to generate the DMBC signal (Branch Select Cycle) which is utilized in the operation of the controller selector.

The $(I/O\cdot I_{15}\cdot CP)'$ signal is applied to a gate G1234 in the Sequence Control (FIG. 15) to set flip-flop OE–2. The $\overline{I_{15}}$ signal is utilized in the P control of the P register to generate the INC P signal.

The $(\overline{SET}\ \overline{GIS}\cdot CWFF)$ signal is utilized in the sequencer to switch flip-flop AMI thereof to its set state. The (CWFF·OE–3·CP) signal is utilized in the sequencer to switch flip-flop EOO to its set state and the (CWFF·OE–2·CP) signal is utilized in the sequencer to switch flip-flop OE–3 to its set state. The P→AU signal is utilized in the AU control. The AU→I signal is utilized in the I register.

*Initial selection*

To command a controller of a peripheral device to perform a particular operation, three words from the memory are bought by the computer to initiate the operation. The first of these words is a general instruction which has the unique configuration to cause the selection of the controller of a peripheral device when the instruction is sequenced by the central processor. FIG. 42 indicates the format of such general instruction. The bit positions which are not filled in in FIG. 42 indicate that the latter bits are not significant during the execution of such instruction. Bit positions 11, 12 and 13 are utilized to hold the address of the controller of the peripheral device which is to be selected. These bits are made available to the controller selector along with the decoded output of the instruction decoding (FIGS. 32–40) which provides the DMCS (controller select) signal whenever the conditions GIS, I/O, and $I_{15}$ are true.

Referring now to FIG. 43, it is seen that when the $(I/O \cdot GIS \cdot I_{15})'$ signal is present, a binary one level appears at the output of an inverter I318 which enables a gate G302 to which it is applied. Consequently, a binary zero appears at the output of gate G302 to generate the DMCS' signal.

At the joint occurrence of the DMCS' signal and the $T_1'$ pulse, an AND gate G306 is enabled to produce a binary one level at the output thereof, this output binary being inverted to a binary zero level in an inverter I320. The output of inverter I320 is applied to gates G315, G312 and G309.

It is seen that the other input to gate G315 is the $I_{13}'$ bit, the other input to gate G312 is the $I_{12}'$ bit and the other input to gate G309 is the $I_{11}'$ bit. Depending on the true or false states of bits $I_{13}$, $I_{12}$ and $I_{11}$, none, any, or all of gates G315, G312 and G309 are enabled to produce binary one levels at their respective outputs.

The outputs of gates G315, G312 and G309 are applied as inputs to gates G317, G314 and G311 respectively whereby a binary one level input thereto produces a binary zero level output therefrom. The outputs of gates G317, G314 and G311 are applied to pulse distributors AB01, AB02 and AB03 respectively whereby to those which a binary zero is applied, produce outputs on their $L_1$, $L_2$ lines. The outputs of pulse distributors AB01, AB02 and AB03 are received on $L_1$, $L_2$ lines of an identical set of pulse distributors associated with each of the peripheral controllers, each being assigned a different address. In this manner, the controller of a particular peripheral device is addressed.

It is appreciated that the use of three bits, viz., $I_{13}$, $I_{12}$ and $I_{11}$ makes possible eight combinations whereby in accordance with the arrangement shown in FIG. 43, eight peripheral devices can be addressed. It is, of course, understood that this arrangement is shown by way of example, and it is contemplated to cover any number of addressing combinations, it being readily apparent that a four bit address code would enable the addressing of sixteen peripheral devices, etc.

At $T_2$ time of the same word, pulse distributor XCS is enabled provided that the signal $(I/O \cdot GIS \cdot I_{15})'$ is true whereby the XCS signal is transmitted to the controllers of the peripheral devices. The XCS signal is received on $L_1$, $L_2$ lines of the corresponding respective pulse distributors in the peripheral controllers. The XCS signal effectively permits the addressed peripheral controller to select itself. The only information that a peripheral controller receives during the select operation (lasting one word time) is its own address and the select signal indicating the time when it is to use the address to select itself.

Thus, if it is assumed that the central processor has just sequenced its first input/output instruction requiring the controller of a peripheral device (it is further assumed that none of the peripheral controllers are as yet in operation), the DMCS (controller select) signal is directed to the controller selector's peripheral controller selection addressing logic. This signal is generated whenever an input/output instruction requiring a peripheral device is to be initiated and in turn directs the controller selector's controller selection addressing logic to transmit the binary coded value of the selected peripheral controllers address (I register bits, 11, 12 and 13) via three controller address transmission lines (AB01–3) to all controllers.

This address is in turn received by the pulse distributor circuits in each peripheral controller, the sampling of the contents of these pulse driver circuits being contingent upon the additional receipt of the controller select signal (XCS) by the peripheral controllers. The XCS signal is generated by the controller selector's selector control and sync generator circuits (SCSG) and is transmitted to all of the peripheral controllers. This operation permits the peripheral controller whose address compares equally to the previously transmitted address to select itself. Such controller whose address compares equally to the previously transmitted address now remains selected throughout the execution of a given instruction (for example until N words are read from tape). The controller selection addressing logic also encodes the output of the controller selector's priority logic during interrupt operations as will be further explained hereinbelow.

At $(T_4)'$ time, if an echo signal $(BU00)'$ is not detected, i.e., the peripheral controller addressed during the controller select operation is not operable whereby the $(\overline{BU00})'$ signal is true and since the DMCS' signal is present for the whole selected word time, a gate G307 is enabled whereby its binary one output switches a flip-flop ECO (echo alarm) to its set state. The resulting ECO output signal from this flip-flop is utilized to energize an indicating device on the console of the system.

The two words following the select command in the program are transmitted by the controller selector over the main information buss, and the selected controller of the peripheral device will accept one or both of these words depending upon the requirements of such peripheral controller. Thus, for example, if a magnetic tape peripheral controller had been addressed and selected, the two command words could specify that the controller is to read tape, where the starting memory location is (i.e., where the first word to be read is stored in the memory), and how many words are to be read during the execution of this instruction.

To effect the transfer of the two command words to the selected controller, the controller selector first receives a signal from the central processor which indicates the memory cycles during which the central processor is free to make these command words available. The central processor is free to make these words available only during those word times in which the central processor has priority. A signal-transmit command word (XPC) is then transmitted by the controller selector to the selected peripheral controller. In this latter connection, actually the XPC signal is transmitted by the controller selector to all peripheral controllers. However, it is only utilized by the selected controller thereby signalling that the transmission of a command word over the main information buss is to follow. The signal (XMC), transmit memory to controllers, effects the command word transfer as immediately described hereinabove. The signal (XMS), memory sample, follows the memory output transmission completing the command word transfer.

As will be seen, the operations for transmission on both of the command words respectively are identical.

It is recalled from FIG. 41 that the DMCW signal is generated when (AMI)' and (CWFF)' signals jointly occur. The time of the DMCW signal is designated as the Command Word Time. In FIG. 44 it is seen that the DMCW signal is inverted in an inverter 1440 and at $T_2'$ time, a pulse distributor XPC is enabled to transmit the XPC signal on its $L_1$, $L_2$ lines to corresponding pulse distributors in the peripheral controllers.

Referring now to FIGS. 45 to 47, it is seen that at $T_4'$ time, the XMC signal is generated. This signal is applied to the pulse distributors comprising the main buss, viz., pulse distributors BU00 to BU20. Also applied to the pulse distributors BU00 to BU20 are the respective outputs of the M register flip-flops $M_0$ to $M_{20}$.

If the controller selector has priority whereby the $IC_3$ signal is true, this signal is inverted in an inverter I100 to provide the signal $IC_3'$. Upon the coincident occurrence of the $IC_3'$ signal and $T_5'$ pulse of the command word time, a gate G102 is enabled, the consequent binary one output produced thereby being the XMS signal. The XMS signal is inverted in an inverter I110 to produce the XMS' signal, the latter being applied together with the $(\overline{IOT})$ signal as inputs to a pulse distributor XMS whereby it is enabled and the XMS signal is received in corresponding pulse distributors in the peripheral controllers. It is to be noted that the BU00 to BU20 pulse distributors are arranged to be latched up so as to function as flip-flops. Of course, the BU00–BU20 pulse distributors also have their exact counterparts in the peripheral controllers. The generation of the $(\overline{IOT})$ signal input to the XMS pulse distributor is further explained hereinbelow.

*Branch quizzing*

In the system of this invention, several branching conditions are associated with each peripheral controller. Branch instructions associated with the controllers of the peripheral devices are chosen to be one word in length and contain the address of the peripheral controller being interrogated, and the specific condition being tested. FIG. 48 indicates the format of such branch instruction.

The control signal during the branch select cycle is the one designated DMBC. Referring back to FIG. 41, it is seen that the DMBC·CP signal is generated upon the enabling of gate G2257, gate G2257 being enabled upon the coincident inputs thereto of the (GIS)', the (GEN. BRANCH)', the $I_{16}'$ and the CP' signals. In FIG. 43, it is seen that the (DMBC·CP) signal is inverted in gate G302 to provide the (DMBC)'. It is also seen that similar to the operation of the (DMCS)' signal, upon the coincident occurrence of the $T_4'$ signal a $(\overline{BU00})'$ signal and the (DMBC)' signal as inputs to gate G307, a binary one level is produced at the output thereof to switch the echo alarm flip-flop ECO to its set state at $T_4$ time of the branch select cycle to indicate that the peripheral device is inoperative.

Also, at $T_1'$ time, upon the coincident of the $T_1'$ pulse and the (DMBC)' signal at the inputs of gate G306, gate G306 is enabled, the binary one output consequently produced therefrom being the $XCA_1$ signal. The $XCA_1$ signal is inverted in inverter I320, the consequent $(XCA_1)'$ signal output from inverter I320 being applied as inputs to gates G315, G312 and G309 respectively. As in the operation of the DMCS signal, since the $I_{13}$, $I_{12}$ and $I_{11}$ bits are also respectively applied as inputs to these gates, the address of a selected controller appears at the outputs of gates G317, G314 and G311 which enables the pulse distributors AB01, AB02 and AB03. Consequently, the address of the selected peripheral controller is sent out on the $L_1$, $L_2$ lines of these pulse distributors and is received in the corresponding pulse distributors of the peripheral controllers.

The (DMBC·CP) signal is inverted in an inverter I319 to provide the (DMBC·CP)' signal. The latter signal is applied as an input to a pulse distributor XBS as is the $T_2'$ signal whereby at $T_2$ time of the DMBC cycle, the XBS signal is transmitted on the $L_1$, $L_2$ lines of pulse distributor XBS to corresponding pulse distributors in the peripheral controllers. The combination of the $XCA_1$ signal and the XBS signal permits a peripheral controller to select itself for interrogation.

The selected peripheral controller then immediately transmits back to the controller selector, all of its quizzable branching conditions, i.e., over the $L_1$, $L_2$ lines of its pulse distributors corresponding to the pulse distributors BU01 to BU16 (FIG. 49) of the controller selector when sixteen branching conditions are available wherein this information is "latched" up to provide where indicated the BU01 to BU16 and (BU01)' to (BU16)' signals.

In FIGS. 32–40 in the instruction decoding logic, it is shown how bits $I_{16}$ to $I_{19}$ of the I register are decoded to provide the signals $D_0'$ to $D_7'$ and $D_{10}'$ to $D_{17}'$. These bits are utilized by the controller selector to compare with the quizzable conditions received from the peripheral controllers to determine whether or not a branch is to occur. Such comparison is effected with the arrangement shown in FIG. 49. It is seen that each $D_n'$ signal is applied to a different gate as is correspondingly applied a (BUN)' signal. It is noted that a diode is provided at the output of each gate of this arrangement, the anodes of these diodes being connected together. This serves effectively to OR the outputs of these gates, the output being the compared logic signal DMCL. In FIG. 41, it is recalled that at the coincidence of the (DMCL) and $\overline{I_9}'$ signals at $T_3'$ time, the (INC P)' signal is generated which is presented to the P register control in the central processor.

In the table below, there are shown, for example, how the branch condition bits may be utilized with the controllers of a magnetic tape, a high speed printer and the random access memory.

| | Main Buss |
|---|---|
| Tape Controller: | |
| $D_0$—Tape Controller Busy | BU01 |
| $D_1$—Tape Controller End of File | BU02 |
| $D_2$—Tape Controller Beginning of End of Tape | BU03 |
| $D_3$—Tape Controller Any Tape Rewinding | BU04 |
| $D_4$—Tape Controller Parity Error | BU05 |
| $D_5$—Tape Controller Input/Output Error | BU06 |
| $D_6$—Tape Controller Modulo Error | BU07 |
| $D_7$—Tape Controller Any Error | BU08 |
| Printer Controller: | |
| $D_0$—Printer Controller Busy | BU01 |
| $D_2$—Printer Controller Out of Paper | BU03 |
| $D_7$—Printer Controller Any Error | BU08 |
| Random Access Memory: | |
| $D_0$—MRAM Controller Busy | BU01 |
| $D_1$—MRAM Controller File #1 Ready | BU02 |
| $D_2$—MRAM Controller File #2 Ready | BU03 |
| $D_3$—MRAM Controller File #3 Ready | BU04 |
| $D_4$—MRAM Controller File #4 Ready | BU05 |
| $D_5$—MRAM Controller Input/Output Error | BU06 |
| $D_6$—MRAM Controller Parity Error | BU07 |
| $D_7$—MRAM Controller Any Error | BU08 |

Thus, it is seen that during the execution of a branch instruction, the controller selector receives the command signal DMBC (branch select) from the central processor's instruction decoding network. The controller selector also receives the address of the controller of the peripheral device to be quizzed, and the decoded value of the I register in the form of D signals which represent a condition to be tested. When the controller selector receives the DMBC signal from the central processor, bits $I_{11}$, $I_{12}$ and $I_{13}$ of the branch instruction are transmitted to the controllers of the peripheral devices on the controller address buss similar to the operation of the DMCS signal. The transmission of the quizzed controller address is then followed by a control signal, branch select (XBS). The combination of the foregoing two sets of signals permits a controller of a peripheral device to select itself for interrogation.

The controller of the selected peripheral device thereafter immediately transmits back to the controller selector all of its quizzable branching conditions over the main information buss (the BUN pulse distributors). The Nos. 16 through 19 bits of the I register actually describe the condition to be quizzed. The latter bits which are decoded by the central processor are utilized by the controller selector to make a comparison with the quizzable conditions which are received from the controllers of the peripheral devices to determine whether or not a branch condition is to be effected. The result of such comparison is presented to the central processor in the form of a signal designated DMCL (compare logic).

*Interrupt operations*

The communication of the controller of a peripheral device with the controller selector after such peripheral device controller has been selected for operation is initiated by the selected peripheral controller asking the controller selector for memory access. Upon receiving a memory access request or a number of such memory access requests, priority control logic contained in the controller selector generates the address of the controller of a peripheral device which is to receive access to the memory and generates such address over a controller address buss. The controller address transmission is thereafter followed by the transmission of the priority select control signal (XPS) to all controllers. The peripheral controller whose address compares with the transmitted control address when the XPS signal is received then transmits to the controller selector over the main buss, the address of the memory location to be made accessible. Such address is inserted into a register of the controller selector which comprises fifteen flip-flops (FIGS. 53 and 54).

Upon the selection of a controller of a peripheral device to receive a memory access, a signal is generated in the controller selector and transmitted to the central processor for a requesting of memory access. The central processor then, through its priority control logic, assigns priority to the controller selector (i.e. normally grants its request) at which time the address register of the controller selector is utilized to address the memory.

At the same time that the controller of the peripheral device selected for access to the memory transmits the contents of its own address register to the controller selector, such selected peripheral controller transmits an IN/OUT signal (IOT), if the request for memory access is for a write into memory (input). The complement of the IOT signal designates an output operation. The IOT signal is transmitted over the main buss with the address information.

After a controller of a peripheral device has been selected for priority and the address register of the controller selector is filled, the controller selector receives from the central processor, a signal ($IC_3$) indicating the memory cycle during which the controller selector has memory access. Such signal is used in the controller selector in conjunction with memory timing signals to execute the information transfer between the memory of the central processor and the selected peripheral controller over the main buss.

In FIG. 44, it is seen that the pulse distributor XRS is enabled at $T_2$ time by the application of the $T_2'$ pulse and the $(\overline{IXRS})'$ signal thereto. The function of the latter signal is further explained hereinbelow. When pulse distributors XRS is enabled, the XRS signal is sent out over its $L_1$, $L_2$ lines to a corresponding pulse distributor in each of the peripheral controllers.

In FIG. 50 it is shown that when the $(IC_3)'$, i.e., the controller selector priority signal is true, at $(T_1)'$ time, a gate G211 is enabled to produce a binary one level at the output thereof, which when inverted provides the MAR′ signal that indicates the controller priority select operation.

In FIG. 43, it is noted that when there are jointly applied as inputs to a gate G308, the $(\overline{IXRS})'$ signal, the $(T_5)'$ pulse and the MAR′ signal, gate G308 is enabled to produce the $XCA_2$ signal at its output, the $XCA_2$ signal being inverted in an inverter I321 to produce the signal $(XCA_2)'$. The output of inverter I321 is applied as an input to gates G316, G313 and G310. Applied as the other input to gate G316 is the output of a gate G305; applied as the other input to gate G313 is the output of a gate G304 and applied as the other input to gate G310 is the output of a gate G303. The inputs to gates G305, G304 and G303 are the reset outputs of the priority flip-flops PFFI to PFF7, the function of which is further explained hereinbelow.

It is realized that a binary zero is produced at the output of gate G305 whenever either of flip-flops PFF1, PFF3, PFF5 or PFF7 are in their set states. A binary zero output is produced from gate G304 whenever either of flip-flops PFF2, PFF3, PFF6 or PFF7 are in the set states. A binary zero output is produced from gate G303 whenever flip-flops PFF4, PFF5, PFF6, or PFF7 are their set states. With this arrangement, a three bit code is provided from the outputs of OR gates G317, G314 and G311 to correspondingly enable pulse distributors AB01, AB02 and AB03 and accordingly address only one of the peripheral controllers.

In FIG. 43, it is shown that the XPS pulse distributor is enabled upon the application thereto of the $(T_6)'$ pulse the (MAR)′ signal and the $(\overline{IXRS})'$ signal, the $(\overline{IXRS})'$ signal being inverted in an inverter I300. Thus at $T_6$ time, the XPS signal is transmitted on the $L_1$, $L_2$ lines of the XPS pulse distributor to be received on the $L_1$, $L_2$ lines of corresponding pulse distributors in each of the peripheral controllers.

After the initial selection of a peripheral controller has been effected, the need for memory utilization by a peripheral controller for either input or output purposes is made known to the controller selector via access request lines. Each of these transmission lines is discrete to an individual peripheral controller respectively. At $T_2$ time of all word times other than those during which the controller selector is awaiting memory access (i.e., due to card reader access), the controller selector transmits the memory access request sync signal (XRS) to all peripheral controllers to enable them to transmit their requests for access to the memory on access request lines. These lines terminate in the controller selector's priority logic at the set of eight pulse distributor circuits which are designated as PFF0–7. It is recalled that in the description of the pulse distributor circuit it was shown that since these circuits have the ability to "latch" themselves upon the receipt of a signal, the PFF0–7 pulse distributor circuits may also be referred to as flip-flops.

If there is more than one request for memory access at this time, more than one of the PFF flip-flops will be latched up. However, logic associated with these flip-flops will permit only the PFF flip-flops with the highest priority assignment to remain in the set condition. Accordingly, only one of the lines through the controller selector addressing logic from the priority logic is energized, the selected line being encoded, and transmitted via the AB01–03 lines as being the binary address of the peripheral controller that is to receive memory access during the next available controller selector word time.

Whenever any one of the PFF flip-flops is set due to a request for access by a peripheral controller, the signal designated memory access request (MAR) is generated in the controller selector and transmitted to the central processor's interrupt control logic.

In FIGS. 50–52, there is shown the arrangement of the PFF0 to PFF7 pulse distributors. When an access request is received on the $L_1$, $L_2$ lines of one of these pulse distributors, it is "latched" whereby it functions like a flip-flop that has been switched to its set state.

It is seen that an inverter is associated with each of pulse distributors PFF1 to PFF7 and that the set output of pulse distributor PFF0 is applied to all of the other pulse distributors PFF1 to PFF7. With this arrangement, accordingly, when flip-flop PFF0 is latched in its set state, none of the pulse distributors PFF1 to PFF7 can be in their set states. If pulse distributor PFF1 is in its set state, then the output of an inverter I200 which is applied to the remaining pulse distributors PFF2 to PFF7 prevents the others from being latched, etc. Accordingly, with this arrangement, pulse distributors PFF0 to PFF7 provide a descending order of priority, the priority varying inversely with the numerical designation of the pulse distributor.

In FIGS. 50–52, there is also shown the arrangement of the IXRS flip-flop. In this connection, it is seen that the outputs from the set output terminal of pulse distributor PFF0 and from the outputs of the inverters associated with pulse distributors PFF1 to PFF4 are applied as inputs to a gate G205. The output of gate G205 is inverted in an inverter I205 and applied as an input to a gate G209. Also applied as inputs to OR gate G209 are the outputs of the inverters associated with pulse distributors PFF5 to PFF7. With this arrangement, accordingly, if there is a binary zero output from gate G209, it indicates that one of pulse distributors PFF0 to PFF7 has received an access request.

The output of gate G209 is inverted in an inverter I201 and applied as an input to a gate G210. At the coincidence of a binary zero output from inverter I201, the $(T_1)'$ timing pulse and the $(\overline{IC_3})'$ signal, i.e., the controller selector does not have priority, an AND gate G210 is enabled. The consequent binary one output from gate G210 switches flip-flop IXRS to its set state whereby there is provided at its reset output terminal, the signal (IXRS)'. When flip-flop IXRS is in its reset state, there is provided at its set output terminal, the signal $(\overline{IXRS})'$.

The IXRS flip-flop is switched to its reset state at $T_1$ time with the concurrence of the $(IC_3)'$ signal. It is switched to its set state at $T_1$ time, if any of the PFF pulse distributors is latched in its set state. The IXRS flip-flop, if in its set state, will not be switched to its reset state unless the controller selector receives memory priority access during the memory cycle following the generation of a request for memory priority. This is seen in FIGS. 50–52 wherein $(IC_3)'$ is a necessary element to enable gate G211.

When flip-flop IXRS is in its set state the XRS, XCA, XPS and GBUA signals are inhibited since the term $(\overline{IXRS})'$ is a necessary element in their generation.

*Interrupt operations*

The communication of a peripheral controller with the controller selector, after the given peripheral controller has been selected for operation, is initiated by the peripheral controller asking the controller selector for memory access. Upon receiving a memory access request or a number of access requests, the prirority arrangement in the controller selector generates the address of the peripheral controller to receive memory access and to transmit this address over the peripheral controller address buss (pulse distributors AB01 to AB03). The controller address transmission is followed by the transmission of the priority select control signal (XPS) to all peripheral controllers. The peripheral controller whose address corresponds with the transmitted address when the XPS signal is received transmits to the controller selector over the main buss, i.e., the BU pulse distributors, the address of the memory location to which access is desired. This address is placed in the controller selector's fifteen flip-flop address register, viz., flip-flops PA05 to PA19.

At $T_0$ time of the next word time after the priority select operation, the condition of pulse distributor BU20, FIGS. 45 to 47, is examined. This is seen in FIG. 44 wherein it is shown that a gate G435 is enabled at the coincident applications as inputs thereto of the $T_0'$ pulse, the (BU20)' signal indicating that pulse distribution BU20 is latched and the $(\overline{IXRS})'$ signal. The arrangement has been chosen such that pulse distributor BU20 is latched when a peripheral device has requested memory access in order to write, i.e., insert data into the central processor's memory. If pulse distributor BU20 is latched, a flip-flop IOT is switched to its set state, the IOT signal signifying that a data word is to be inserted into the memory at a selected address thereof. If pulse distributor BU20 is not latched, i.e., is not in its set state, flip-flop IOT remains in its reset state, it having been switched to its reset state during $T_6$ time of a word in which the controller selector has memory access priority. The signal $\overline{IOT}$ thus signifies a read from memory operation.

Assuming that pulse distributor BU20 is not latched, i.e., not in its set state, the contents of the BU05 to BU19 pulse distributors are inserted into the controller memory address registers, viz., flip-flops PA05 to PA19. In FIGS. 53–55, it is shown that a PA flip-flop is switched to its set state by the coincidence of the GBUA signal and the set state of a corresponding BU pulse distributor. A PA flip-flop is switched to its reset state by the coincidence of the GBUA signal and the reset state of a corresponding BU pulse distributor.

When a PA flip-flop is in its set state and provided that the controller selector priority signal $(IC_3)'$ is present, a gate associated therewith is enabled which provides a binary one level that is the memory address signal. These signals are designated MA05 to MA19. The memory address signals are presented to the memory. At $T_1$ time (FIGS. 45–47), all of the BU pulse distributors are switched to their reset states by the (BRES)' signal, the latter signal being the $T_1)'$ pulse. Thus at $T_1$ time, the main buss is reset and prepared to receive new information.

At $T_4$ time the (XMC)' signal is generated. This is seen in FIGS. 45–47 wherein it is shown that upon the coincident input of the $(IC_3)'$ $(\overline{IOT})'$ and $T_4'$ signals to gates G103 and G104, produce an output at the binary one level which is the signal XMC, the XMC signal being inverted in an inverter I126 to produce the (XMC)' signal. The XMC' signal is applied as an input to the BU pulse distributors whereby the memory contents stored in these pulse distributors is transmitted on their respective $L_1$, $L_2$ lines to the $L_1$, $L_2$ lines of the corresponding pulse distributors in the peripheral controllers.

At $T_5$ time, the memory sample signal XMS is transmitted from the controller selector to the peripheral controller indicating that it has received the contents of memory it had requested. In FIGS. 45–47, it is seen that a gate G102 is enabled upon the coincident input thereto of the $T_5'$ pulse and the $(IC_3)'$ signal to generate the XMS signal. The XMS signal is inverted in an inverter I110 to produce the (XMS)' signal. The (XMS)' and the $(\overline{IOT})'$ signals are applied as inputs to pulse distributor XMS whereby the XMS signal is transmitted on its $L_1$, $L_2$ lines to the corresponding pulse distributors in the peripheral controllers.

If the interrupt is to write into memory, pulse distributor BU20 is in its set state whereby the IOT signal is generated at $T_0$ time.

At $T_1$ time, flip-flop IXRS (FIGS. 50–52) is switched to its reset state if the controller selector is granted priority. If flip-flop IXRS is switched to its reset state indicating successful priority establishment for the controller selector, information can now be transferred from the selected peripheral controller to the controller selector on the main buss (BU pulse distributors). This is accomplished at $T_2$ time after the BU pulse distributors are cleared at $T_1$ time as has been explained above.

To accomplish the above, the XDS signal is transmitted. The arrangement for effecting the generation of the XDS signal is depicted in FIG. 44. It is shown therein that a gate, G434 is enabled upon the coincident input thereto of the (IOT)′ and the $T_2$′ signals whereby a binary one level is produced at the output of gate G434. The output of gate G434 is inverted in an inverter I436, the output of inverter I436 being applied as the input to a pulse distributor XDS. The other input to pulse distributor XDS is the $(IC_3)'$ signal. Upon the energization of pulse distributor XDS, the XDS signal is transmitted on its $L_1$, $L_2$ lines to the corresponding XDS pulse distributors in all of the peripheral controllers. The transmission of the XDS signal causes an information transfer from the selected peripheral controller to the BU pulse distributors where such information is latched up.

At $T_4$ time, the GBM signal is generated. In this latter connection, it is seen in FIG. 44 that upon the coincident occurrence of the $(IC_3)'$ pulse and the (IOT)′ signal at the inputs of a gate G405, this gate is enabled, the binary one output consequently produced therefrom being the GBM signal. The GBM signal is inverted to the (GBM)′ signal in an inverter I405.

In FIG. 56, it is shown how the GMN signals are generated to transfer the information from the peripheral controller to the memory. In this connection, for example, if it assumed that pulse distributor BU06 is latched up, then upon the coincidence of the (GBM)′ and (BU06)′ signal inputs to a gate G943, gate G943 is enabled to produce the GM06 signal. The GMN signals gate the data word latched up in the BU pulse distributors into the memory at the selected address. Since this interrupt operation inserts but one word into the memory, an identical repetition of the operation is required for every subsequent word transfer from the peripheral device into the memory.

It is noted that at $T_2$ time, the XRS (FIG. 44) pulse distributor is also energized by the coincidence of the $T_2$′ pulse and the $(\overline{IXRS})'$ signal. At $T_1$ time, the BRES (FIG. 45) signal is generated to reset the BU pulse distributors.

*Controller address changing*

It is possible to change the address of a peripheral controller by changing a connector in the peripheral controller. To change the address of a peripheral controller, the decode logic in such controller has to be rearranged whereby it recognizes a new address, i.e., such new address compares equally with an address transmitted to it. Accordingly the output of the controllers memory access request of the pulse distributors which are connected to one of the access request busses respectively is shifted to another line associated with a new address.

To summarize the operation of the controller selector, reference is made to FIG. 57. In considering the operation, if it is assumed that the central processor has just sequenced its first input/output instruction requiring a peripheral controller (it is assumed that none of the peripheral controllers are as yet in operation), a signal provided through the operation of the I register and the Instruction Decoding Stage of the central processor and designated DMCS (controller select) is directed to the selector controller's addressing logic included in block designated thereby. This signal is generated whenever an input/output instruction requiring a peripheral device is to be initiated and in turn directs the controller selector's addressing logic to transmit the binary coded value of the selected peripheral controller's address. Where eight peripheral devices are utilized, for example, the three I register bits such as bits $I_{11}$, $I_{12}$ and $I_{13}$ may be utilized. These addresses are transmitted over the controller address transmission lines AB01 to AB03 to all peripheral controllers.

This address is in turn received by corresponding pulse distributors in each peripheral controller, the sampling of the contents of the receiving pulse distributors being contingent upon the additional receipt of a controller select signal (XCS) by the peripheral controllers. The (XCS) signal, generated by the controller selector's selector control and sync generator circuits depicted in block form in FIG. 57, is transmitted to all peripheral controllers, and permits the controller whose address coincides with the transmitted address to select itself. This peripheral controller will now remain selected throughout the execution of the instruction, for example, until N words are read from tape. The controller selector's addressing logic also encodes the output of the controller selector's priority logic during interrupt operations.

The same transmission lines used to initially select a controller are used many times during the execution of the instruction. Specifically, these three lines and their associated pulse drivers AB01 to AB03 are used each time a peripheral controller is granted memory access (following the appropriate request from the peripheral controller) to notify the controller of this fact. This latter use of the controller transmission lines is accompanied by a priority select control signal (XPS) produced by the selector control and sync generator logic. The address transmission lines are also used during branch instruction executions, at which time the control signal XBS (branch select) accompanies the address.

In accordance with the system of this invention, the control signals from the controller selector to the controllers of the peripheral devices are made available from the controller selector's selector control and sync generator circuits. These signals, similar to information signals, are transmitted to the controllers of the peripheral devices via the pulse distributor circuits in the controller selector. These control signals are:

XPS—Priority Select
XCS—Controller Select
XRS—Memory Access Request Sync
XRA—Reset Controller Address
XBS—Branch Select
XPC—Pre-Command Snyc
XMS—Memory (output) Sample Sync
XDS—Transfer Data Sync Transfers of information between the central processor and the controllers of the peripheral devices (address or data) are made over the main buss (via pulse distributors BU00–20) and are accompanied by one of the above tabulated control signals to inform the peripheral controller of the particular operation being performed and the time of such operation. The above tabulated signals are essentially generated in response to the primary control signals received from the instruction decoding network of the central processor, examples of such signals being the controller select signal (DMCS), the branch select signal (DMBS), the controller selector priority signal $(IC_3)$, the timing generator signals $(T_0–T_7)$ and the signals from the controller priority logic in the controller selector itself. The signals from the controller priority logic are produced whenever the controller selector is about to enter an "interrupt mode" of operation following a "request for memory access" from one of the controllers of the peripheral devices.

After the selection of a peripheral controller has occurred, the need for memory utilization by a peripheral controller for either input or output purposes is made known to the controller selector via the access request lines. For example, where eight peripheral devices are utilized, there are eight such lines (designated in FIG. 57 as AR Lines). At $T_2$ time of all word times other than those during which the controller selector does not have memory access, (because the card reader has such access), the controller selector transmits an XRS signal to all peripheral controllers enabling them to transmit their requests for access on the lines. These lines terminate in the controller selector's priority logic at a set of pulse distributors, designated PFFN.

If there is more than one request for memory access at this time, more than one of these PFF pulse distributors are latched up. However, logic associated with these pulse distributors will permit only the one thereof with the highest priority assignment to remain in the set state. Thus, referring to FIG. 57, only one of the lines to the controller selection addressing logic stage from the priority logic stage is energized, the selected line being encoded and transmitted, via the AB01 to AB03 pulse distributors as being the binary address of the peripheral controller that is to receive memory access during the next available controller selector word time.

Whenever any of the PFF pulse distributors is set due to a request for access by a peripheral controller, a signal designated MAR (Memory Access Request) is generated in the Controller Selector and sent to the central processor's interrupt control logic.

There are 21 pulse distributor circuits which are conveniently designated as BU00–BU20 such circuits being utilized during each of the following operations:

(1) The transmittal of the 21 bits of information (including parity) contained in the M register of the central processor to a selected peripheral controller over the main buss transmission lines during memory output operations. This information is usually data. However, during the initial selection of the controller of a peripheral device by the central processor, this is a command (instruction) word.

(2) The receiving of 21 bits of information (including parity) from a selected controller via the same transmission lines. This information which is received and stored in the BU00–BU20 pulse distributor circuits is subsequently transferred to the M register via the memory input gating logic during output operations.

(3) The receiving of the memory address from the peripheral controller selected to access memory during interrupt operations (either input or output). Pulse distributors, BU05–BU19, are employed during this operation.

(4) The receiving of several quizzable conditions such as eight, for example, from a selected peripheral controller during the execution of a controller selector branch instruction. Pulse distributors BU01–BU08 are used in conjunction with this operation.

(5) The indicating as to whether the data transfer to be made during the interrupt operation is to be an input or an output type of operation. If the operation is of the input type, pulse distributor BU20 is placed in its set state. If the operation is of the output type, pulse distributor BU20 is left in its reset state. Such transfer of bit 20 from the peripheral controller to the controller selector occurs simultaneously with the transmission of the memory address to pulse distributors BU05–BU19 from the controller as set forth above.

(6) The signalling to the controller selector that a peripheral controller has been selected (the addressed peripheral controller is ready and operable). During initial peripheral controller selection operation, if a peripheral controller selects itself, a signal is echoed back to the controller selector on transmission line 00 on the main buss, i.e., pulse distributor BU00 is placed in its set state. If no such echo signal is received by the controller selector, then provision is made for an echo alarm to be turned on.

The internal control signal, transmit memory to peripheral controllers (XMC), is generated during output operations, i.e., the word time during which the controller selector has memory access to permit the entry of the contents of the M register into the main buss pulse distributors and thus in turn to the selected peripheral controller. The memory sample control signal (XMS) is also transmitted to the peripheral controller immediately following the information transfer to inform the selected peripheral controller of the availability of this new information in its own pulse distributor receiving circuits.

The transmit data sync control signal (XDS) is sent to all peripheral controllers during input operations and enables the selected peripheral controller to send one word, i.e., 21 bits of information, to the main buss pulse distributors of the controller selectors, i.e., BU00–BU20.

The memory address register comprises 15 flip-flops which are conveniently designated PA05–PA19, the latter flip-flops being utilized to store the memory address received from the selected peripheral controller via the BU05–BU19 lines during interrupt operations. This memory address is used to address the memory when controller selector priority is made available by the central processor (signal $IC_3$) due to the placing of flip-flop PR–3 in the central processor's interrupt control logic in the set state. A control signal internal to the controller selector (GBUA) permits the transfer of information from the main buss pulse distributors BU00–BU20 to the memory address register.

When a controller selector branch instruction is to be executed, the control signal DMBC is sent to the controller selector from the central processor and is in turn relayed over the transmission line in the form of the branch select signal XBS to all of the controllers. This XBS signal accompanies the address of the peripheral controller being interrogated on lines AB01–AB03. The peripheral controller then transmits back to the controller selector, via the main buss, all of its possible branching conditions and the branch logic therein determines whether or not the branching conditions being interrogated has been satisfied. These signals are compared with the decoded "$D_N$" signals and the result of the comparison is presented to the central processor.

In the controller priority select cycle, at $T_2$ time, the controller selector transmits a memory access request sync signal (XRS) to all of the controllers of the peripheral devices. Any or all of the peripheral devices requiring memory access utilize the aforesaid (XRS) signal to transmit a memory access request signal to the controller selector. These signals are received in the controller selector in the pulse distributors contained within the controller priority assignment logic (PFF0–7). The priority assignment logic now determines which of the peripheral controllers requesting priority is to be granted priority. The priority assignment logic also effects the generation of the memory access request signal (MAR) which is sent to the interrupt control to indicate that the controller selector requests memory access at the next computer word time.

At time $T_5$, the controller selector selection addressing logic transmits the address of the selected controller to all peripheral controllers. In the selected controller, this causes the output of its input addressing gate to indicate that it has been selected for memory access. At times $T_6$, the controller selector transmits the priority select signal. In the peripheral controller, the priority select signal and the correct controller address causes the address of the memory location with which the selected peripheral controller wishes to communicate to be transmitted to the controller selector on the main buss.

In the interrupt cycle, at time $T_0$ of the next word time, the controller selector examines the condition of the main buss pulse distributor BU20. If the peripheral device had been requesting memory access in order to write or insert data into the central processor memory, this pulse distributor would be latched in its set state. If pulse distributor BU20 has not been latched in its set state, it is indicated that the peripheral controller in question is requesting data from the central processor memory. At time $T_0$, the interrupt control logic establishes memory priority.

If the controller selector is to be granted memory priority, the controller selector receives an $IC_3'$ signal condition at this time. At time $T_0$, the contents of the main buss (address of memory location) is gated to the controller selector's memory addressing logic. When the signal condition $IC_3'$ is established, the contents of the addressing logic are gated to the central processor's memory addressing logic. At time $T_1$, the main buss is reset and prepared to receive new information.

At time, $T_4$, if the controller selector has memory priority, and this is not an input to memory cycle, the main buss transmits the contents of the memory cell to all peripheral controllers. The data contained in this memory cell is processed by the peripheral controller that was selected in the previous word time. At time $T_5$, the controller selector transmits a memory sample signal to the selected peripheral controller to indicate that it has received the contents of memory that it has requested.

Following the completion of the controller priority select cycle which interrogated and granted a peripheral controller, for example, tape controller priority, an operation such as a write-to-memory operation could possibly be requested. In this type of operation the IOT is switched to its set state under the following conditions at time $T_0$, viz., $IOT=BU20 \cdot T_0 \cdot \overline{IXRS}$.

The equation to provide the set output of flip-flop IOT signifies that a data word is inserted into memory at a selected address. In addition, the memory cell address into which this word is placed enters into the controller selector address logic at time $T_0$.

At $T_1$ time, flip-flop IXRS is switched to its set or reset state depending upon whether or not the central processor grants the controller selector the priority that it has requested. Flip-flop IXRS is switched to its set state if priority is not granted to the controller selector and flip-flop IXRS is switched to its reset state if priority is granted to the controller selector.

If flip-flop IXRS is switched to its reset state thereby signifying a successful priority establishment, data can now be transferred from the selected peripheral controller to the controller selector via the main buss. Such transferral is accomplished after the resetting or clearing of the main buss at time $T_1$ and is so done by a transmit data sync pulse (XDS) which occurs at time $T_2$. The XDS signal, transmitted to all peripheral controllers, causes an information transfer from only the selected peripheral unit to the controller selector. The data word is then latched up in pulse distributors BU00–20.

At time $T_4$ of the write-to-memory interrupt cycle, the GBM signal gates the data word into memory at the selected address.

Since this interrupt operation inserts but one word into memory, every subsequent word transfer requires an identical operation.

The controller of the selected peripheral device has the function of augmenting the memory cell address for each subsequent word storage operation. In addition, the controller of the selected peripheral device inserts proper parity on each data word transferred to the controller selector.

During the controller select cycle, the following signals are issued and are directly associated with the selection of the controller:

(1) A controller address is transmitted over the controller address buss at $T_1$ time.

(2) A controller select signal is transmitted at $T_2$ time. (a) The coincidence between this signal and an address comparison in a controller initiates the selection of the peripheral controller addressed for operation.

At $T_4$ time, if an echo signal is not detected, the ECO alert flip-flop is switched to its set state thereby indicating that the peripheral controller addressed during the controller select operation is not operable.

It is, of course, understood that the controller select signal generated by the central processor (DMCS) is present from $T_0$ to $T_0$ of memory time during which period the central processor is executing a select peripheral controller command.

*Command word time*

During the command word time, the central processor makes the two command words following the peripheral select command available and several signals are issued, such signals being directly associated with the transmission of the command words to the peripheral controller selected for operation.

(1) At $T_2$ time, the transmit pre-command word signal is sent to the controller selected for operation by the execution of the select command. This alerts the peripheral controller that a command word is going to be transmitted.

(2) At $T_4$ time, the output of the central processor memory is transmitted to the peripheral controllers over the main buss.

(3) At $T_5$ time, the transmit memory sample signal is transmitted. The controller selected for operation utilizes this signal to indicate that the command word transfer has been completed.

The signal DMCW is generated in the central processor and is present from time $T_0$ to $T_0$ of the memory times during which time the central processor is making the second and third command words available.

During the branch select cycle, several signals are generated and are directly associated with the selection of a peripheral controller for a branch quizzing operation.

(1) The peripheral controller address is transmitted at time $T_1$ over the controller address buss.

(2) A branch select signal is transmitted to all controllers at $T_2$ time. (a) The coincidence between the branch select signal and an address comparison in a peripheral controller initiates the transmission by the controller of the states of all quizzable signals to the controller selector.

At $T_4$ time, if an echo signal is not detected, the ECO alert flip-flop is switched to its set state thereby indicating that the peripheral controller addressed during the branch select instruction is not operable.

Also at $T_4$ time, the address of the condition being quizzed is compared with the corresponding condition signal received from the selected peripheral controller and the results presented to the computer for branch execution.

The DMBC signal is generated by the central processor and is present from times $T_0$ to $T_0$ of the memory time during which the central processor is executing a branch command quizzing a condition in a peripheral controller.

While particular embodiments of the invention have been shown, it will, of course, be understood that the invention is not to be limited thereto since many modifications may be made both in the circuit arrangement and in the instrumentalities employed, and it is, therefore, contemplated by the appended claims to cover any such modifications as fall within the true spirit and scope of the invention.

What is claimed as new and desired to be secured by Letters Patent of the United States is:

1. In a data processing system comprising a central processor, including data storage, arithmetic and control means, and a plurality of peripheral devices; selecting means in circuit with said central processor for enabling access of said peripheral devices to said data storage means in accordance with a predetermined priority and means included in said central processor for enabling access to said data storage means of said selecting means and said arithmetic and control means in accordance with a predetermined priority.

2. In a data processing system comprising a central processor, including data storage, arithmetic and control means, and first and second pluralities of peripheral devices, the peripheral devices of said first plurality communicating directly with said central processor; selecting means in circuit with said central processor for enabling access to said data storage means of the peripheral devices of said second plurality in accordance with a predetermined priority and means included in said central processor for enabling access to said data storage means of the peripheral devices of said first plurality, said selecting means, and said arithmetic and control means in accordance with a predetermined priority.

3. In a data processing system comprising a central processor including data storage, arithmetic and control means, said data storage means containing input and output instructions, and first and second pluralities of peripheral devices, the peripheral devices of said first plurality communicating directly with said central processor, each of said peripheral devices having discrete control means associated therewith; selecting means in circuit with said central processor and the control means of the peripheral devices comprising said second plurality for enabling communication between said central processor and said second peripheral devices to initiate the execution of said instructions and for enabling communication between said second peripheral devices and said central processor during the execution of said instructions, said selecting means including means for enabling access to said data storage means of the peripheral devices comprising said second plurality in accordance with a predetermined priority, and means included in said central processor for enabling access to said data storage means of the devices comprising said first plurality, said selecting means and said arithmetic and control means of said central processor in accordance with a predetermined priority.

4. In a data processing system comprising a central processor including data storage, arithmetic and control means, said data storage means containing input and output instructions, and first and second pluralities of peripheral devices, the peripheral devices comprising said first plurality communicating directly with said central processor, each of said peripheral devices having discrete control means associated therewith; selecting means in circuit with said central processor and the control means of the devices comprising said second plurality for enabling communication between said central processor and said second peripheral devices to initiate the execution of said instructions and for enabling communication between said second peripheral devices and said central processor during the execution of said instructions, said selecting means including means for enabling access to said data storage means of the devices comprising said second plurality in accordance with a predetermined priority, and priority means included in said central processor for enabling access to said data storage means of the devices comprising said first plurality, said selecting means and said arithmetic and control means of said central processor in accordance with a predetermined priority, said priority means being capable of effecting the interruption of the operation of one of said devices by a device having a higher assigned priority.

5. In a data processing system as defined in claim 3 wherein said means included in said selecting means for enabling said access comprises a plurality of circuit elements equal to the number of said second plurality of peripheral devices, each of said elements being capable of being in a true state or a false state, means interconnecting said elements such that only one of said elements can remain in a true state at any one time and whereby said elements are assigned a priority such that an element remains in the true state provided that none of the other of said elements having a higher priority than it are in the true state, the elements having a lower priority than it being in the false state.

6. In a data processing system as defined in claim 5 wherein means are further included in said selecting means for selecting for operation the peripheral device of the second plurality having the highest priority in response to simultaneous data storage means access requests by more than one peripheral device.

7. A data processing system comprising: a central processor including a data storage means; a plurality of peripheral devices; a control means associated with each of said peripheral devices, each of said control means adapted for the initiation of a signal representing a request, by its associated peripheral device, for access to said data storage means; and selecting means for enabling access of said peripheral devices to said data storage means in accordance with a predetermined priority, said selecting means comprising a plurality of bistable elements each capable of assuming either a first or second stable state, said bistable elements assuming the first of said stable states in response to a signal from one of said control means, said bistable elements arranged in a descending order of priority, and means interconnecting said bistable elements whereby upon the assuming of the first of said stable states by one of said bistable elements, all lower order bistable elements are placed into the second of said stable states.

8. A data processing system comprising: a central processor including a data storage means; a plurality of peripheral devices; a control means associated with each of said peripheral devices, each of said control means adapted for the initiation of a signal representing a request, by its associated peripheral device, for access to said data storage means; and selecting means for enabling access of said peripheral devices to said data storage means in accordance with a predetermined priority, said selecting means comprising a plurality of bistable elements each capable of assuming either a first or second stable state, one of said bistable elements in circuit between each of said control means and said data storage means, said bistable elements assuming the first of said stable states in response to a signal from the control means in circuit therewith, and means interconnecting said bistable elements, arranging said elements in a priority arrangement such that when one of said bistable elements is in the first of said stable states, all lower order bistable elements are in the second of said stable states.

9. A data processing system comprising: a central processor including a data storage means; a plurality of peripheral devices, a control means associated with each of said peripheral devices, each of said control means capable of providing a signal representing a request, by its associated peripheral device, for access to said data storage means; and selecting means for enabling access of said peripheral devices to said data storage means in accordance with a predetermined priority, said selecting means comprising a plurality of bistable devices, including input and output terminals, each capable of being placed in either a first stable state or a second stable state, one of said bistable devices in circuit between each of said control means and said data storage means, said bistable devices being placed into the first of said stable states in response to a signal from said control means in circuit therewith, said bistable devices arranged in a descending order of priority, and means interconnecting an output terminal of each bistable device to an input terminal of all lower order bistable devices whereby upon the placing of one bistable device in the first of its stable states, all lower order bistable devices are placed into the second of the stable states.

References Cited by the Examiner

UNITED STATES PATENTS

| | | | |
|---|---|---|---|
| 3,029,414 | 4/1962 | Schrimpf | 340—172.5 |
| 3,061,192 | 10/1962 | Terzian | 235—157 |

ROBERT C. BAILEY, *Primary Examiner.*

MALCOLM A. MORRISON, *Examiner.*

P. J. HENON *Assistant Examiner.*